(12) United States Patent
Chien

(10) Patent No.: US 10,184,649 B2
(45) Date of Patent: Jan. 22, 2019

(54) QUICKLY CHARGER HAS USB CHARGING-PORTS FOR LIGHTING DEVICE

(71) Applicant: Tseng-Lu Chien, Walnut, CA (US)

(72) Inventor: Tseng-Lu Chien, Walnut, CA (US)

(*) Notice: Subject to any disclaimer, the term of this patent is extended or adjusted under 35 U.S.C. 154(b) by 0 days.

(21) Appl. No.: 14/858,538

(22) Filed: Sep. 18, 2015

(65) Prior Publication Data
US 2016/0097522 A1    Apr. 7, 2016

Related U.S. Application Data

(63) Continuation-in-part of application No. 14/833,935, filed on Aug. 24, 2015, which is a continuation-in-part of application No. 14/827,810, filed on Aug. 17, 2015, which is a continuation of application No. 14/643,026, filed on Mar. 10, 2015, which is a continuation of application No. 14/144,703, filed on Dec. 31, 2013, which is a continuation of application No. 13/161,643, filed on Jun. 16, 2011, now Pat. No. 8,783,936.

(51) Int. Cl.
| F21S 6/00 | (2006.01) |
| F21S 9/03 | (2006.01) |
| H02J 7/00 | (2006.01) |
| F21V 23/02 | (2006.01) |
| F21V 33/00 | (2006.01) |
| H05B 35/00 | (2006.01) |
| H05B 37/00 | (2006.01) |
| H05B 37/02 | (2006.01) |
| F21Y 115/10 | (2016.01) |

(52) U.S. Cl.
CPC ............ *F21V 23/02* (2013.01); *F21S 6/003* (2013.01); *F21V 33/00* (2013.01); *H02J 7/00* (2013.01); *H05B 35/00* (2013.01); *H05B 37/00* (2013.01); *H05B 37/0227* (2013.01); *H05B 37/0281* (2013.01); *F21S 9/035* (2013.01); *F21Y 2115/10* (2016.08); *H02J 2007/0062* (2013.01)

(58) Field of Classification Search
CPC ..... F21V 23/02; H02J 7/00; H02J 2007/0062; F21S 6/003
See application file for complete search history.

(56) References Cited

U.S. PATENT DOCUMENTS

| 6,474,823 B1 | 11/2002 | Agata et al. |
| 7,736,033 B2 | 6/2010 | Patel |
| 7,742,293 B2 | 6/2010 | Strauser |
| 7,897,277 B2 | 3/2011 | Meyer et al. |
| 8,116,077 B1 | 2/2012 | Strauser |
| 8,432,667 B2 | 4/2013 | Strauser |
| 8,545,039 B2 | 10/2013 | Patel |

(Continued)

FOREIGN PATENT DOCUMENTS

CN    201078619 Y    6/2008

OTHER PUBLICATIONS

By Daniel; "Quirky Ember Portable Study Lamp With USB Ports and Power Outlets"; issued Jan. 28, 2011.

*Primary Examiner* — William N Harris
(74) *Attorney, Agent, or Firm* — Bacon & Thomas, PLLC

(57) ABSTRACT

A light device includes a USB charger, an AC to DC converter, and a DC to DC circuit to provide power to a light source that provides area illumination, at least one USB charging port and optional additional functions.

30 Claims, 22 Drawing Sheets

(56) References Cited

U.S. PATENT DOCUMENTS

| | | | |
|---|---|---|---|
| 8,562,187 B2 | 10/2013 | Smed | |
| 8,758,031 B2 | 6/2014 | Cheng et al. | |
| 8,899,797 B2 | 12/2014 | Schaak | |
| 9,806,772 B2* | 10/2017 | Tang | H04B 7/00 |
| 2004/0145890 A1* | 7/2004 | Liao | F21L 4/08 |
| | | | 362/183 |
| 2006/0209530 A1 | 9/2006 | Schaak | |
| 2009/0067161 A1 | 3/2009 | Nagata | |
| 2010/0039792 A1* | 2/2010 | Meyers | F21L 2/00 |
| | | | 362/20 |
| 2010/0118148 A1* | 5/2010 | Lee | F21V 3/00 |
| | | | 348/164 |
| 2010/0176743 A1* | 7/2010 | Lee | F21V 23/02 |
| | | | 315/294 |
| 2011/0177703 A1 | 7/2011 | Lin | |
| 2012/0292991 A1* | 11/2012 | Dodal | H02H 3/16 |
| | | | 307/11 |

\* cited by examiner

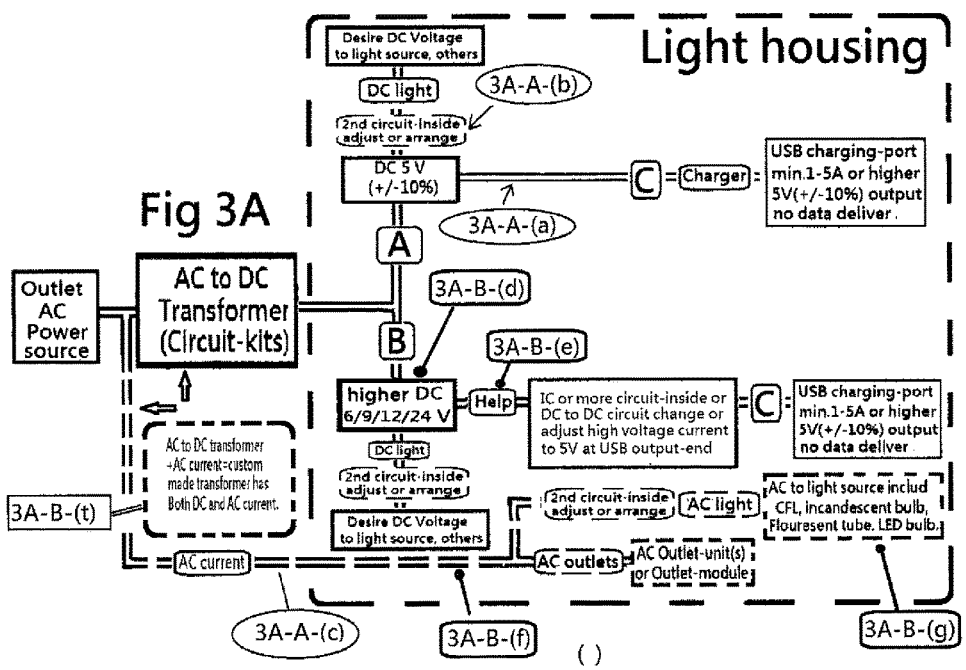
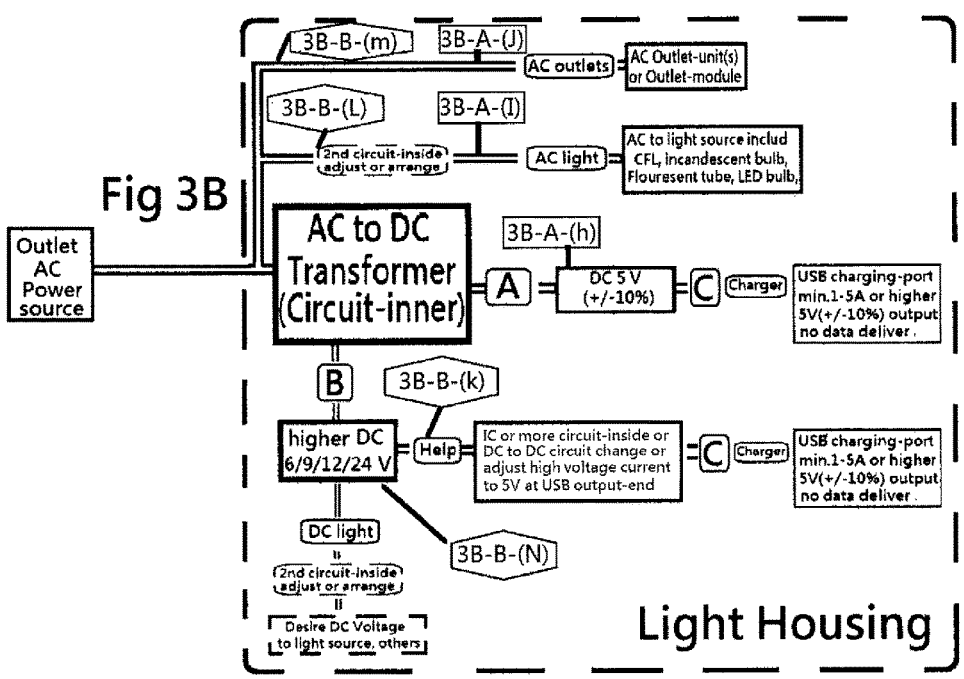

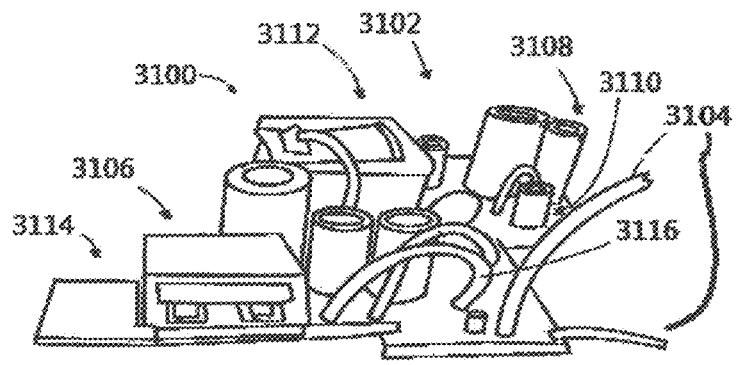
FIG. 32A1
(1) USB-unit: No housing, Not sealed and install within housing has one or more than one PCBs.
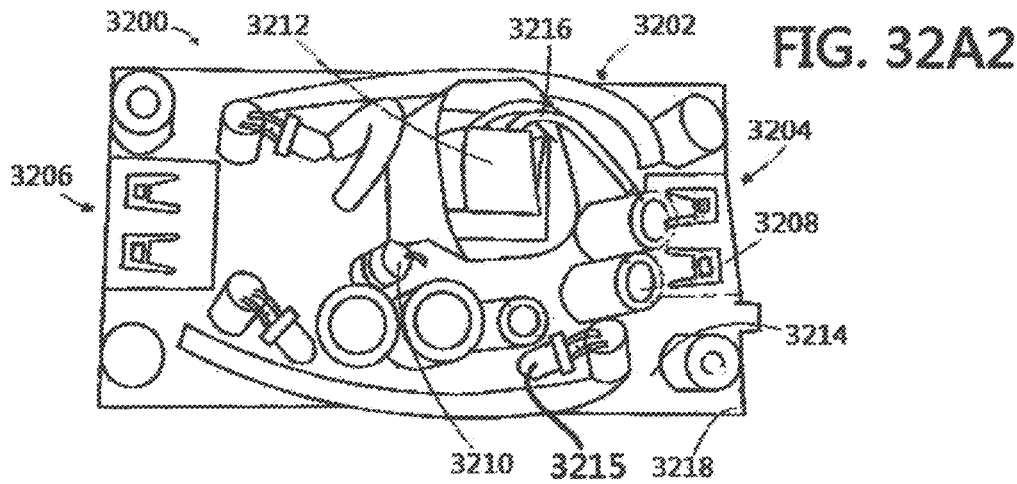
FIG. 32A2
(2) USB Module: more than one USB or optional outlet-unit(s) into 1 PCB to fit within the said desk top items (lamp).

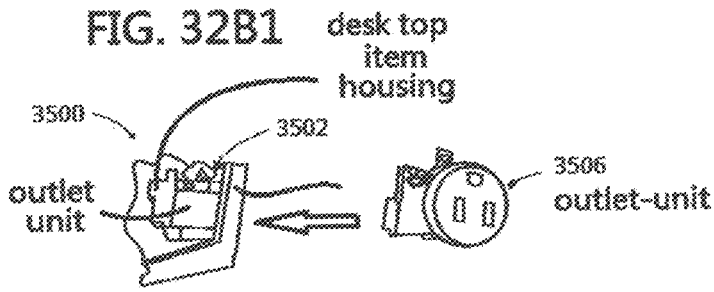
FIG. 32B1
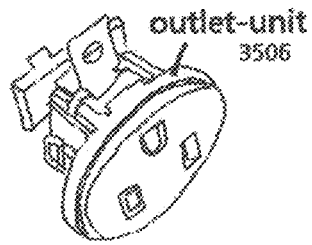
FIG.32B2
Outlet-unit: Outlet-unit is one unit has 2 or 3 prong receiving-ports to supply AC current to others device
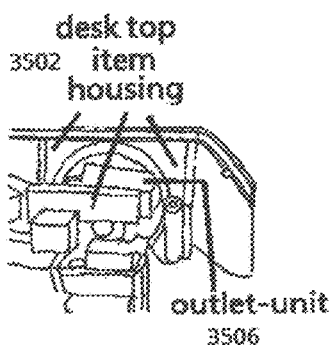
FIG. 32B3
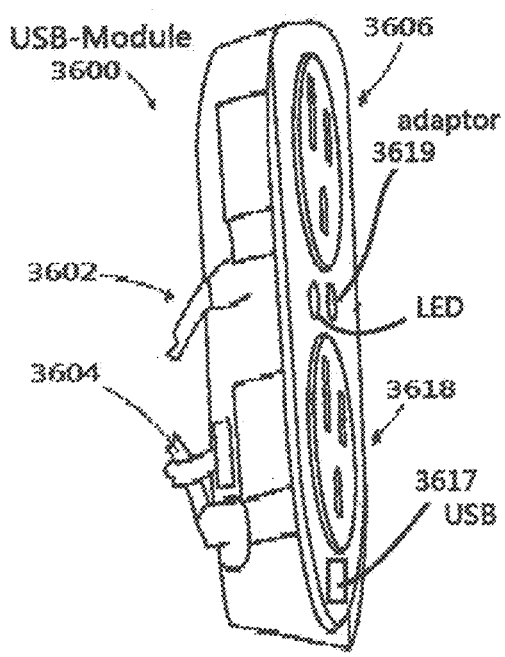
FIG.32B4
outlets-Module; have more than one of outlets or-and preferred USB-unit(s) or LED(s) inside its own housing or PCB(s) to fit into desk top item housing Universal-unit or module: is a sealed-unit has its functions such as fan or light and fit into any main housing. No safety certification.

FIG. 32C1

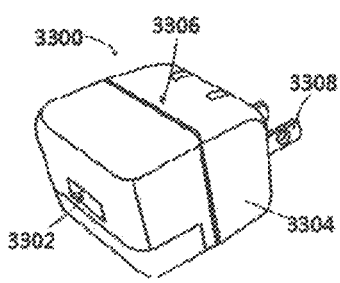

FIG. 32C3

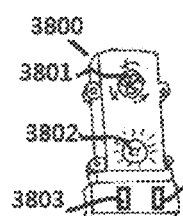

Universal-unit has desired function fit into desk-top items housing.

FIG. 32C4

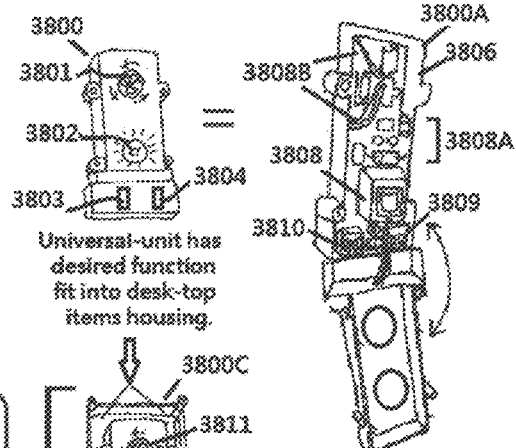

Sealed-Unit: Unit has safety certification can sell individual assemble with desk-top item by conductive-piece, and movable to use for itself while plug-into other outlets while detached from desk-top item outlets.

FIG.32C5

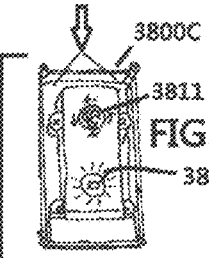

FIG.32C2

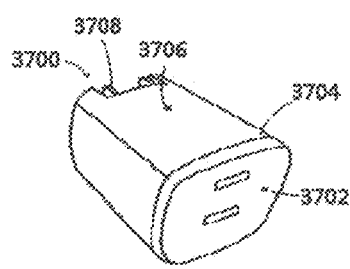

housing of desk top item or lamp housing

FIG.32C6

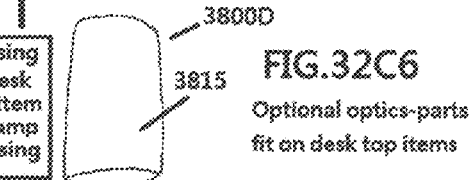

Optional optics-parts fit on desk top items

FIG.32C7

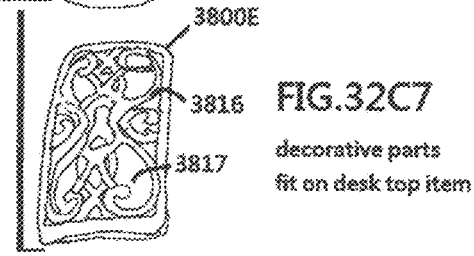

decorative parts fit on desk top item

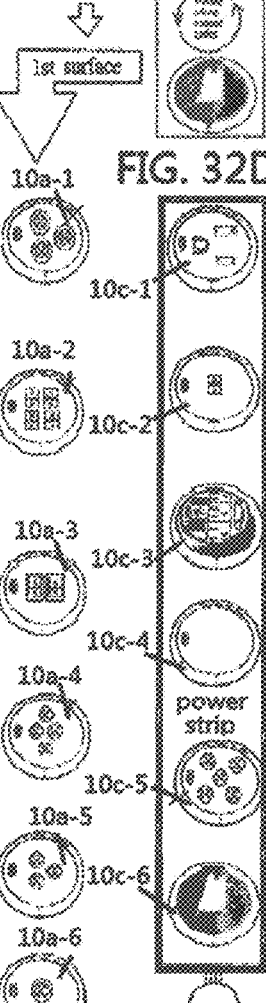

QUICKLY CHARGER HAS USB CHARGING-PORTS FOR LIGHTING DEVICE

The current invention are continuously filing of co-pending filing U.S. Ser. No. 12/950,017 (#CCC) Multiple surface LED light filed on Nov. 29, 2010 with rotating device has LED light device(s) and USB device and Outlets device built-in on the rotating substrate with more than one surface to offer multiple function.

The said (# CCC) U.S. Ser. No. 12/950,017 Filed Nov. 19, 2010 (Now is U.S. Pat. No. 8,998,462) is continuously filing for (#R) U.S. Ser. No. 11/806,285, and (Inventor's #R) filed on May 31, 2007 which also a multiple functions LED light device which are the continuously filing of the U.S. Pat. No. 7,318,652 (Inventor's #B) for multiple function Wall Cover which filed on Mar. 31, 2005. The current invention also continuously filing of U.S. Pat. No. 7,651,365 (Inventor's #F) filed on Jan. 15, 2005 which is CIP of Oct. 1, 2004. It also the CIP of U.S. Pat. No. 7,810,985 (Inventor's # A) file on Mar. 31, 2005 but it is CIP of Oct. 1, 2004 filing date too. All these patented or pending case all related to the Light source with Outlets device(s) which are part of the current invention features and got U.S. patents issues or co-pending. It is appreciated the all listed above patented or co-pending cases still treat as fall within the scope of current invention application and apply the priority terms for the current invention filing.

The current invention also continuously filing for (Inventor's #FFF) U.S. Ser. No. 13/117,227 filed on May 27, 2011 for Universal Module has USB-Unit(s) or/and Outlet-unit(s) for variety of electric or digital-data device.

And this filing case is Continue of following parent filing case:

This application is a continuation in part of U.S. patent application Ser. No. 14/833,935, filed Aug. 24, 2015, which is a continuation in part of U.S. patent application Ser. No. 14/827,810, filed Aug. 17, 2015, which is a continuation of U.S. patent application Ser. No. 14/643,026 which is Continuation of (#GGG-2C) U.S. patent application Ser. No. 14/548,620 which is Continuation of (#GGG-1C) U.S. patent application Ser. No. 14/540,561 which is Continuation of (#GGG-4) U.S. patent application Ser. No. 14/189,162 now is U.S. Pat. No. 8,931,947 which is continuation of (#GGG-3) U.S. patent application Ser. No. 14/144,703, filed Dec. 31, 2013, which is continuation of (#GGG-2) U.S. patent application Ser. No. 14/105,737 now is U.S. Pat. No. 8,911,137 which is continuation of (#GGG-1) U.S. patent application Ser. No. 14/105,607 now is U.S. Pat. No. 8,915,608 which is continuation of (#GGG-2011) US patent application Ser. No. 13/161,643 now is U.S. Pat. No. 8,783,936

This application is a continuation of U.S. patent application Ser. No. 14/444,703, filed Dec. 31, 2013, which is a continuation of U.S. patent application Ser. No. 13/161,643, filed Jun. 16, 2011, now U.S. Pat. No. 8,783,936, each of which is incorporated by reference herein.

This application is a continuation of U.S. patent application Ser. No. 13/161,643, (#GG-11) filed Jun. 16, 2011, Now is U.S. Pat. No. 8,783,936 incorporated by reference herein.

BACKGROUND OF THE INVENTION

This application has subject matter in common with the inventor's (#FFF) U.S. patent application Ser. No. 13/117,227, filed on May 30, 2011, and entitled "Universal module of USB-unit or Outlet-units for electric or digital data device(s)." The current invention is continuously filing of co-pending filing U.S. Ser. No. 12/950,017 (#CCC) Multiple surface LED light filed on Nov. 29, 2010 with rotating device has LED light device(s) and USB device and Outlets device built-in on the rotating substrate with more than one surface to offer multiple function.

This application also has subject matter in common with the inventor's U.S. patent application Ser. Nos.

(#I-1) Ser. No. 12/502,661 filed on Jul. 14, 2009, Jan. 1, 2013 issued (Later than parent filing date)

(#J-2) Ser. No. 12/292,580 filed on Nov. 21, 2008, Nov. 6, 2012 issued (Later than parent filing date)

(#M-1) Ser. No. 12/566,322 filed on Sep. 24, 2009, Pending case (#K-06) Ser. No. 11/498,874 filed on Aug. 4, 2006, Pending case.

(#L) Ser. No. 11/527,629 filed on Sep. 27, 2006, Oct. 1, 2013 issued (Later than parent filing date)

(#HH-09) Ser. No. 12/622,000 filed on Nov. 19, 2009, May 17, 2013 issued (Later than parent filing date)

(#11-09) Ser. No. 12/624,621 filed on, Nov. 6, 2012 issued (later than parent filing date)

which disclose a sealed-unit with uniform dimensions and shape to fit into the same uniformly dimensioned compartment so that the universal sealed-unit can fit into a variety of LED light devices. The sealed unit(s) disclosed in these applications share the following features:

a. The sealed-unit(s) has uniform dimensions to fit into the uniform compartment of any kind of LED light device.

b. The sealed-unit(s) has passed all related safety standards and received a laboratory's safety certification so that it can be used with other LED light device's parts and accessories which may or may not meet the safety standard passed by the said sealed-unit(s).

c. The sealed-unit(s) can be any individually salable unit because it has passed all related safety requirements and standards. The other parts or accessories may or may not be just decorative or have other functions to make the LED light device more valuable.

The current invention utilizes the sealed-unit concept in the following manner:

(A) The current invention utilizes the concept disclosed in the above-cited applications of providing a sealed-unit that has passed all the relevant safety standards, but applies the concept to other electric device(s) which are not limited to an LED light device. It The concept may be applied to an LED light device, power strip device, wall outlet device, surge protection device, wall adaptor device, charging device(s), smart phone related device(s), computer related device(s), and other consumer electric device(s).

(B) The USB-unit or outlet-unit may be in the form sealed-unit of a rather than the previously disclosed LED-Unit, battery-pack, or prong and the said Sealed unit may just (B-a) a charging circuit board assembly for USB-unit to charge (not supply) the energy storage unit which built-inside of the said other device only, (B-b) maybe is a conductive-piece assembly for Outlet-unit to deliver or supply the input AC current to the other device (B-c) USB-unit maybe just a USB-receiving device to get power from the outside transformer, adaptor, invertor which already change outlet's AC current to DC current so can just pass though DC to DC circuit from different voltage to change to the 5V DC current or directly get 5 Volt DC current from transformer to offer right current to the said USB-Unit to charge (Not supply) the current to the said energy storage unit inside the said other electric or digital device.

(C) The USB-unit or outlet-unit are arranged to charge or supply power from these units to a variety of electric devices to keep the electric device(s) in good power condition for people to use but USB-Unit is to charge the energy-storage unit and preferred is rechargeable battery and not directly supply power to the said electric device such as said mobile phone. The Outlet-unit which simple just is conductive-piece assembly to deliver the AC current to the said other device power input-end such as prongs directly and optional to has surge protection or wireless controller.

(D) The USB-unit or outlet-unit may each include its own related circuit, conductive piece, contact-piece, custom-pins, receiving-ends, output-ends, input-ends, electric parts and accessories to get the electric power from (D-a) AC power by a prong-cable from outlets; or (D-b) DC power from USB-cable to get power from outside power bank/energy storage unit or assembly which has multiple Amperage current storage capacity not from the computer export-ends which only limited 500 ma too slow for charging; or (D-c) DC power from outside housing transformer, adaptor, invertor unit which already has circuit built-in and already change the AC current to DC current, and though a receiving-wire or delivery-wire or USB-wire has at least 2 male USB-plugs to insert into above USB-Unit or USB-Module female receiving-port (USB Charging-ports) for supplying to deliver the DC power though the DC to DC circuit inside the device's housing to get right current and get into to a variety of electric device's female receiving-port which has desire contact or connector or Custom-Pin ports for the other device USB receiving port which depend on the other device's design so it is variable.

The USB Charging-ports prefer to use Type A which is most common for the desktop items so can fit for all kind of the USB-wires at least one-plug of the said 2 plugs on each USB-Wire or jump wire or bridge wire at this time. On latter time It is appreciated that maybe will prefer to use Type-C because more compact and majority of the other electric device will have this Type-C USB-unit from new device so can make the other device has smaller new Type C USB-unit to make the overall size become more compact and thin. Anyway, the one end of the USB-wire can be any type such as Type C or any kind of Custom-Pin contact depend on market design and requirement.

The said USB port type may in Type A, Type B, Type C each of these has Female receiving-end and male plug so can build the electric power delivery. It also has digital data delivery but at this invention do not use and do not need to use the electric data or digital data delivery functions and the current invention only for Charging purpose only so can prevent slow charging or overheat issue happened. The current invention for quickly charging-ports is not allow data delivery too.

The desktop items USB port (USB Charging-pots) not allow to use special of custom-pin to fit the other electric device's USB receiving-pots because this will become only can charge one of other electric or digital device. The current invention's USB charging-port preferred to use Type A which is most popular same as all laptop computer USB receiving ports but has quickly USB charging-port function to charge minimum 1 to 5 Amp at output-end 5 Volt (+/−10%) voltage. The Type A USB charging-port because this can easily built-in on the Desktop items which because the desktop items is no need to have super compact size like the be charged items such as mobile phone, iPad which need as slim and thin as possible so these communication or consumer electric products need use special custom-pin such as mini USB, Micro USB, or even type C for the USB receiving port so can allow the mail-plug of mini USB or micro USB can insert into so can make the communication or hand-held iPad as slim and thin as possible. For Desk top still use the Type A will be more popular and can fit almost every USB-wire, jump-wire, bridge wire so can charge any kind of other electric or digital device. As for special USB Charging-pots allow to charge minimum 1.0 Amp to 5 Amp specification release on 2007 and update on 2010 which is for quickly charging capacity this is what the current invention specify for charging capacity minimum from 1.0 Amp to higher Amperage and has details discuss on hereafter.

(E) The current invention offers USB-unit or Outlet-unit is a universal module design with the most compact size to enable each of the USB-unit and outlet-unit or any combination of USB-units and/or outlet-units to form a desired module that fits into all kinds of electric device(s), including an LED light device, wall outlet, wall outlet adaptor, power strips, surge protector, communication device, computer device, consumer electric device, smart phone device, panel computer device, etc. The universal module design means can fit into more than one of the other device and no need to change its electric circuit, PCB, trace with current invention use quickly charging USB Charging-ports has 2007 & 2010 definition and has minimum 1.0 Amp up charging capacity.

(F) Once the USB-unit or outlet-unit in circuit board assembly, in sealed unit assembly, in a universal module assembly and has passed all related safety standards and has its own issued certification, the finished electric device in which it is used does not need to get an additional safety certification related to USB-units or outlet-units. This means can save a lot of time and resource to apply each finish product's USB-unit or Outlet-unit meet the local safety standard and no fire, no electric shock, no electric shortage hazard. Plus, the current invention uses the quickly charging USB Charging-ports which has 2007 & 2010 definition and has minimum 1.0 Amp up charging capacity.

(G) The modules of the current invention can utilize any combination of suitable USB-unit or outlet-unit parts, such as a conductive wire, conductive plate, conductive piece, contact-kit, prong-cable kits, USB-cable, prongs, resilient conductive kit, printed circuit, flexible circuit board, related electric parts and accessories, fixing, positioning kit, and/or installation device to enable the module, outlet-unit, or USB-unit to pass the safety standard and get the relevant safety certification and be added onto more than one or a lot of others electric device.

(H) The module of the current invention may have different specifications, such as:

1 module has 1 USB-unit+1 USB-port, 1 module has 2 USB-ports+1 outlet-unit, 1 module has 2 USB-ports+2 outlet-units, 1 module=only has 1 USB-unit, or 1 Outlet or, any combination of USB-units and outlet-units that still permits a standard module to fit into many of different electric device(s) as needed with current invention has quickly charging USB Charging-ports which has 2007 & 2010 definition and has minimum 1.0 Amp up charging capacity.

(I) The module can also have the following different specifications: 2 USB ports having different current outputs including, 1 Amp, 1.1 Amp, and/or 2.2 Amps to enable the 2 USB-ports to charge different electric devices such as an iPhone™, which needs to have 1 Amp, and an iPad™, which requires 2.1 Amps.

If people want to charge 1 iPhone m+1 iPad™ at the same time, at least 3.1 Amps will be needed, which will be very expensive. Or more high speed charge for 4.2 Amp for 2 pcs of 2.1 Amp, or higher speed charge for 4.8 Amp for 2 pcs of 2.4 Amp. from data the current invention preferred for USB Charging-port basing on 2007 released for USB2.0 standard and 2010 upgrade for charging-port. However, as the current invention all desktop has no any digital data delivery and only charging function, so the current invention can have bigger current charging than out of date USB-ports from computer or other charger Before 2007 for limited 500 ma or less charging with overheat issues as the wiki reported on below text for cross reference.

If people want to charge the 1 iPhone™ or 1 iPad™ at different times, the standard module can be 1 port 1 Amp+1 port 1.1 Amp=2.1 Amps total, and the cost will be cheaper.

If people want to charge only 1 iPhone™, only need 1 USB-unit with 1 port which has only 1 Amp is needed for the most economical product. Hence, the module of the invention should not be limited to only one specification. But the current invention has quickly charging USB Charging-ports application which meet 2007 & 2010 released definition and has minimum 1.0 Amp up charging capacity.

The current invention specify the Charging capability start from 1.0 Amp up to hundreds of Amp and the old date before 2007 has limited for 500ma charging capacity for out of date USB construction and also has overheat or burn problem for bigger than 500 ma so from 2007 has update USB charging-port so market can have a lot of USB-charging device coming from 2010 for Big charging current such as the current invention. The below is copy from Wikipedia, The Free Encyclopedia has the details (Charging port and Charging speed and Charging port) to support the current invention for update charging capability.

USB
From Wikipedia, the free encyclopedia
USB 2.0
Battery Charging Specification 1.1: Released in March 2007 and updated on 15 Apr. 2009.
Adds support for dedicated chargers (power supplies with USB connectors), host chargers (USB hosts that can act as chargers) and the No Dead Battery provision, which allows devices to temporarily draw 100 mA current after they have been attached. If a USB device is connected to dedicated charger, maximum current drawn by the device may be as high as 1.8 A. (Note that this document is not distributed with USB 2.0 specification package, only USB 3.0 and USB On-The-Go.)
Battery Charging Specification 1.2:[25] Released in December 2010. Several changes and increasing limits including allowing 1.5 A on charging ports for un-configured devices, allowing High Speed communication while having a current up to 1.5 A and allowing a maximum current of 5 A.
USB 3.0[edit]
Main article: USB 3.0
As with previous USB versions, USB 3.0 ports come in low-power and high-power variants, providing 150 mA and 900 mA respectively, while simultaneously transmitting data at SuperSpeed rates.[28] Additionally, there is a Battery Charging Specification (Version 1.2—December 2010), which increases the power handling capability to 1.5 A but does not allow concurrent data transmission.[25] The Battery Charging Specification requires that the physical ports themselves be capable of handling 5 A of current[citation needed] but limits the maximum current drawn to 1.5 A.

USB 3.0[edit]
charging ports[edit]
A small gadget that provides voltage and current readouts for devices charged over USB his USB power meter additionally provides a charge readout (in mAh) and data logging The USB Battery Charging Specification Revision 1.1 (released in 2007) defines a new type of USB port, called the charging port. Contrary to the standard downstream port, for which current draw by a connected portable device can exceed 100 mA only after digital negotiation with the host or hub, a charging port can supply currents between 500 mA and 1.5 A without the digital negotiation. A charging port supplies up to 500 mA at 5 V, up to the rated current at 3.6 V or more, and drops its output voltage if the portable device attempts to draw more than the rated current. The charger port may shut down if the load is too high.[92]

Two types of charging port exist: the charging downstream port (CDP), supporting data transfers as well, and the dedicated charging port (DCP), without data support. A portable device can recognize the type of USB port; on a dedicated charging port, the D+ and D− pins are shorted with a resistance not exceeding 200 ohms, while charging downstream ports provide additional detection logic so their presence can be determined by attached devices.[92]

With charging downstream ports, current passing through the thin ground wire may interfere with high-speed data signals; therefore, current draw may not exceed 900 mA during high-speed data transfer. A dedicated charge port may have a rated current between 500 and 1,500 mA. For all charging ports, there is maximum current of 5 A, as long as the connector can handle the current (standard USB 2.0 A-connectors are rated at 1.5 A).[92]

Before the battery charging specification was defined, there was no standardized way for the portable device to inquire how much current was available. For example, Apple's iPod and iPhone chargers indicate the available current by voltages on the D− and D+ lines. When D+=D−=2.0 V, the device may pull up to 500 mA. When D+=2.0 V and D−=2.8 V, the device may pull up to 1 A of current.[93] When D+=2.8 V and D−=2.0 V, the device may pull up to 2 A of current.[94]

Dedicated charging ports can be found on USB power adapters that convert utility power or another power source (e.g. a car's electrical system) to run attached devices and battery packs. On a host (such as a laptop computer) with both standard and charging USB ports, the charging ports should be labeled as such.[92]

To support simultaneous charge and data communication, even if the communication port does not support charging a demanding device, so-called accessory charging adapters (ACA) are introduced. By using an accessory charging adapter, a device providing a single USB port can be attached to both a charger, and another USB device at the same time.[92]

The USB Battery Charging Specification Revision 1.2 (released in 2010) makes clear that there are safety limits to the rated current at 5 A coming from USB 2.0. On the other hand, several changes are made and limits are increasing including allowing 1.5 A on charging downstream ports for disconfigured devices, allowing high speed communication while having a current up to 1.5 A, and allowing a maximum current of 5 A. Also, revision 1.2 removes support for USB ports type detection via resistive detection mechanisms (J) If the (10-1) a Universal piece, or (10-2) a sealed-unit or (10-3) USB-Unit, or (10-4) USB-module in a circuit board, housing form, or (10-5) Outlet-unit, (10-6) Outlet-module is a conductive-piece assembly each has its own issued safety certification and that can fit into the any compartment of any other electric device, there is no need to file, for each different electric devices, a UL, ETL, or CSA safety certification, which saves a lot of time for tooling, development, and safety testing for each different electric device. This will reduce a lot of R&D, development, tooling, safety certification time and fees.

However, in Some cases, it no need get pre-certification for the all (10-1) to (10-6) because factory may only make 1 model of the products or other reason for limited products productions, so no need get pre-certification is also fall within the current invention has built-in USB related parts & accessories to Charging the DC current into the built-in energy storage unit of other device or Deliver the AC power though conductive assembly to the other device. To get pre-certification good only for factory has a lot of desktop items so need to do pre-certification to save each time test the USB-Charger or Outlet-unit or the items listed on above (10-1) to (10-6).

The co-pending application entitled "Universal module of USB-unit or Outlet-unit for electric or digital data device," U.S. Ser. No. 13/117,227, (#FFF-11) discloses a simple arrangement for enabling "Desk Top items with LED means having USB-unit(s) or USB-module(s) to charge a variety of electric or digital data device(s)," which does not require a universal module because some of the desk top items have plenty of room/space to accommodate a larger size of USB-unit(s) or USB-module(s) or above discussed (10-1) to (10-6) and reduce the cost for related electric components, parts, or accessories to make the items more cost attractive to the consumer.

The USB-unit(s) and all above discussed (10-1) to (10-4) is an electric USB-charging unit which has a USB-female receiving means (hereafter as USB-Charging port as wild release on 2007 has minimum 1.0 Amp charging capability) to receive a wire's USB-male plug (hereafter as USB-plug) to deliver electric power from the USB-female receiving means (USB-Charging port release on 2007 as wiki disclosure) to the other wire device's USB-male plug (USB-Plug).

The preferred USB-female receiving means (USB Charging-Ports) gets power from a power source and uses circuit to convert the in-put AC electric power to an out-put power has desired waveform, voltage, and current flow or amperage (A or ma) by circuit which may (AA-1) circuit install inside the desk top housing has at least one of transformer, adaptor, invertor, converter has circuit-inner to change AC current to DC current.

(AA-1) circuit install within outside housing's and has at least one of transformer or adaptor or invertor or converter has circuit-kits to change AC current to DC current to enable the wire device 1st USB-male plug (USB-Plug) to supply power from wire's $1^{st}$ input-end USB-plug to $2^{nd}$ wire-output end's USB-plug which has desire connector type selected from (T-1) Type A, (T-2) Type B, (T-3) Type C or (T-4) mini-USB, (T-5) micro-USB or (T-6) custom-pin USB while the $2^{nd}$ end's USB-Plug of USB-Wire to insert into the USB-receiving port of the other electric or digital device(s). The current invention all the related USB Charging-Port has min. 1.0 Amp up to 5 Amp and meet the USB 2.0 and USB 3.0 and has NO electric data or digital data delivery functions as co-inventor's plurality issued and co-pending filing case including parent filing case U.S. Pat. No. 8,783,936 filed on Jun. 16, 2011 and issued on Jul. 22, 2014 of inventor's reference series number (#GGG-2011), and Child-Filed U.S. Pat. No. 8,911,137 (#GGG-2), U.S. Pat. No. 8,915,608 (#GGG-1), U.S. Pat. No. 8,931,947 (#GGG-4) and co-pending filing cases. Also, all the current invention only accept ONLY ONE input current not allow more than one input current such as normal time is AC power and change to DC power while power fail which will had a lot of controller or additional circuit need to do which may have more risk for fire case happened.

The USB-module(s) described in the co-pending application is an electric charging module which has at least one (aa) USB-female Charging receiving means (USB Charging-Port as wiki release on 2007) but also has a number of receiving means selected from (bb) an outlet-female receiving means (hereafter as Outlet-ports), (cc) USB-female Charging receiving means (hereafter as be charged device's USB Ports), (dd) USB-female Hub receiving means for digital or electric data delivery (hereafter as USB-HUB Ports)

(ee) an adaptor's female receiving means (hereafter as Adaptor-ports), or (ff) any conventional female receiving means (hereafter as Any-Other-ports)

to form a single body which has more than one (aa) USB-female Charging receiving means (USB Charging-port) to offer the same or different electric power though the different female receiving means (hereafter as different ports) within the one body.

The USB-module connects with an input power source and circuit to offer a desired waveform, voltage, and current (Amperage or mini-amperage) as output power to charge energy-storage unit or assembly inside of the said other device(s) when the female receiving means (USB ports) is connected with other device's the male plug (USB-Plug) of desire style of the connect, style, size, construction or custom-pin for connection for be charged device(s).

Hereof, also attached the USB history charter for different years for the USB generation;

| | Version history[edit] | | |
| | Version history overview[edit] | | |
| Release name | Release date | Speed and max signalling rate | Note |
|---|---|---|---|
| USB 0.8 | December 1994 | | |
| USB 0.9 | April 1995 | | |
| USB 0.99 | August 1995 | | |
| USB 1.0 Release Candidate | November 1995 | | |
| USB 1.0 | January 1996 | Low Speed (1.5 Mbit/s), Full Speed (12 Mbit/s) | |
| USB 1.1 | August 1998 | | |
| USB 2.0 | April 2000 | High Speed (480 Mbit/s) | |
| USB 3.0 | November 2008 | SuperSpeed (5 Gbit/s) | Also called USB 3.1 Gen 1[19] |
| USB 3.1 | July 2013 | SuperSpeed+ (10 Gbit/s)[20] | Also called USB 3.1 Gen 2[21] |

So, the current invention offers a quickly USB charging-port to offer the min. 1.0 Amp and the current invention only for Charring function from the charging circuit connected with power source from (4-a) AC power by a prong-cable from the AC outlets from wall or extension cord, power strips and has circuit-inner inside of Desktop item's housing has at least one of transformer, adaptor, invertor and use circuit-inside to change AC current to DC current at desired voltage and has other IC or circuit-insides or DC-to-DC circuit to change the different voltage DC current to USB-Charging port output-end DC 5 (+/−10%) volt or supply the desired voltage DC current to DC light source or DC other function's circuit to use.

or (4-b) DC power from USB-cable to get power from outside housing's power bank or/energy storage unit directly do not have other circuit or controller which has multiple amperage current storage so can offer minimum charging capacity from 1.0 A up to 5 Amp range or higher, or (4-c) DC power from circuit inside of outside housing has at least one of transformer, adaptor, invertor has circuit-kits to change the AC current to DC current for variety or different voltage of DC current and though IC or circuit-inside or DC-to-DC circuit to change or adjust from different Voltage DC current and has the USB charging-port output end has DC 5 (+/−10%) Volt, And though a receiving-wire or delivery-wire has at least 2 male USB-plugs to insert into above USB-Unit or Outlet-unit female receiving USB charging-port for supplying power that power been though the desktop device's inside housing IC or other circuit-inside or DC-to-DC circuit to get desired current type to a variety of electric device's female receiving-port to charge the inside energy-storage unit or assembly DC current so can make other electric or digital device can work or operation.

To enable people to easily reach, touch, operate, or manage the desk top items, the USB-unit(s) or USB-module(s) are installed on or within the item/housing or a substrate(s). The items may be positioned at a location where people will stay for a period of time, such as a desk, table, bed, chair, land, grass, or wherever else people work, rest, or take a nap. For example, people use a computer, laptop computer, iPhone™, iPad™, or iCloud™ on a substrate(s), location, or place such as a table, desk, bed, laptop stand, laptop supporter, laptop cushion or any similar surface(s) which allows people to work, sleep, or lay down for a period of time while charging other electric or digital data device(s).

In all such places where people will stay for period of time, the nearby desk top items has built-in USB-units easily offer electric power to all other electric or digital data device(s), so people do not need to bend the body to find a power source under the table, which normally is farther away than the desk top items having LED means. Hence, this arrangement offers good convenience for people while they work, rest, or even take a nap, so that they can easily use the USB-unit(s) or USB-module of the desk top items to charge their small phone, computer, iPad™, or any other electric or digital data device(s) while they work, rest, sleep or take a nap.

It is desirable for the universal module of the USB-unit(s) or outlet-unit(s) described in the co-pending application to be made as small as possible so that it can fit into as many applications' limited housing size as possible and therefore really meet the goal of universal applicability. On the other hand, the smallest, slimmest, or most compact size of the USB-unit(s), outlet-unit(s), or USB-module is too expensive. For example, the APPLE™ iPhone™'s or iPad™'s USB-unit, which is very small in size, needs to use a very high cost compact transformer or inverter with super big power output in order to achieve a very short time to fully charge the other electric or digital data device(s). This problem can be resolved if, in order to get the USB-2.0 or new standard 2.1-amp output from the USB-unit(s), the size of some electric components, parts, or accessories such as transformer or inverter, or other same-function electric parts, or accessories can be increased by placing it in a desk top item with sufficient space, thereby obtaining the same big power output at a substantially lower cost to let the consumer save pocket money. Suitable desk top items to which a universal module, USB-unit, or outlet-unit can be added include a desk lamp, desktop lighted mirror, desk top clock, desk top radio, desk top fan, desk top lighting, reading light, wall reading light, head lighting, book light, electric picture display, night light with AC to DC power source or adaptor with prong and wire, projection light with AC to DC power source or adaptors with prong and wire, electric candle set with AC to DC power source or adaptors with prong and wire, or any LED device that can serve as a desk top item as described herein and that can accommodate a USB-unit or USB-ports designed only for charging purposes rather than delivery of digital data. The desk top items can provide function(s), performance, and effects(s) including, by way of example, generation of light beams and projection of images such as time images, as well as serving as a source of illumination, music, power, electric signals, photos, and digital signals for sound, light, music, smell or any conventional market-available devices that people will STAY there for a period of time sufficient to also enable charging of other electric or digital data device(s).

Also, the current invention not only for charger but also has illumination as below;

From above current invention's charger and lighting arrangement can see the current invention are different with the US prior art including:

1. U.S. Pat. Nos. 7,736,033 and 8,545,039 Patel. The Lamp Base with Electric device recharge receptacle & means. The Bhart's disclosure the Outlet device and the Cigarette-lighter type construction build on the lamp base. The Lamp Base make the input AC current transfer to output current to automobile current (12 Volt), then the separated product is an Automobile-Cigarette or car-charger make the input current from (12 VDC) to USB end current (5 Volt) and be charged item's need use the $2^{nd}$ USB-Wires' male plugs to connect for 5 Volt Output-end and be-charged items' USB-receiving port.

This means the Bhart's device at least need 2 expensive circuit/Transformer to get the USB Charger's output current from (120 VAC wall outlets) to (USB Current 5 VDC) and need 2 wires products ($1^{st}$ is cigarette adaptor+$2^{nd}$ is USB wires has 2 male plugs) to build the DC charging current delivery. This is not economical and none of people need 12 VoltDC for house use at all.

The current invention has many different way and compare with Patel as above FIG. 3B can do 2 arrangement including (A) direct install the USB Charger unit let the inside housing AC to DC transformer and its circuit-inside to get DC 5 Volt Current directly which so transfer the input-end 120 VAC to output-end 5 VDC so this is practically. Or (B) the AC to DC transformer and its circuit-inside to make the 120 VAC to any $1^{st}$ DC Voltage which may can operate the DC light source or other functions but it cannot work for USB charging-ports output-end 5V DC current so need get help from the IC or more circuit-inside or DC-to-DC circuit to change the $1^{st}$ DC voltage to $2^{nd}$ DC voltage which has DC 5 Volt which perfect for the USB Charging Port's output-end current. So the FIG. 3B show the (A) and (B) 2 way to get desired DC current not only for USB-Charger but also for DC light source or other DC powered functions such as controller, IC, motion sensor, wireless communication kits, IP cam, remote controller, infra-Red controller, communication device, computer device, consumer electric device. So this is different with the Patel basing on above discussion.

2. US Prior Public 2011-017-7703 (Now U.S. Pat. No. 8,007,295) Rotable & concealable device which only has the outlets device with manual switch. This is directly for 120 VAC outlets power source directly though metal piece and delivery 120 VAC to the rotatable & concealable device's receptacles to offer 120 VAC current while the other device's plug means connect with the said receptacle.

'703 patent fail to disclosure the any USB charger concept, circuit, design and application so not have any related with the current invention for USB charger and the current invention device use Overlay to sit on existing lamp base to offer multiple power type power station with a lot of features.

3. US prior art: U.S. Pat. No. 7,897,277 Meyer et al, disclosure the Reversible battery cartridge which are use the AC batteries cartridge a backup power for the all kind of lamp which mainly for power fail application. This is nothing to do with USB ports and USB charger application. So there is totally different with current invention related to (1) USB ports+(2) USB Charging+(3) Outlet supply power source+(4) LED light and Universal lamp base to fit for all kind of existing lamp base so not occupy any new desk top space because (5) the Universal Desk base is overlay top of the existing lamp base.

Furthermore, the current invention has (6) LED light incorporate with the above listed (1) (2) (3) (4) (5) so it become a unique practical Universal Power station because (7) the current invention is not only supply one kind of power to charger different electric or digital-data device(s).

4. US prior art—U.S. Pat. No. 6,474,823 Disclosure the laptop computer with top illumination light which is not for the AC power source into USB related circuit to transfer to the DC current to charge DC 5 Volt electric device. The Computer input-end current is 120 VAC but it pass though the computer its transformer already transfer to output-end current at 19 Volt 6 Amp VDC at transformer output-end or other high voltage DC current and then there is no any USB Charger circuit inside the computer so the computer's external transformer which directly to delivery 5 VDC current to the to the USB Port so the computer system which is not same as current inventions the input-end current is 120 VAC though USB Charger inside circuit and more than circuit-inside or IC or DC-to-DC circuit to change to get the output-end for 5 VDC and most important all laptop computer USB ports has data transfer which is not allow for the Quickly charging system especially for 2010 definition for USB Charging-ports has minimum 1.0 to 5 Amp or higher without any data transfer definition.

The total circuit and concept is different because computer prior art use the EXTERNAL Transformer which not belong to computer itself parts to transfer the 120V Outlet power. Though EXTERNAL transformer get 5 VDC current (Outside the computer). The Computer itself input-end current is 5 VDC and output-end current of USB ports also is 5 VDC so it proves, Computer itself is no any USB Charger circuit inside.

5. US Prior art: U.S. Pat. No. 8,562,187 Smed disclosure FIG. 2 function for AC outlet-module has the PCBA to transfer the input AC current to 15 Volt 2 A to turn on the said LED or to change the input AC current to US power outlet or Other country outlet. This is different with the current invention for AC outlet-unit which is directly to deliver the AC current from input-end directly to the AC current output-end no need any circuit help if added any PCBA to help will have some voltage dropped increase electric resistance. Also, The Smed other output for 15 Volt DC which is not same as the current invention for USB charging-ports output-end need DC5V with market available USB-port type to connect with all communication, computer, mobile phone wire's specifications so it is not replaceable. From SMED teach 15 VDC 2 Amp current is supply to the LED light which LED light operation voltage is 15 VDC and SMED did not show the inner circuit or IC or other circuit to make the 15 VDC to pass though these other electric parts & accessories to change to the USB charging ports which 2010 definition has minimum 1.0-5 Amp or higher as SMED whole content did not teach 2.0 Amp how to charge the iPad and can share the 2.0 Amp for all LED light and the Quickly USB charging-ports. The SMED teach use power cord 36 has connector 7 to outlet connector 5. These is totally different for current invention's outlet-unit which no need any power cord 36 to build the electric delivery from desk top lighting device to the other electric device. The current invention outlet-unit has all outlet-receiving ends and can directly plug-into the other electric device male-prong to get electricity.

The current invention also has major difference with '187 SMED for below details.

5-1. Transformer change AC to DC to 15 Volt 2 Amp DC current to power LED or other and USB port.

This is not workable for the Ivan's because 15 Volt DC is too high and will damage the be-charged items or create the Overheat so need get help from IC or more circuit-inside or DC-to-DC circuit to make $2^{nd}$ time voltage change or adjust so can give USB charging-ports export-end for minimum 1.0-5 Amp or higher current at DC 5 Volt.

So the '187 SMED 15 Volt DC just to supply power to the Plurality of LEDs and cannot charged other be-charged 5V batteries because too high voltage and too small 2 Amp current which cannot share for LED light and USB Charging-port need minimum 1.0-5 Amp current at the same time.

5-2. The '187 SMED not teach the USB ports is Quickly Charging-port min. has 1.0 Amp Charging capacity at the DC 5 Volt and how to share the 2.0 Amp current for both LED and Quickly charging-ports need minimum 1.0-5 Amp.

5-3. The '187 SMED not teach any Quickly charging capacity and details to delivery from USB port to Be-charged items.

5-4. The '187 SMED not teach the 2nd circuit-inside or IC or DC-DC circuit which incorporate with the Transformer's circuit-kits or Transformer's circuit-inner inside the Outside Transformer housing or inside the lighting housing.

5-5. The '187 SMED not discuss USB charging-port at DC 5 Volt and Connection for Be-Charged items. The USB-port 30 distribution the current to what purpose for 15 Volt DC current this too dangerously to use super high voltage 15 Volt DC to charge 5 Volt batteries of the said be-charged items which is not meet US safety regulation by the USB-Charging port requirements including UL or ETL or other test lab. not like current invention details describe all USB Charging-port at DC 5 Volt with Min. 1 Amp to 5 Amp has safety authority certifications to charge the Be-charged device Energy storage unit or assembly so can let be-charged item can operate.

5-6. The '187 SMED transfer 15 Volt 2 Amp DC current which SUPPLY power to LEDs or others, this is not a current invention discussed to charge Be-Charged items such as the iPad which need 2.1 Amp or higher to charge properly. SMED 15 Volt not only too risk for Too high voltage to charge the Be-charged inside batteries but also has too few current to charge single one piece iPad, it is impossible to charge iPad or iPhone at same time which current invention did teach for any combination for higher amperage needed such as 2.1 Amp, 3.1 Amp, 4.2 Amp. 2.4 Amp, 4.8 Amp and all meet the safety standard for USB Charging-port has 5.0 Volt DC range for output voltage and not harm to other be-charged device which inside battery is 5.0 Volt range.

5-7 The '187 SMED lack of the $2^{nd}$ or more circuit-inside inside the Device as current invention. The $2^{nd}$ or more circuit-unit which may has $2^{nd}$ transformer because if need to SUPPLY ANY LIGHT SOURCE, it may need one Big Power output such as 5 VOLT 5 Amp for Plurality of LEDs Including color changing LEDs (White LED 20 pcs plug Warm white 20 pcs) so need one transfer as the '187 SMED needed. But also need to have current to the said USB Charging-port(s) which may need 5 Volt 4.8 Amp so one transformer is not enough and not good to supply 2 applications. So the current invention need $2^{nd}$ or more circuit so can have $1^{st}$ Circuit-inner to supply the USB Charging-ports and $2^{nd}$ or more circuit-inside to supply current to other application including plurality of LED, Super Big power consumer CFL, Energy saving bulb, LED bulbs, time display (May use separated batteries), or Controller need such as IP cam, motion sensor, IR for dim light help IP cam, wireless communication, motion sensor all these other added functions.

6. US Prior art: U.S. Pat. No. 8,758,031 Cheng et. taught the inside wall USB charger device which is not same as the current invention. Also Cheng's filed date is Jul. 23, 2012 which is too late than current inventions. Also, this is for the Power Box inside wall has USB charger. Not same as current invention.

7. US prior art: U.S. Pat. No. 7,742,293, U.S. Pat. No. 8,116,007, U.S. Pat. No. 8,432,667 Strauser teach the music player has pedestal support or foot to put ground The exemplary audio device (system) 10 has a system console 24 supported by a pedestal 20. The system console 24 typically has controls (e.g. volume, play, stop, etc.), displays and indicators. In this exemplary system 10, music or karaoke content comes from a digital music player 80 that is inserted into a cradle 81 (see FIG. 8) and connected to audio inputs 99 of the exemplary system 10. Even Strauser had teach the USB plug to powered the music-player as below content; In a preferred embodiment, the cradle 81 is stepped as disclosed in the parent application, "DIGITAL MUSIC PLAYER CRADLE ATTACHMENT," Which is included by reference. Thereby, the cradle 81 supports a large variety of music players 80 of varying sizes and shapes. In such, the music player 80 sits in a cradle 81. Power is provided from a power port (e.g. USB port) 21, into which the power cable plug 82 (e. g. USB plug) is connected to provide power to the music player 80. But it is different with current invention for (1) not desktop items because pedestal 20 for ground installation (2) not people hand reachable distance to charge the other electric device furthermore need to walk to far distance which more trouble than bend body to get power from power strips or outlets (3) No any light source to offer indicator light or any illumination (4) the music player (80) it do not supply the power to other device which is different with current invention is music device has built-in circuit and transfer input current by circuit-inside or IC or DC-to-DC circuit to arrange or adjust to get DC 5 Volt to charge the other electric device. So this is not same as current invention for desktop definition and people will stay for a while to charge the other device.

8. U.S. Pat. No. 8,899,797 which for has USB port install on the movable (Movable parts & accessories or Organizer, Or Addable parts & Accessories).

(may add the USB-unit or USB-Module or Outlet-unit or Outlet-Module on the MOVEABLE or ADDED parts of Desk lamp)

The '797 who is filed on Aug. 26, 2012 after Co-inventor's U.S. Pat. No. 8,783,936 (# GGG-2011) Public date on Dec. 15, 2011. and '797 patent has one prior filed and abandonment as below because it adaptor the phone's custom-pin plug to connect with phone female custom-pin end to build the electric and audio signal delivery, so this is not like the current invention has all USB-port which is female USB receiving ends on the desktop item and though the male-plug kits to of USB wire which has male-plug ends on 2 ends and one end connect with Desktop female USB port and other male plug end inert into the be-Charged device.

Hereof, The comparison for the 2006-020-9530 as below:

1. '9530 has bulb-socket so it is not the Built-in LED lamp. This maximum can add LED bulb Lamp device.

Fact: Column (0005) Line 10

A terminal housing is disposed relative to the neck second portion, a bulb socket including a seat portion is attached to the terminal housing, and a shell portion of the terminal housing is shaped to receive the base of a light bulb.

2. '9530 The Transformer and Bulb-socket in parallel connection. So the light source is get 120 Volt current which is not built-in LED lamp device 3. Fact Column (0006) The lamp support may also house a transformer electrically coupled to the power cord in parallel to the bulb socket.

3. '9530 The $2^{nd}$ socket on the edge of the support or base is Custom Pin-Out, not regular USB charging-port so only can charge 1 model of phone as Contact (44) both all for Customer Pin-Out design. This is limited for one and ONLY ONE item can be charged.

FACT [0007] Alternatively, the lamp may include a second socket disposed on the support, the socket having a first end directed internally of the support and coupled to the speaker and a second end positioned externally on the support for connecting to a media device compatible cable.

4. '9530 No any wire from charging contact (44) or outside socket (50) needed while charging the phone. Because the contact (44) or Outside socket (50) both is custom pin-out construction and the phone just directly plug into this Custom Pin-Out can directly charger . . . . This is only limited one and ONLY ONE phone can be charged. Not like Ivan's use common USB-Female-receiving end and Charging wire's USB insert male-plug to deliver the current and the though charging wire's other ends to connect with the electric or digital device.

The audio output cable (17) though Round Plug (17a) to transmit the data to speaker (15) (15a), Audio Output cable (17) one end to Music media device (100) and other end to Speaker (15a) (15b)

FACT [0019] As illustrated in FIGS. 1 and 2, an audio output cable 17 is electrically connected via a plug 1711 at one end to each of speakers 15a and 15b. As illustrated in FIGS. 2 and 4, the other end of audio cable 17 may be fed through an orifice 19 in support 12 and be operable to connect, for example, to the headset jack or other audio output terminal of media player 100 as indicated. Alternatively, as illustrated in FIGS. 1 and 3, the orifice 19 may house a connector (not shown) for plug connecting to a plug 17b of output cable 17

5. '9530 do not has built-in LED light source, only can install the LED bulb at the bulb-base. Not like the co-inventor's (3) issued patents or co-pending case has LED built-in as light source, No Bulb-Base at all.

FACT☐ (0021) line 10 The light source 24 (e.g. incandescent bulb, halogen lamp, Fluorescent bulb, or one or more LEDs) is mounted in the bulb socket 20 and positioned in a plurality of positions relative to the support 12 by arrangement of the Flexible neck 14.

6. '9530 The contact (44) is Custom Pin-Out type which only can charge one and ONLY one model of the phone. Also, the Recess Slot which also become Big limited to fit one and ONLY one phone.

FATC (0025) As illustrated in FIG. 2, the recess 42 is provided on the top surface of the support 12 for receiving the media player 100. A plurality of contacts 44 are formed at the base or on a Wall of the recess 42.

7. '9530 Only can charge one and ONLY ONE phone because (A) Recess (42) size is fixed (B) The contact (44) need align precisely to the phone contact so can charge one and Only One. Not like Ivan the charging port is common USB-Port!!

FACT☐ (0026) Recess 42 is shaped to snugly receive a lower portion of media device 100 so as to align or matingly couple electrical contacts 46 on the media device 100 with contacts 44 of support 12, and thereby act as a socket for media device 100. Contact between contacts 44 of support 12 and contacts on media device 100 (not shown) for example may permit a rechargeable battery housed wholly within media device 100 to charge. Contacts 44 and media device 100 contacts are adapted to matingly couple with each other so that DC voltage can be supplied to the rechargeable battery of media device 100 for charging through the coupled contacts 44 and media device 100 contacts. In addition, if the media player 100 includes audio output contacts in proximity to the charging contacts, ones of coupled contacts 44 may be connected to speakers 15a and 15b via an internal cable (not shown) as an alternative to audio output cable 17.

8. '9530☐ The LEE unit only can charge one and ONLY One phone and the charge contact all is Custom Pin-Out type. The current invention's items have USB-port which can work with any USB-Port charging wires to connect with the other electric device and digital device.

FACT [0027] In accordance with an alternative arrangement of the present invention and with reference to FIG. 4, a charging circuit is excluded from lighting apparatus 10, and contacts 44 are electrically connected to a socket 50 disposed on an exterior surface of support 12. Connection between contacts 44 and socket 50 are provided through internally disposed cable 51.

9. '9530 LEE use custom Pin-Out construction on the contact (44) and Outer socket (50) which same as LEE Example iPod© wires for custom pin-out so can fit and charge one and only One phone . . . . Not like the other end on the computer as USB-port which Ivan patent claimed.

FACT☐(0027) Line 2 Socket 50 is adapted to inter face with the charging and/or data cable associated with media player 100. For example, an IPod media player sold by Apple Inc. typically employs a cable to connect the IPod to a computer via the computer's USB port. This cable has a custom pinout on one end which connects to the IPod device and a USB connection on the other end Which mates with the USB port on a computer.

10. '9530 LEE device can transmit BOTH DATA and CHARGING. This is not happen at Ivan item because Ivan item only has the CHARGING FUNCTION. This is not same on basic charging of charger device. So this is totally different with Ivan's CHARGER patent.

Fact☐(0027) Line 14 to 19 The cable allows both transmission of data between the computer and the IPod and charging of the IPod's internal battery through the USB port on the computer.

11. '9530 LEE device cable is associated audio media device & get power from the inner charging-circuit and get power from CUSTOM PIN-OUT contact (44) or Outer socket (50)☐ This is totally different with Ivan's can charge and ONLY CHARGE many different electric or digital device. Not one and ONLY one as LEE claimed and details description for AUDIO MEDIA DEVICE (100).

FACT☐(0027) Line 2 Socket 50 is adapted to inter face With the charging and/or data cable associated With media player 100.

=SO From Above (11) points different with LEE (2006-020-9530), The current invention any issued or co-pending filing no any same or similar with LEE's '9530. Furthermore, the '9530 on 2006 is no charging capability over 1.0 Amp as wiki report shown all the history and data so the charring capability and Not allowed the Digital or electric data to delivery on old date 2006, so that is not like current invention for quickly charge USB Charging-Port as above discussion and wiki data.

Also, The (2006-020-9530) for contact (44) and Outer socket (50) has below text;

The said USB receiving end (USB port) is one end of USB-Charging cable which same as all laptop computer USB receiving end, not USB custom pin-out, not USB mini, Not USB compact, Not USB other name which is the other end of the said USB-Charging cable which only fit for limited number of the electric or digital device.

9. US abandonment public prior art US 2009-006-7161

The Foldable mirror set is not Desktop installation. That is travel unit not let people to install on desktop surface always.

The Power from the Computer and which is not quickly charger (2010 just had final definition for USB charging ports has min. 1 to 5 Amp) and has very limited current less than 500 ma not like current invention has minimum 1.0 Amp up to 5 Amp for definition of the USB Charging-Ports release on 2007 and update on 2010.

'161 Nogota (Column 015 line 8 to 11) The electricity source of the light-emitting element 3 provided in the upper cover 1 is supplied by means of connecting the circuit unit 31 to a lead 4, connecting the lead 4 to the USB port terminal 41, Also, the computer USB is not charger into the Foldable mirror into foldable mirrors' internal rechargeable battery. The Computer is SUPPLY the current to the foldable mirror while the USB Male plug (41) of the wire (4) from the foldable mirror (no any be charged items has the USB male plug on the device) into the computer ports and has power. Not charging into rechargeable battery and storage inside the rechargeable ready to use. This is total different because the current inventor has (1) The current invention said the desktop item has its own AC power source which is connect with desktop housing, The electricity source of the light-emitting element 3 provided in the upper cover 1 is supplied by means of connecting the circuit unit 31 to a lead 4, connecting the lead 4 to the USB port terminal 41, and connecting the USB port terminal 41 to an electronic apparatus 5 which is capable of providing a power supply. (Column 15 line 9-13) The electricity source of the light-emitting element 3 provided in the upper cover 1 is supplied by means of connecting the circuit unit 31 to a lead 4, connecting the lead 4 to the USB port terminal 41, and connecting the USB port terminal 41 to an electronic apparatus 5 which is capable of providing a power supply. '161 Nogota get power from computer 5 which not from AC power source as above FIG. 3A or FIG. 3B (2) '161 Nogota (Column 015 Line 7 and line 8) The circuit unit 31 is provided with one or a plurality of light-emitting elements 3. Which means Nagota do not have any circuit for Quickly USB Charging-port which has minimum 1.0-5 Amp big current arrangement (3) '161 teach (Column 18 line 8 to 11) Alternatively, one or a plurality of USB insertion slot terminals 42 can be provided to allow for the connection of external digital element(s) 6, thereby achieving an effect of expansion slot(s). which is not a USB charging ports for digital element and Nagota did not teach how to get the power from circuit 31 and any relation for current type or voltage or amperage because Nagota claimed the light source can be LED or incandescent bulb but from Computer (5) get into is DC current which supply to LEDs. But Nagota claim the LED can be incandescent (AC light source) so it is big question for this products is not existing basing on the '161 conflict description. [0017] As shown in FIG. 1 and FIG. 2, one or a plurality of light-emitting elements 3 can be provided at the insides of the upper cover 1 and the lower cover 2. The light-emitting element 3 can be a LED or bulb.

The foldable mirror had no any internal transformer to change incoming AC current to DC current.

The foldable mirror had no outside transformer get power from outlet AC power source. So this prior art is nothing to do with current invention.

Hereof, To clear make definition for the above discussed many type of the Chargers and each type has its own USB or Outlet specification such as USB-1.0, USB-2.0, or new standard for USB-3.0 or Outlet for 1,850 Watt (for desktop lighted mirror has the USB-charging ports and hair dryer AC outlets), 1,650 Watt (for regular AC outlets not for hair dryer or heater use) as convention market available type which all fall within the current invention scope and claims but these specification is well known and not related to the current invention's parts-name definition, as below:

1. (#U-1)=USB-unit Charger: The Unit means it is an individual charger has only charger purpose to have one input-current and passing though inner own circuit to make input current change to one output current to charger other device from its own USB charging-port(s). This unit can be housed or without any hosing and install within the said desk-top housing and all live-wired or electric-carried parts & accessories not touchable by people except the USB-port(s). Here said CHARGING purpose is to has higher electric voltage from circuit and overcome the be-charged energy storage unit such as the rechargeable batteries so the energy storage unit can be charged and supply the power to the be-charged device's circuit to use. NOT directly from USB Charging port to SUPPLY the other device DIRECTLY to the Circuit (lack of Energy storage unit) so can supply power for other device has electricity to make operation. The current USB Charging-port is to Charge only the Energy Storage means, not directly to SUPPLY POWER to other device (lack of energy storage unit).

Also, The current invention's USB-Charging port only take 1 and only 1 of the input power or current and passing through inner circuit to come out the DC current on desired voltage and amperage. It cannot have more than one different input current such as AC or DC current as input current or it will be totally destroying the output current because inner circuit is fixed for one and only one current specification.

Some applications the USB-Unit is just a USB receiving port which connect with the outside housing's transformer, adaptor, inventor, converter which has its built-in circuit to change from AC power source to DC current and from outside housing into the USB conductive receiving-end allow the inserting USB male-prong to insert to deliver the DC current. =>This kind of USB receiving port also is a USB-Unit.

2. (#U-2)=Outlet-unit charger: The unit it is an individual POWER SUPPLIER device and only supply power not CHARGE device which has outlet-receptacle(s) which can receive the other device's prongs to deliver or supply the AC current from the OUTSIDE Housing's outlet-unit power source though the outlet-unit's port(s) conductive piece assembly to other device's prong to get into other device's circuit to power other device.

This unit can be housed or without any hosing and install within the said desk-top housing and all live-wired or electric-carried parts & accessories not touchable by people except the Outlet no electric carried outside parts (s).

3. (#U-3)=USB-Module Charger: This module is not a single USB-Unit Charger. It will be any combination for any number of the (aaa) USB-Unit(s) or/and (bbb) Outlet-unit(s) has its own number of the USB-port(s) or/and Outlet-port(s) to connect with other electric wires or USB charge cable and by the said wire or cable plugs to plug into electric or digital data device's female receiving-port which may has all kind of custom-pin construction in Type A, Type B, Type C so can charge by USB charging port(s) for supplying the DC or/and by the Outlet-unit(s) for supplying the AC current to other devices(s).

This unit can be housed or without any hosing and install within the said desk-top housing and all live-wired or electric-carried parts & accessories not touchable by people except the non-carry electric parts of the said USB-port(s) and/or Outlet-unit(s).

4. (#U-4)=Sealed-unit: This is a unit which has desired combination for any number of USB-unit(s) or/and outlet-unit(s) arrangement or combination and sealed or housing into one piece of the housing, compartment, space, container and the related circuit(s) and construction have to pass each country's required related safety standard(s) and get test labs' certification for this sealed unit or construction for the desktop item. The sealed unit only also can pass the related safety standard and get safety certification by itself of USB or/and Outlet sealed unit which not including the other housing parts or accessories non-related to the USB or Outlet.

This sealed unit any live-wire or electric-carried parts & accessories have to sealed or housing or enclosure within the housing, desktop items, container, space so can pass the US Safety standard requirement(s).

5. (#U-5)=Universal Charger: This is charger which has finished housing and electric-contactor such as prong means, or wired, or quickly-connector(s) which not only can incorporate with the said desk-top items but it also can use for other applications. One of preferred embodiment is market available USB-2.1 Amp Charger has 3 USB-ports with fixed or foldable traveling prongs. This can install within the current invention desk-items housing by wired or outlets or conductive piece assembly and it also can take apart from the desk-top item's housing and carry with people to plug-into Wall outlets anywhere to charger the computer, communication, consumer electric items or any electric or digital data devices while prong means plug-into outlet on wall or power strip's outlets. This is definition for universal charger for current desk-top items.

6. (#U-6)=USB female receiving means on the desktop items=It equivalent to (USB-Charging-ports released on 2007 and upgrade on 2009) to receiving the USB male plugs from USB-wire, USB-cable which has 2 male plugs on 2 wire/cable ends. One is for Type A and one end may for Min-USB or Micro-USB or other custom-pin construction which are same as be-charged device's USB-Female receiving port so can though the USB wire or USB cable or Jump cable or Bridge cable to build the electric current delivery from the desktop USB Charging-ports to charge the other device's inner energy storage items which is rechargeable battery, recharge battery assembly or any type of energy storage device which offer the electricity to desktop item electricity.

The current invention USB Charging-port has big charging capacity min. over 1.0 Amp up 5 Amp or more which as above discussed USB Charging-port standard release on 2007 and upgrade on 2009. Most important is current invention USB Charging-port only for Charging function and DO NOT have any electric data delivery. Or/This will slow down the charging speed or make overheat or whatever bad for the said current invention.

7. (#U-7)=Outlet female receiving piece=It equivalent to (Outlet port) to receiving the other electric or digital data device's prong means so can deliver the AC current from outlet-port(s) through the conductive piece or assembly to the other electric or digital data device inserting prongs directly without passing through any electric controller or circuit whenever the prongs insert into the said Outlet female receiving piece.

8. (#U-8)=Desk Top items has more than one functions: Which is a product has LED or other light source which the said LED or other light source including the LED as an indicator light to show charging or charging status, not only limited for LED(s) is a LED light source for supply LED light beam for illumination. The desktop has more than one electric function which means Not only for illumination but also has $2^{nd}$ functions which can make people eye, ear, nose, mouth, skin to see, hear, smell, eat, drink, feel or is a video or an audio or an image or a sound related things. The said $2^{nd}$ function is existing products which available at market for people to buy and put on desktop or any surface where people will stay, work, sleep as above discussed.

The said other light source which including the Bulb, Incandescent bulb, CFL, Energy saving bulb, Florescent tube, PL light or any other light source available from market place.

9. (#U-9)=Base of light device: The base including the adjacent pole, bar, stand, step, curved surface, edge, contour or all the surfaces for the base of the light device except the light source and the shade. The said USB-port, USB-unit, USB-module, or Outlet-port, Outlet-unit, Outlet-module, or Sealed-unit, or Universal-unit, or rotatable module can fit within or install or attached or overlay or underlay on anywhere of the said base of the Light device which may has any kind of the light source including Bulb, Incandescent bulb, florescent, LED Bulb, CFL, LED tube, EL, OEL, organic EL.

The current invention also including the Base of Light Deivce has built-in USB-Charging ports and this base or base has built-in light source can sell individually at the market place.

These above (9) details description has more clear for some parts & accessories which use for current invention. It is appreciated that all above listed, discussed, co-inventor pending or co-pending or issued prior arts or embodiment, details, specification, arrangement, constructions has its replaceable, alternative, improvement or equivalent functions should still fall within the current invention scope.

BRIEF DESCRIPTION OF THE DRAWING

The desktop system is illustrated in the figures of the accompanying drawings which are meant to be exemplary and not limiting, in which like reference numerals are intended to refer to like components, and in which:

FIG. 3A and FIG. 3B is a working diagram for the power source, USB Charging ports, light source, Outlet-unit with related circuit-kits, circuit-inner, more than on circuit-inside & IC & DC-to-DC relation of the base unit of FIG. 1 to FIG. 13.

FIGS. 32A1, 32A2, 32B1, 32B2, 32B3, 32B4, 32C1 32C2, 32C3 32C4, 32C5, 32C6, 32C7, 32D1, 32D2, 32D3, 32D4 show preferred examples of a USB-unit, USB-Module, Outlet-unit, outlet-module, sealed-unit, Universal unit and all related parts for reference.

DETAILED DESCRIPTION OF THE PREFERRED EMBODIMENTS

Figure 1:
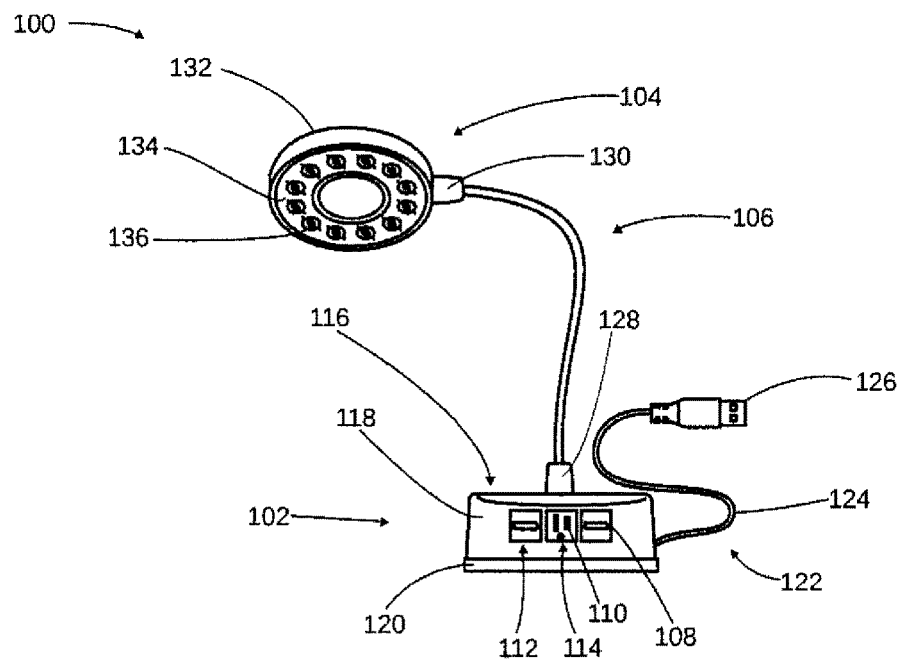
FIG. 1 is an isometric side view of the desktop system in a first embodiment.

The present invention provides improvements over the sealed-units disclosed in U.S. patent application Ser. Nos. 12/502,661, 12/292,580, 12/566,322, 11/498,874, 11/527,629, 12/622,000, and 12/624,621 has below details filing and issued date (#I-1) Ser. No. 12/502,661 filed on Jul. 14, 2009, Jan. 1, 2013 issued (Later than parent filing date)

(#J-2) Ser. No. 12/292,580 filed on Nov. 21, 2008, Nov. 6, 2012 issued (Later than parent filing date)

(#M-1) Ser. No. 12/566,322 filed on Sep. 24, 2009, Pending case (#K-06) Ser. No. 11/498,874 filed on Aug. 4, 2006, Pending case.

(#L) Ser. No. 11/527,629 filed on Sep. 27, 2006, Oct. 1, 2013 issued (Later than parent filing date)

(#HH-09) Ser. No. 12/622,000 filed on Nov. 19, 2009, May 17, 2013 issued (Later than parent filing date)

(#II-09) Ser. No. 12/624,621 filed on, Nov. 6, 2012 issued (later than parent filing date),
which have uniform dimensions and shapes to fit into the same uniformly dimensioned compartment and thereby enable the universal sealed-unit to fit into a variety of LED light devices. This invention has more features, functions, and effects to allow people to buy any electric device or digital data device with the additional convenience of including outlet-unit(s) to supply electric power to other device(s), or USB-unit(s) to supply different types of electric power to other device(s). The current invention uses a universal module which can have any combination of the following parts or accessories, including: circuit, conductive piece, contactor, receiving ends, output-ends, input-ends, electric parts and accessories, prong(s), rotating kits, cable with a plug, cable with USB-plug(s), printed circuit board, flexible printed circuit board, wires, a cable, a digital data cable, a conductive piece, or any related electric parts or accessories available from the marketplace to get electric power from a prong-cable, USB-cable has USB-plug(s), prong(s), or USB-receiving port has all kind of custom-Pins, outlet-unit's or USB-unit's receiving-end(s) (hereafter as outlet-ports or USB-ports) and supply power to a variety of electric devices.

The universal module has a same power-supplying function as the "sealed-unit" for the "LED light devices" described in the inventor's issued U.S. Pat. No. 8,342,732 (#I-1), U.S. Pat. No. 8,305,846 (#J-2), U.S. Pat. No. 8,231,246 (#EE-1), U.S. Pat. No. 8,002,456 (#GG-08), U.S. Pat. No. 7,726,839 (#V-08), U.S. Pat. No. 7,726,841 (#W-08), U.S. Pat. No. 7,726,869 (#Y-08), U.S. Pat. No. 7,618,150 (#S-07), and U.S. Pat. No. 7,722,230 (#AA-08) and U.S. patent application Ser. No. 12/566,322 (#M-1), Ser. No. 12/073,889 (#X-08), Ser. No. 12/894,865 (#T-1), Ser. No. 12/003,809 (#V-08) or the "outlet device" of the inventor's U.S. Pat. No. 7,824,185 (#BB-08). Furthermore, the interchangeable "sealed-unit or battery-pack" of the inventor's U.S. patent application Ser. No. 12/622,000 (#HH-09), Ser. No. 12/295,562 (#HH-1) also utilizes concepts shared by the present invention.

FIG. 1 is a front view of a desk top item (100) with LED (136) and USB-unit(s) (112) has USB Charging-port(s) (108) as above discuss specification released on 2007 and upgrade on 2010 which can have charging capacity minimum 1.0 Amp to 5 Amp or higher however The USB Charging-port(s) do not have digital data or electric data delivery while need such big and quickly charging speed. So before 2007 all the charging from the out-of-date USB port is too small current carry and only can supply 500 ma or lower charging capability and may has the overheating for fire risk. So from 2007 to 2010 come out the current invention's said USB charging-ports has more strictly for USB Charging port(s) material and all details so can allow to quickly charging from minimum 1.0 A to 5.0 Amp and from 2007 to 2015 come out more higher for 2.1 Amp or 2.4 Amp so can combine to big current charging including one USB-unit, USB-module, Sealed-unit, Universal-unit, or USB module which same as USB power station can have 4.8 Amp, 7.2 Amp, 9.6 Amp for public area for many people use at same time.

The current inventions disclosure the time table and USB development on the above discussion to make clear different for USB Charger limitation before 2007 and also make big difference for any USB Charging-port preferred only has Charging-Function and not have the Digital/electric data delivery while for USB Charging ports if want to get safety and quickly Charging capacity as above reports shown evidence.

From FIG. 1, the USB-Unit(s) (112) has USB Charging-ports (108) for charging the energy-storage unit or assembly including the rechargeable batteries (not shown) inside the other electric or digital data device(s) according to a first preferred embodiment of the invention which has 2 USB-units (112) and 1 outlet-unit (114) at the front of the base for easily use by consumer some applications put on back is not practical and not too many trouble. The location for the USB-Unit(s) or Outlet-unit(s) preferred to arrange on front of the desktop items' front housing so people can easily to reach without move or turn direction of the items for every time to charge the other device(s). However, for Outlet-unit(s) or Outlet-Module(s) can put on back because it ONLY SUPPLY power to the other electric device(s) such as printer, scanner, Fax machine which can just one time plug and not every-day need to plug into the Outlet-unit or Outlet-Module. The laptop carry computer need every day repeat use Outlets-Unit or Outlet-Module so need to put on front or sides for easily operation.

The first preferred embodiment (100) is a 12 LED USB light powered by a USB plug-wire (122) (124) (126) which can be a USB-plug (126) to connect with outside transformer (226T of FIG. 3) or AC-Plug (226AC of FIG. 3) has wire from different outlet to get AC power source.

$1^{st}$ type: The USB-Plug Wire (122X)(124)(126) can connect with the circuit-kits (226-2 of FIG. 3) which outside the desk lamp housing has at least one of the transformer (226T of FIG. 3), or adaptor, or invertor, or converter to change the outlet's AC current into $1^{st}$ DC current at outside circuit-kits (226-2 of FIG. 3) housing and outside circuit-kits (226-2 of FIG. 3) housing has the USB-receiving port(s) (226-4 of FIG. 3) to accepted the USB-Plug-wires (226-5) to build the $1^{st}$ DC current delivery from Outside circuit-kits (226-2 of FIG. 3) housing to the Desk Lamp housing (120). Or $2^{nd}$ type: The AC-Plug wire (226AC of FIG. 3) can connect with the AC outlets and get the AC current into the inside desktop housing's circuit-inner (226-6 of FIG. 3) which has at least one of the transformer (not shown), or adaptor, or invertor, or converter to make the input desktop housing AC current to change to 1st DC current and has other electric parts & accessories to adjust and arrange to the $2^{nd}$ DC current and deliver the $1^{st}$ or/and $2^{nd}$ DC current to said USB Charging-port(s) or/and to LED light source.

The said both $1^{st}$ type or $2^{nd}$ type of USB-Plug wire (122) (124) (126) or AC-plug wire (226AC of FIG. 3) both has the said 2007 specification quickly charger USB charging-ports and includes an adjustment arm (106). Hereof, the 12 LEDs (136) is offer the area illumination which belong to the desktop lighting existing functions.

FIG. 1 is a front view of desk top items (100) with built-in LED light source (134) having current invention definition for USB-unit(s) (inside not shown) has USB charging-port(s) (108) (112) release spec which can charge energy storage unit or assembly up to 1.0-5 Amp or higher which USB Charging ports only can charge the energy storage unit or assembly without any digital data transmit functions. The $1^{st}$ embodiment (100) can charge rechargeable batteries inside other electric or digital data device(s) minimum from 1.0 Amp or higher as definition of USB Charging-ports and, according to a first preferred embodiment of the invention, which has 2 USB-units (108) (112) and 1 outlet-unit (114), built-In 12 LEDs (136), and is powered by a USB plug-wire (124) from the AC to DC outside housing transformer (226T), or adaptor (226T), or invertor (226T), or converter (226T) which already change the AC current to DC current from AC outlets which can supply more higher than 1.0 Amp so can work with definition USB charging-port (108)(112) which has min. 1.0 A up to higher amperage after 2007 and reissue on 2010. The said USB plug (126) to connect with AC-to-DC transformer (226T) which has the USB receiving port (108,112) to allow build the electric deliver for new type transformer (226T).

Figure 2:
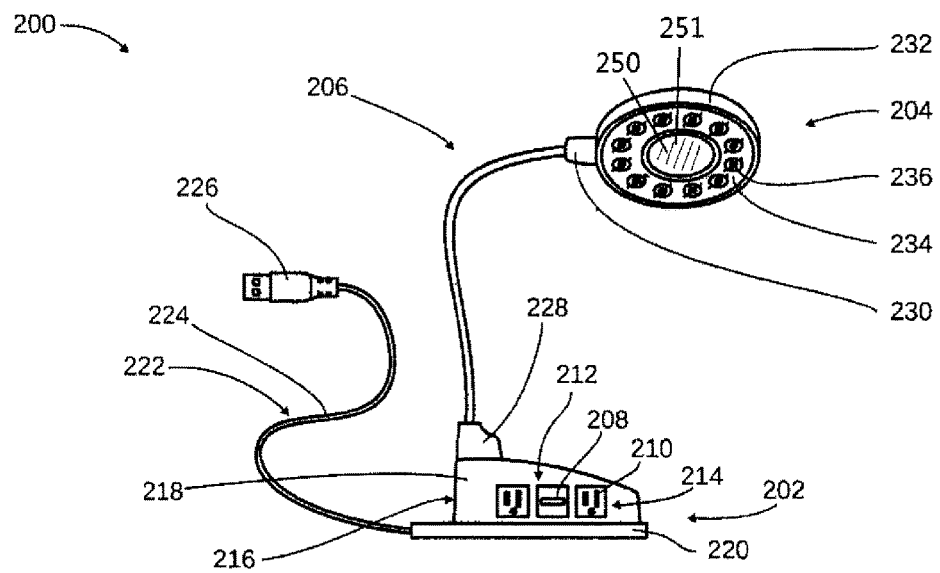
FIG. 2 is an isometric side view of the desktop system in a second embodiment.

FIG. 2 is a side view of the desk top items of the first preferred embodiment, the inner side (250) of the 12 LEDs (236) is a mirror or magnify lens or magnify mirror (251) which can show the image to let people to see or magnify lens make the lighted objects to become super big size to let people can easily read and use the flexible hose (206) to bend to fix distance against the tiny objects to let people not hold by hand for long time.

FIG. 2 is a side view of the first preferred embodiment of a desk top item (200) with LEDs (236) showing 1 USB-unit (212) and 2 outlet-units (214) on the side of the base. The LED means has 12 LEDs (236) in the USB-Plug-Wire (122) (124) (126) as above discussed $1^{st}$ Type prefer model which powered LED light (236) and is powered from the USB plug-wire mean (122) (124) (126) and has USB Charging port(s) (208) to quickly charge the energy storage unit or assembly including rechargeable batteries (not shown) inside the other electric or digital device.

FIG. 3A and FIG. 3B shows the preferred working charter for same AC power source though the different AC-to-DC transformer and though the circuit-kits, circuit-inner get the $1^{st}$ DC power at desired DC voltage and also has the AC current optional arrange to supply AC current to said Outlet-unit or outlet-module. The $1^{st}$ DC current can directly to offer to the LED light source or DC light source or directly to the USB charging-port depend on different consideration. It also can have the more than one of IC or DC-to-DC circuit or more than one circuit-inside to make change or adjust or arrange for $1^{st}$ DC current to $2^{nd}$ DC current or more different DC current to supply to the Built-in LED, LED bulb, EL element, Organic EL element (Or called OEL), or other DC operated IC, added functions.

From FIG. 3A

→This is AC power source connect outside AC-to-DC transformer for $1^{st}$ DC current.

3A-A: (a) The $1^{st}$ DC current is (5V DC)→Directly to offer to quickly USB charging ports and also (b) supply the $1^{st}$ DC current (5 VDC) though the DC-to-DC circuit, or IC, or more than one of the circuit-inside to get $2^{nd}$ DC current at DESIRE Voltage→To make operation for the Built-in LEDs or DC Powered light source or DC powered optional other function(s) and Also;

(c) Optional can add the separated AC wire to supply the AC current to the inside of housing and connect with Outlet-unit or Outlet-module to supply AC current to AC powered related light source, products by prongs.

3A-B: (d) The $1^{st}$ DC current is ANY DESIRED DC Voltage which may higher than USB charging-port(s) DC 5 Volt but good to directly or through DC-to-DC circuit to supply to the DC powered built-in LED(s) or other DC powered electric parts & accessories or elements for desired functions. And Also;

(e) The $1^{st}$ DC current through the IC or DC-to-DC circuit or more than one of circuit-inside to change the si DC current to $2^{nd}$ DC current has 5 Volt DC so can though the change or adjust to give the current to the said USB charging-ports for right USB output-end current to meet Quickly USB charging [ports requirement and Also;

(f) Optional to has AC current which get from AC wires which may inside the custom made special outside transformer (3A-B-T) or is separated AC wires outside the market regular 6, 9, 12, 24 DCV transformer to save the cost to make the special custom made transformer and Also;

(g) OPTINAL to has the $2^{nd}$ AC light source which is not same as the above LED(s) or DC powered light source.

From FIG. 3B

→This is AC power source connect directly get into housing for $1^{st}$ AC current and connect with inside AC-to-DC transformer for $1^{st}$ DC current.

Figure 3:
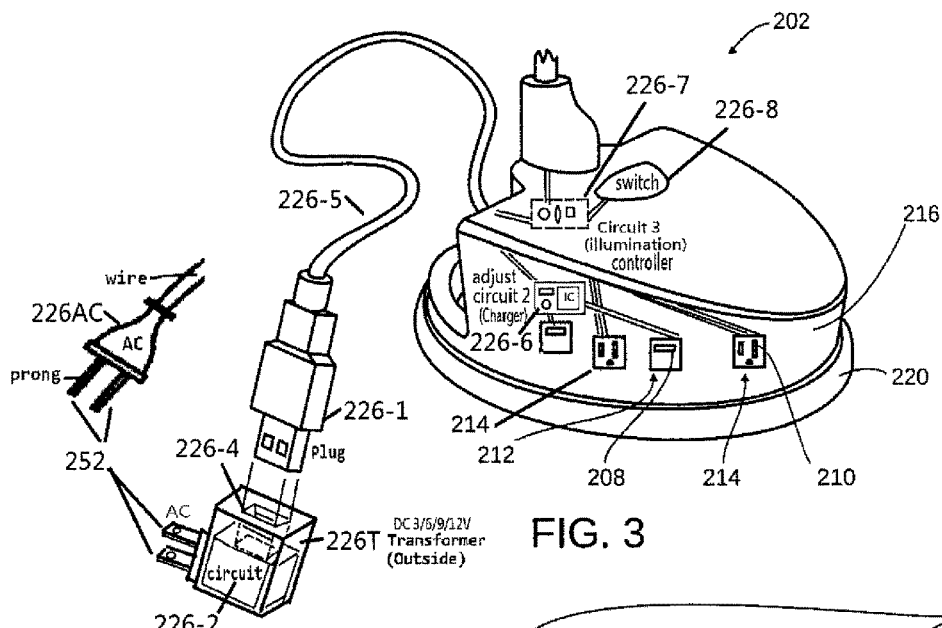
FIG. 3 is an isometric view of the base unit of FIG. 2 in an alternate configuration.

3B-A: (h) The 1st AC current is (120 ACV) though the inner AC-to-DC transformer or more circuit-inside to change or arrange the 1st DC current is (5V DC) →Directly to offer to quickly USB charging ports and also
  (i) The 1st AC current is (120 ACV) may go through the inner IC or more circuit-inside or controller(s) to supply the 120 VAC to the AC powered light source including CFL bulb, Incandescent bulb, fluorescent tube, cold cathode tube, energy saving bulb, LED bulb has screw base or other base. Also;
  (j) Optional has the AC conductive wire to connect with Outlet-unit or outlet-module or universal kits or sealed unit which has built-in AC receptacle kits or assembly.
3B-B: (K) The 1st DC current has higher DC voltage and big Amperage and though the said IC or DC-to-DC circuit, or more than one of circuit-inside help to changed or adjust or arrange to DC 5 Volt so can make USB Charging-port output end has 5V DC current to charge other products' inner rechargeable batteries. Also;
  (L) The 1st AC current is (120 ACV) may go through the inner IC or more circuit-inside or controller(s) to supply the 120 VAC to the AC powered light source including CFL bulb, Incandescent bulb, fluorescent tube, cold cathode tube, energy saving bulb, LED bulb has screw base or other base. Also;
  (M) Optional has The 1st AC current has conductive wires to connect with the outlet-unit or outlets-module. And also,
  (N) Optional has The 1st DC current come from inside housing transformer is higher DC voltage which may from market available existing AC-to-DC transformer which has 6, 9, 12, 15, 18, 24 Voltage to supply power to the DC powered light source or other DC power products or get desired functions. Also;
  (O) Optional has The FIG. 3 shows a first design of a second preferred embodiment (202) of the invention having the outside transformer (226T), or adaptor (226T), or invertor (226T) connect with AC power source which get power from the any kind of outlet by prongs (252) of transformer (226T) or regular Plug & Wire (226AC) and the said desk top item having 3 receiving-ends including 2 USB Charging-port(s) USB-unit(s) (208) or one Big USB-Module (not shown) inside the housing with different power output (2 USB units has 3 USB-ports and 2 outlet-unit has 1 outlet-port) to charge the energy storage unit or assembly by USB Charging-ports (208) or SUPPLY Power by outlet-unit (214) for different electric or digital data device(s), for example 1,000 ma, 2,100 ma, 2,400 ma, 4,500 ma, 6.9 Amp, 9.0 Amp depend market wanted for family or office use need a big charging capacity to charge in short time (D.C. current output from 2 USB-units has 3 USB charging-ports) and A.C. current output from the 1 outlet-unit (214) to SUPPLY charge different electric or digital data device(s) such as an iPhone™ and iPad™ for DC current by USB-unit's (212) USB Charging-port(s) (208) and other device such as laptop computer for AC current by outlet-unit (212) to get the different requirements for charging DC or SUPPLY AC current. Here of the Desk lamp has the light source available from market place for any desire type including bulb, CFL, fluorescent tube, or Energy saving light source, EL or OEL, LED. and all the light source have to install on the inside lamp holder including CFS bulb, Incandescent bulb, or PCB holder.

From FIG. 3 show the more than one circuit-inside (226-6) is a adjust circuit 2 for charger and circuit 3 (226-7) is for illumination or controller and switch (226-8) has plurality of conductive wires to deliver the current from outside transformer (226T) get into the housing (216) and through the circuit-inner (not shown) and more than one of circuit-inside (226-6) (226-7) are Circuit 2 and Circuit 3 to adjust or change or arrange the 1st or 2nd or 3rd DC current to light source an USB Charging ports as above FIG. 3A shown and details.

FIG. 3 a first design of a second preferred embodiment (202) which has 2 USB-unit(s) (212) has USB charging-port(s) (208) to charge the energy-storage units or assembly DC current by the said USB Charging-port(s) has minimum 1.0 Amp and an outlet-unit (214) has outlet-ports (210) to supply the AC current to the prong(s) of the said other electric or digital device. Both has different power type and output to use USB charging-port(s) to charge or use outlet-port(s) to supply different current to the said other electric or digital data device(s).

The USB-unit(s) (212) has USB charging-port(s) (208) which has minimum DC current charging capacity at 1.0 Amp which equivalent 1,000 ma, or higher Amperage such as 2,100 ma or 3.4 Amp or 4.8 Amp, 8.2 Amp, 9.6 Amp or more powerful units to charge the rechargeable batteries inside of the different electric or digital data device(s) such as an iPhone™ and iPad™ that have different requirement for charging current.

The Outlet-unit (214) has outlet-port (210) which get power from the outlet's power source which has unlimited AC current and will go through the conductive material and piece or assembly to supply the power to the outlet-unit (214) at the desktop items housing to the prongs while the prongs of the other electric or digital device insert into the said desk lamp outlet-port(s) (210).

Figure 4:
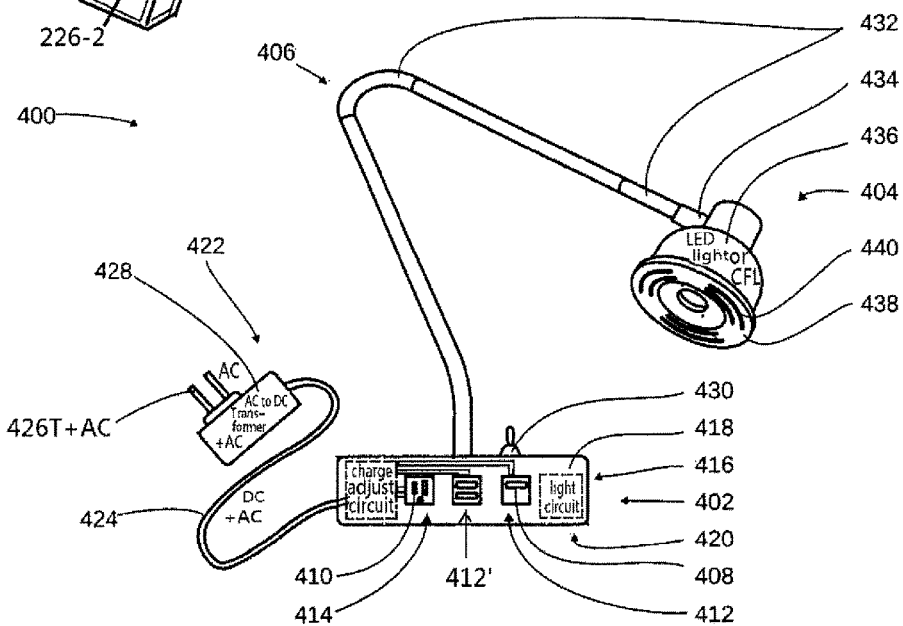
FIG. 4 is an isometric side view of the desktop system in a third embodiment.

FIG. 4 shows a second design of the second preferred embodiment (400), which has 2 USB-units (412) (412') has 3 USB charging-ports (408) here prefer the 2 USB-port unit has 2.4 Amp+3.1 Amp=5.5 Amp and 1 USB-port USB-unit has 3.1 Amp so total has 8.6 Amp can very quickly charge the be-charged products in short time and 1 outlet-unit (414) has 1 outlet-port (412) to allow people to charge by USB charging-port (408) or supply power by Outlet-port (412), for example, DC current from USB Charging-ports (408) for an iPad™, iPhone™, and AC current from outlet-port (412) for laptop computer or other device which can get AC current power from the outlet-unit. The USB-unit get power from outside transformer (426T), adaptor (426T), inverter (426T) to get desired 1st DC current and the outlet-unit get AC power while AC prong (426) connect with wall-outlets and directly deliver AC current same as wall outlets current to outlet-unit (414). Hereof, the Desk lamp is non-LED light source lighting because the outside transformer (426T+AC) is a special custom made model has extra AC conductive wire so can offer the extra AC current into housing and operate the AC power light source including CFL bulb or incandescent bulb or other AC power source or other electric products powered by AC current, or one piece super powered LED light source or plurality of LEDs install on PCB powered by DC current from transformer output-end DC current. The USB charging-port export-end DC 5V get from 1st DC current which may higher than DC5 Volt and though the more than one inner-circuit (charger adjust circuit) (light circuit) or DC-to-DC circuit or IC to make the higher voltage 1st DC current change or adjust or arrange to DC5 Volt so can safety to charge the energy storage device.

FIG. 4 shows a first design of a second preferred embodiment (400) of the invention having the outside transformer (426T+AC), or adaptor (426T+AC), or invertor (426T+AC) power source which get power from the outlet (not shown)

by prongs (426) and the said desk top item (400) having 2 USB-unit(s) (412) (412') with different power output (2 USB units has 3 USB-ports) including 3.4 A from USB-port (412) or 2.4 A from USB-port (412') which has its 3 USB Charging-port(s) and everyone has minimum 1.0 A charging capacity to charge the energy-storage unit or assembly including rechargeable batteries inside of the computer, communication, or consumer electric products including the power bank which has a lot of rechargeable batteries assembly inside. such as an iPhone™ and iPad™ for DC current And 1 outlet-unit (414) has 1 outlet-port (410) has different current and to SUPPLY the AC current into the said other electric or digital data device(s)'s while the prong(s) of other device's insert into the said outlet-unit's receiving port(s) (410). other device such as laptop computer for AC current to get the different requirement. Here of the Desk lamp has the light source available from market place for any desire type including AC powered light source including LED bulb, CFL, fluorescent tube, or Energy saving light source, or DC powered light source including EL, OEL (Organic Electro-luminescent element or light source), LEDs.

FIG. 4 shows a second design of the second preferred embodiment (400) which has 2 USB-units (412) (412') and 1 outlet-unit (414) to allow people to charge DC current power to an iPad™, iPhone™ by the USB Charging port(s) (408), or supply AC power to the laptop computer, or other device by outlet-unit(s) (410) or outlet-Module(s) (410). Both can get power from the USB-unit(s) (408) or outlet-Unit (410). The drawing also shows the differences between the first and second preferred embodiments. All such alternative designs, and any improvements or devices with an equivalent function or that are replaceable by the preferred items will still fall within the scope of the current invention, including variations disclosed in the inventor's other patents and patent applications may also fall within the scope of the current invention.

The difference or variation or replaceable or alternative or replaceable including following parts for current invention;
(a) Light source
(b) Installation location
(c) Installation space, compartment, room, housing, construction
(d) USB Charging-port 1.0 A, 2.1 A, 3.1 A, 1.2 A, 2.4 A, 3.6 A, 4.2 A, 4.8 A, 7.2 A, 9.6 A or any combination for the USB ports
(e) Power source come from: (e-1) AC Plug wire, (e-2) USB plug wire, (e-3) Outside housing Transformer, or invertor, or adaptor, or converter (e-4)
(f) Function of desk top items: The desktop item its original existing function for examples The lighting device offer the area illumination or as above discussed products.

Figure 5:
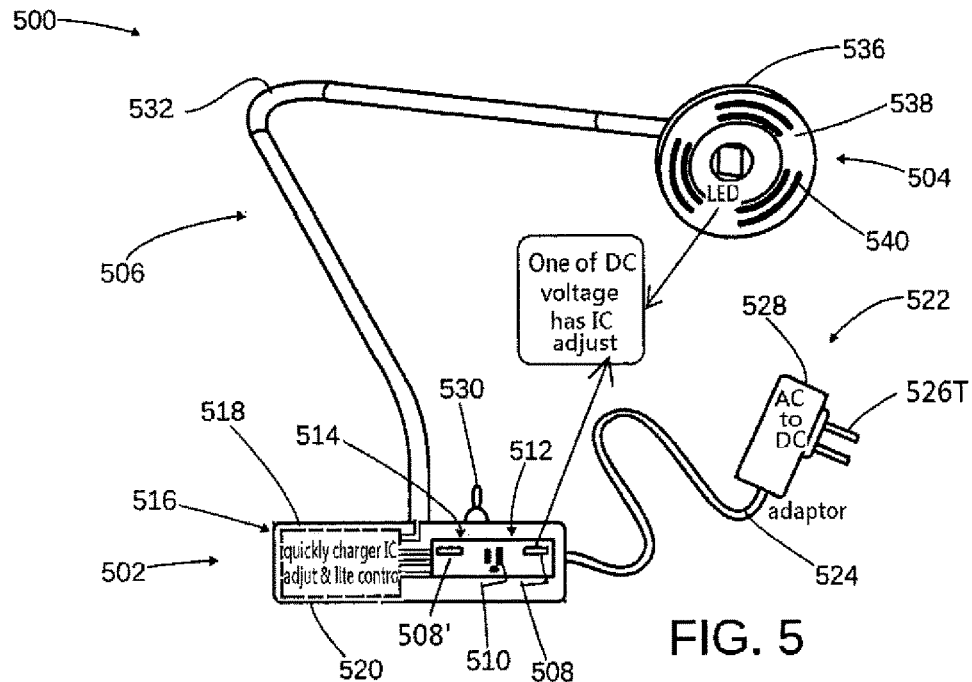
FIG. 5 is an isometric side view of the desktop system in a fourth embodiment.

FIG. 5 shows a third preferred embodiment of a desk top item (500) in the form of an LED lighting fixture with adjustable arms (506) to enable adjustment of the height, orientation, direction, and/or angle of the LED lamp (500) to provide the best illumination. The built-in 1 USB-unit (512) has 2 USB charging -port (508) has minimum 1.0 Amp or higher charging capability here preferred each USB-port is 3.1 Amp so 2 pcs has 6.2 Amp to quickly charger the be-charged device(s) and 1 outlet-unit (512) has 1 outlet-port (514) built into one sealed-unit or one module that has a lower cost than the above-discussed items with a plurality of separated piece of the said USB-units and outlet-units, and is powered by a UL listed adaptor (526T) OR transformer (526T) plugged into a wall outlet that supplies 120 Volt AC current and transfer by adaptor (526T) to $1^{st}$ DC current for USB-unit (510) has 1 USB charging-port (508) or though the more than one of circuit-inside, DC-to-DC circuit or IC to change higher Voltage $1^{st}$ DC to $2^{nd}$ DC current for USB charging-port export end (508) has DC 5V for charger, rather than by a USB plug and wire (not shown) which is out-of-date earlier than USB Charging-ports definition release on 2007 and update on 2010 for charging higher than computer old-USB port's only supply 500 ma and had heat issues and problem. The 2007 and 2010 new USB Charging-ports has minimum charging capability 1.0 Amp up to 5 Amp and Not Allow the digital data delivery while Charging the said energy-storage unit or assembly which may is a rechargeable battery. Any out-of-date before 2007 USB charger is not possible get safety and steady and quickly charger compare with 2007 release and 2010 update for new USB Charging-ports which has non-over heat and has NO digital data delivery while charging.

FIG. 5 shows a third preferred embodiment (500) of a desk top item in the form of an LED lighting fixture (536) with adjustable arms (506) to enable the LED lamp to be moved to a desired height, orientation, direction, and/or angle to get the best illumination to people. The built-in USB-Module which has 2 USB-unit (512) (512') and 1 outlet-unit (514) inside one USB-Module which have a lower cost than other above-discussed 2 separated USB-units (512) (512') and separated 1 outlet-units because they do not need to be made as compact. The desk top item is powered the transformer (526T) or a UL listed adaptor (526T) that receives power from a wall-outlet for 120 Volt AC current rather than the USB plug and wire of the first preferred embodiment. This kind of DC current from outside housing transformer (526T) already changed from AC to DC current can save a lot of work and labor for inner circuit because no need changes AC to DC inside the desk top items housing. The inside housing circuit can be a simple or add other functions such as light sensor, photo sensor, motion sensor, blue tooth, infra-red wireless controller, wireless controller with Wi-Fi, APP software controller, or other wired or wireless operation, color changing, brightness changing, timer, time delay, image display, project image display, optics filter to reduce glare for vision improvement or other added functions, features, performance, effects for people eye, nose, mouth, ear, skin, body to make people more convince to use the desktop items has built-in USB-Unit, USB-Module, sealed unit, universal unit, outlet-unit, Outlet-module as above discussed.

Other features is this desktop items become universal model for all over the world so no need to change any inner circuit just change the outside housing transformer, or invertor, or adaptor, or converter specification and prong(s) specification, then, same desktop items with same inner circuit can sell all over the word.

Figure 6:
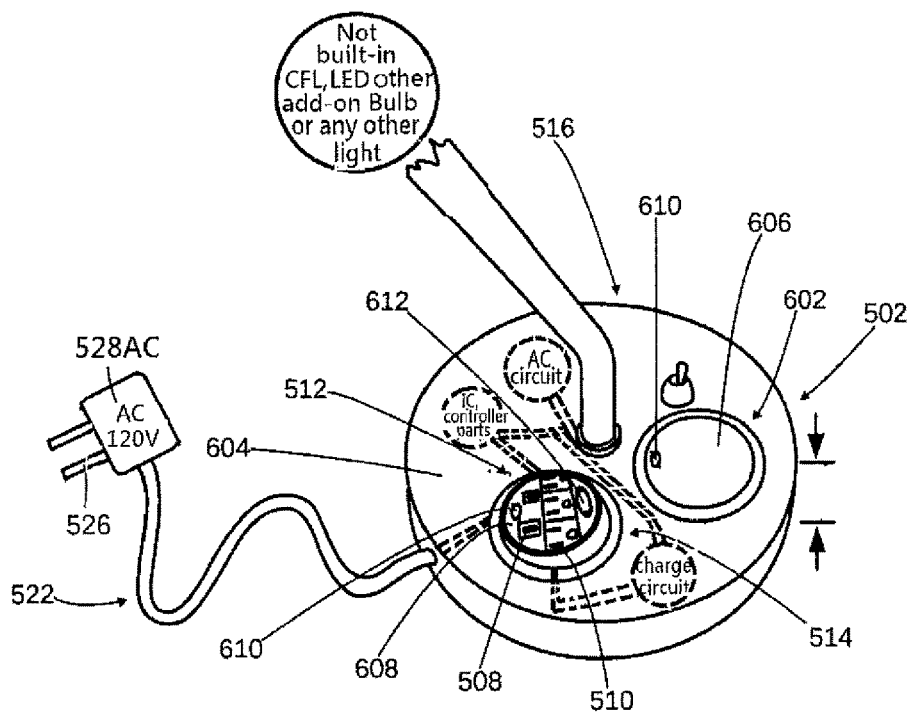
FIG. 6 is an isometric view of the base unit of FIG. 5 in an alternate configuration.

FIG. 6. Shown other preferred embodiment has AC plug & wire (528AC) to get outlets power source and AC current get into housing. The 120 VAC current though the inside housing transformer (Not shown) to get the $1^{st}$ DC current and the $1^{st}$ DC current can be (A) 5 Volt DC current by inside circuit (Charger Circuit) and can directly to USB output-end, OR (B) the said 1' DC current is DC 6/9/12/15/18/24 Volt DC though the inside more than one circuit-inside, IC, or DC-to-DC circuit to change or adjust or arrange the said higher $1^{st}$ DC current out from transformer to become $2^{nd}$ DC 5 Volt current so can safety charge the other electric products. Here of the said Light source can be AC power and get power from inside housing AC conductive wires (AC circuit) to make the AC powered light source including CFL, LED Bulb, Incandescent bulb, fluorescent tube and other AC powered products to proper operation.

From FIG. 6 also shown the base has built-in Rotating multiple surface power station which has the built-in USB-module (510) has 2 USB-unit with 2 USB port (508) preferred for 2 USB ports has 2.4+2.4=4.8 Amp, Outlets-module (514) has 3 outlet-units with 3 outlet-port (512) and has controller (610) (612) to install the preferred motion sensor, touch switch, wireless communication device, Wi-Fi set, APP receiver and code setting device, remote controller, IP Cam or other added function for the said Universal-unit. Module-unit, USB-unit, Outlet-unit or the desktop item(s) while the said Desktop items has much thicker base so can install the said Rotating multiple surface power station inside the thicker housing.

From FIG. 6 shown the wired plug (528AC) has prong (526) has no any circuit inside so can deliver the wall-outlet 120 Volt direct to the base (516) 3 outlets to let people to connect with the desk top laptop, or speaker or lava light or other electric or digital devices which need 120 Volt AC current to operation. The said base not only has rotatable module and but also has additional outlet-unit or outlet-module(s) to allow to charge or supply AC power to the other electric or digital device which need AC current input to make operation. It also can have more outlet-unit(s) up to 1 to N number (N can be any number) as long as the base can fit within the plurality number of the said Outlet-unit(s) so the current invention's desk top items base can replace the market existing power-strips which lay on the ground to supply the same 120 Volt current.

Figure 7:
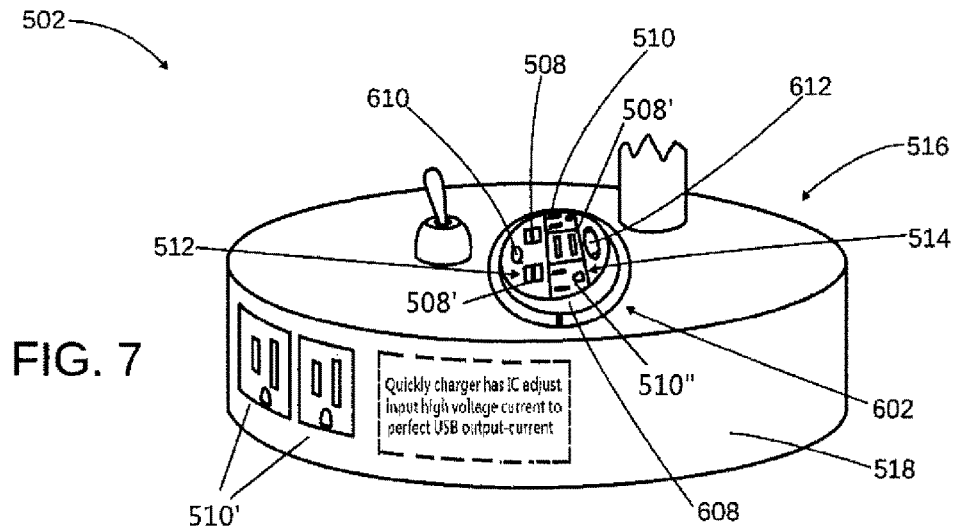
FIG. 7 is an isometric view of the base unit of FIG. 5 in an alternate configuration.

FIG. 7 also shows the fourth preferred embodiment (502), which The big base (518) of the Desk top item has sufficient space within so can install all kind of USB-unit(s) (512), Outlet-unit(s) (510), USB-module(s) (510"), Outlet-module(s) (510'), Sealed-unit (508') controller (610) (612) for all kind of operation for desktop items or products arranged into a rotating or non-rotating multiple surface power station (608) which has number of the said USB-unit(s), outlet(s) and/or Outlet-unit(s), Universal unit has number has relatively universal compartment, or space, or room to fit within, The said such big base (518) of the desk top item (502) can also be powered by wind power, chemical power, battery power, a generator, transformer, adaptor, inverter, inductor, etc. Also the multiple surface Power station (608 of FIG. 6) has the inside IC or more than one of circuit-inside to help or adjust or change the input high voltage $1^{st}$ DC current to become a safety USB charging-ports DC 5 Volt current.

FIG. 7 shows that the base of the desk top item (502) of the first preferred embodiment incorporate with different light source application (Light source is not shown) may be made thicker or higher to accommodate bigger size electric parts and accessories to save a lot of the cost of super compact, slim, or cute size electric parts and accessories. Furthermore, the thicker or higher base (518) can also accommodate a rotating USB-unit(s) or USB-module that can be rotated from a first surface to a second surface so that the first surface of the USB-module will look nice when the USB-unit(s) or module is not in use. Details of the rotating power station (608) or said USB module (608) can be understood from FIGS. 19,20, 21, and 22, the details of which are explained in the inventor's PARENT FILING U.S. patent application Ser. No. 13/117,227 (#FFF-11) and Ser. No. (12/950,017) (#CCC-10). It will be appreciated that the details disclosed in the co-pending application may be applied to the present embodiments without departing from the scope of the current invention.

All the above discussed the USB Charging-port(s) of current invention as the definition released on 2007 and update 2010 for (AAA) Quickly charger which minimum had 1.0 Amp to 5.0 Amp charging capability (BBB) While quickly charger with higher over 1.0 Amp capacity, not allow for any digital or electric data transit or deliver by same USB-unit or USB-Module or USB Charging-ports (CCC) the out of date earlier than 2006 has limited for charging capacity less than 500 ma or so and has risk for overheat because the USB-ports the specification or construction or conductive cross section is too few to carry bigger current go thought and cause over-heat and has fire risk (DDD) The USB charging ports of current invention only allow one of input power source not workable for more than one input power source current such as sometime is AC and while power fail use DC battery power as input power (EEE) The USB charging ports as current invention only has Charge DC current by USB-port or SUPPLY AC power by Outlet unit. No any digital/electric data delivery or transmit for quickly charger USB-Port as current invention (FFF) The current invention has housing, space, compartment, room to install the said circuit and related electric parts & accessories inside the desktop housing (GGG) The current invention has movable, removable, Universal USB-Charger unit can install, movable, removable, replace feature too. (HHH) The current invention USB-Charging ports incorporate with jump-wire or bridge-wire or USB-wires has 2 male plug and one plug into the Desktop USB charging-ports and one other male-plug into the Other device's USB-Plug receiving ends (device's USB-port) to make the current delivery from Desktop to the other device. (III) The said USB-Wires has 2 mail plugs, the 2 male plug can be any type including Type A, Type B, Type C for construction. (JJJ) The said USB-Wire has 2 male plugs, the every-one plug need to match the USB-female receiving ports for Pins. Maybe the same or different on the size can be standard Type A, Mini USB, or Micro USB specification as long as the receiving-end match the Plug-in-end for pins.

Figure 8:
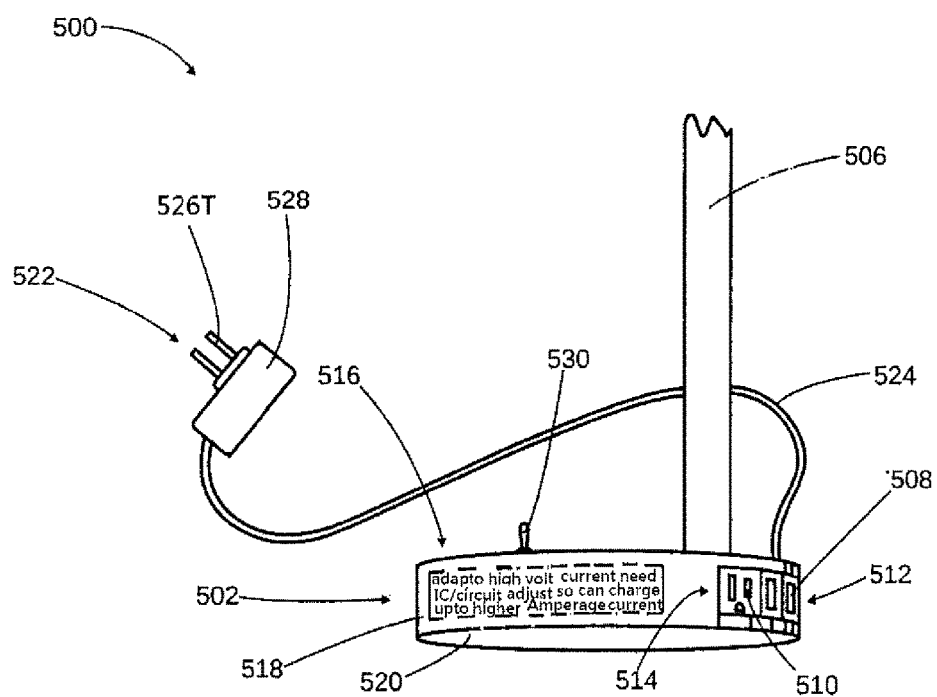
FIG. 8 is an isometric side view of the base unit of FIG. 5 in an alternate configuration.

FIG. 8 shows the first preferred embodiment (500) incorporate with different light source application (Light source is not shown), which has a thicker or higher base (518) to provide a bigger space to arrange bigger size electric parts and accessories to save the cost of super compact, slim, or cute electric parts and accessories, and which also can load rotating multiple surface power station (608 of FIG. 6) which is parent filing (#CCC) as above disclosure which has built-in plurality of the said USB-unit(s) or a rotating USB-Module so that a first surface of the USB-module (608) or power station (608) will look nice when the USB-unit(s) or USB-Module is not in use. Details of the rotating USB module are shown in FIGS. 19, 20, 21, and 22 (page 11/22 to 13/22).

From FIG. 8 shown the outside housing transformer (526T) has prong (522) to connect with outlets from wall or extension cord to get AC power source and pass though the circuit-kits (528) inside the transformer (526T) to change the 120V AC to desired $1^{st}$ DC current and deliver by conductive wire (524) into the desktop item's base (518) which has the more than one of circuit-inside or IC or DC-to-DC circuit (as notes details) which to change or adjust or arranged for (5001) USB charging-port output-end DC current or for (5002) DC powered Light source or for (5003) DC powered other functions & products those use the $1^{st}$ or $2^{nd}$ or third or fourth DC current so can make the (5001-1) USB charging-port (5002-1) DC powered light source (5003-1) DC powered other electric products or controller or sensor or switch or IC or electric parts or accessories can work properly. Furthermore, the light source on the embodiment (500) can be a AC powered light source including CFL Bulb or Incandescent or fluorescent tube if the desktop items (500) incorporate the above discussed special custom made transformer (426 T+AC) as FIG. 4 discussed.

From the FIG. 8 also shown the preferred embodiment (500) which the said Desk Top item is a lighting has preferred light source may select from AC powered light source including CFL, incandescent, energy saving bulb or tube as light source which has big base (518) and the rear-side of base has 3 or plurality of the outlet-unit(s) from Number 1 to any number so it can connect with other electric or digital data devices to supply or charge the other devices. The special design for current invention's transformer (426T+AC), adaptor (426T+AC), inverter (426T+AC) inside or outside base which not only supply the $1^{st}$ or $2^{nd}$ or $3^{rd}$ DC current to the USB-units and DC light source but also supply AC current to the said plurality of the AC Outlet-unit(s) while the said custom made special transformer, inverter, adaptor has special design for 120 Volt AC current not passing though the current changing circuit-kits of the said special transformer of the special model for current invention.

Figure 9:
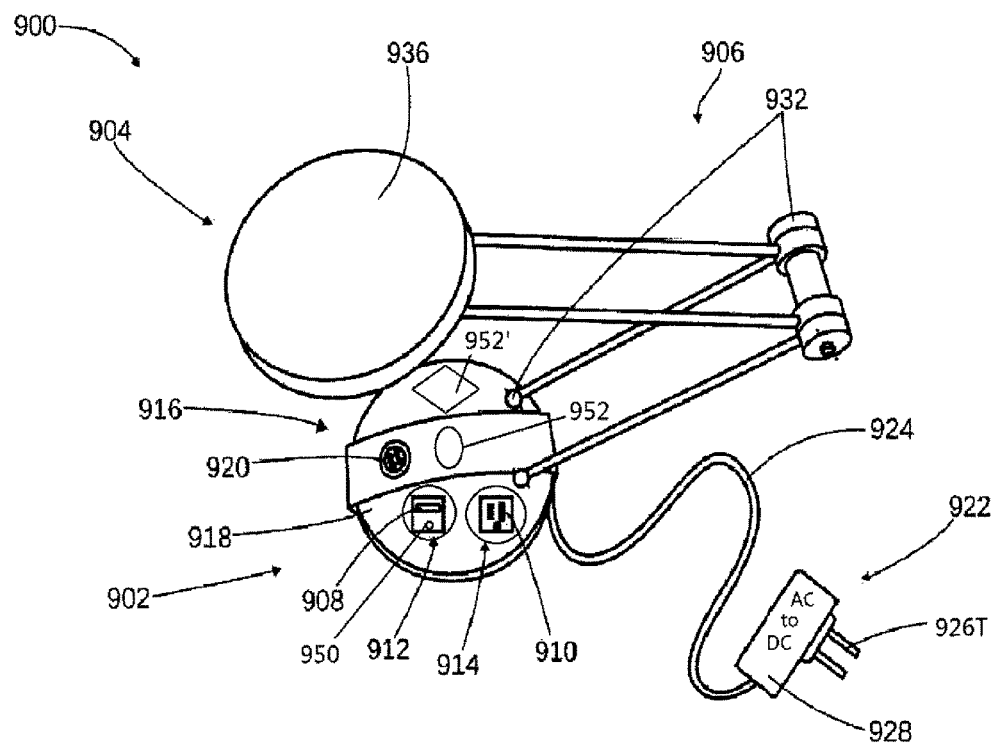
FIG. 9 is an isometric top view of the desktop system in a fifth embodiment.
Figure 10:
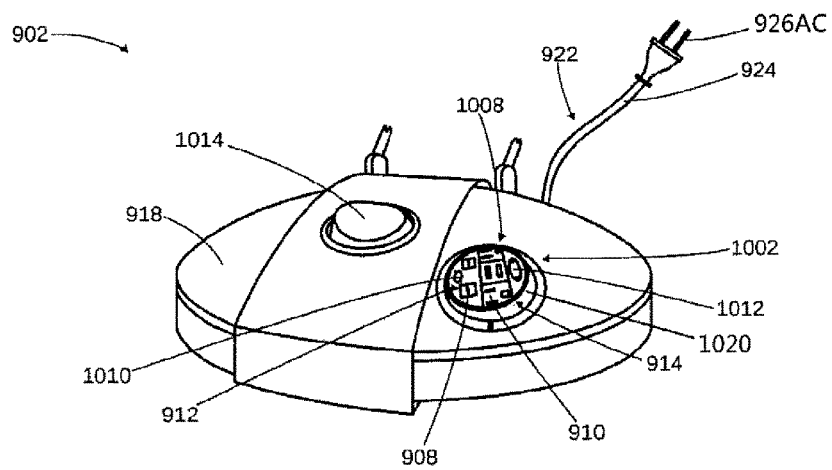
FIG. 10 is an isometric view of the base unit of FIG. 9 in an alternate configuration.

The From FIG. 8 The plurality of outlet-units or Outlet-module can install on rear-ends or sides of base of the lighting device so it can have nice and net wires arrange on the surface such as desk top or floor for floor lamp base. This kind of arrangement for base of lighting device will save people to use a lot of power strips or power cords or extension cord which is ugly and occupied too many wall-outlet space and outlets. This is other feature for current invention has a plurality of Outlet-unit or outlet-module on the base of ling device. It can add the surge protection for such more than 3 outlet-unit or 3 outlet-module so can have 1 more Plus feature of this Outlet-unit on the base of lighting device. FIGS. 9, 10, show fifth (900) (902) and sixth (1100) (1102) preferred embodiments in which desk top items (900) (1100) with DC light source including LED, LEDs, EL, Organic EL (OEL) also have a thicker or higher base (918) (1118), and which can add rotating multiple surface power station (920) (1020) or it can called USB-modules or outlet-module with a plurality of USB-unit(s) or/and Outlet-unit(s) or/and a plurality of other receiving means (hereafter as other-ports) to increase the number of function(s), feature(s), effect(s), and/or performance(s), the said rotating power station (920) (1020) or rotating USB-module or rotating outlet-module having more than 1 surface and the capability of changing the surface for different purposes.

From the FIG. 9 shown the any kind of light source (936) desk lamp (904) which has 2 rotatable Module (912) (914) and each of rotatable module has built-in desire number of the USB-Units or/and Outlet-unit or/and USB-Module (912) or/and Outlet-module (914) or/and sealed-unit (912) (914) or/and universal-unit (912) (914) to get desired functions. It also has switch (952) or controller (952') to turn-on or turn-off the said Light source (936) for desk lamp (904). The base (918) has LED indicator light (950) on the rotatable module's surface to shown the charging status. The Multiple surface power station 1 USB port can offer up to 3.1 Amp for quickly charger.

From The FIG. 9, shown the base of the said Desk top lighting which may has any type of the light source which has the Rotatable module which has desire number of USB-Unit(s) or/and outlet-unit(s) and optional LED means for charging status indicator lighting. The said base not only has rotatable module and but also has additional outlet-unit or outlet-module(s) to allow to charge or supply AC power to the other electric or digital device which need AC current input to make operation.

From the FIG. 10 shown the thicker and curved base (918) for Desk lamp (902) has desire light source (not shown) for illumination. The desk lamp (902) has wired plug (926AC) to connect with wall-outlet and has AC current input into inside housing circuit-inner to transfer the wall-outlet's 120V 60 Hz current into USB-unit(s) needed the 1st DC current and also supply the wall-outlet's 120V 60 hz current to the Outlet-unit(s). The said bulb, incandescent light, florescent light or CFL light source is turn-on or turn-off by the switch or sensor or remote control, or wireless, or bluetooth, or wifi controller with update APP software can download from internet or other network so receiver are install means on the base surface. The said $1^{st}$ DC current also can be any other high voltage $2^{nd}$ DC current which voltage is higher than 5 Volt $1^{st}$ DC current for other DC products operation current only need to go through the DC-to-DC circuit or IC or more than one of circuit-inside can easily to change or adjust or arrange for all kind of DC functions or DC powered products on the said desktop items.

Figure 11:
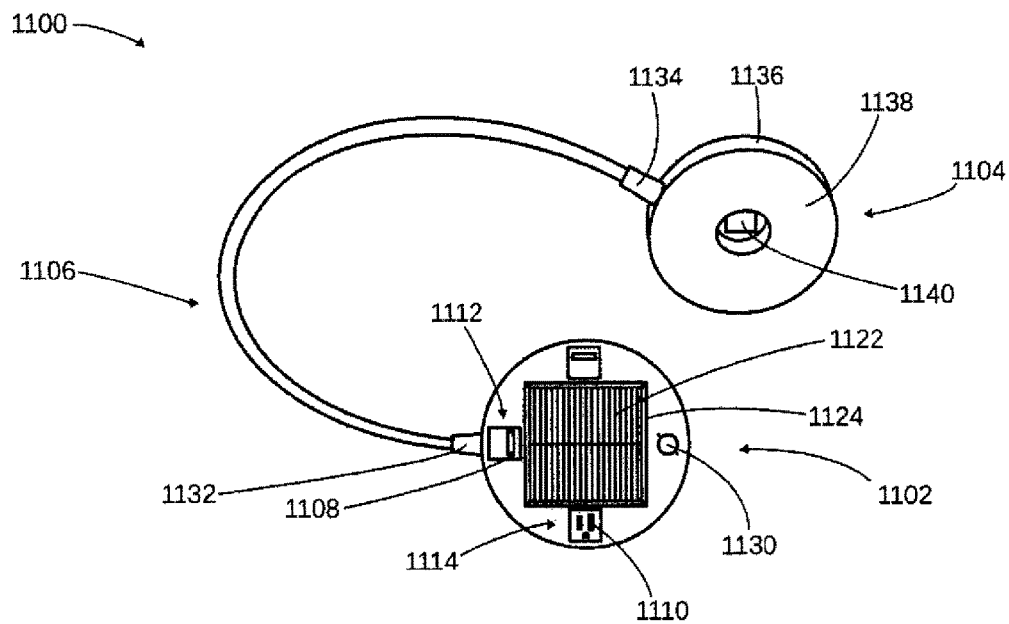
FIG. 11 is an isometric top view of the desktop system in a sixth embodiment.
Figure 12:
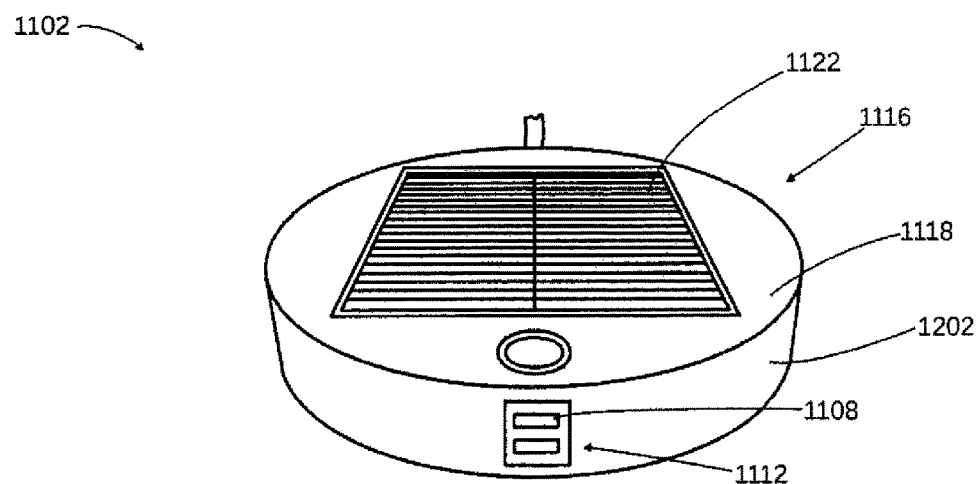
FIG. 12 is an isometric view of the base unit of FIG. 11 in an alternate embodiment.

From the FIG. 10 shown the any kind of light source desk lamp (902) which has 1 rotatable Module (1020) and rotatable power station (1020) or USB/Outlet module (1020) has built-in desire number of the 1. USB-Units (908) or/and
2. Outlet-unit (910) or/and
3. USB-Module (combine the 2 USB-units into one piece and in one housing or PCB) or/and
4. Outlet-module (combine the 3 outlet-units into one piece and in one housing or PCB) or/and sealed-unit (has more than one of UBS-unit(s) or/and
5. sealed-unit(s) (USB-unit of Outlet-unit inside a sealed housing) or/and
6. universal-unit (at least has one USB-unit or/and outlet-units has housing to fit into more than one of the housing or compartment which within many of the desk top items housing)

to get desired functions. It also has controller or switch to turn-on or turn-off the said Light source for desk lamp or desktop item's existing function(s). The one LED indicator light (950 of the FIG. 9) on the one of the rotatable module's surface to shown the charging status FIG. 11. shows a other preferred embodiment (1100) which is powered by solar power and stores the $1^{st}$ DC current which is solar electricity inside rechargeable batteries to provide enough $2^{nd}$ DC current power which at the lower DC voltage or higher DC voltage depend on the solar module and rechargeable batteries designed and the 2nd DC current to charge other electric or digital data device(s) through circuit-inside housing or IC or DC-to-DC circuit so can change or adjust or arrange the $2^{nd}$ DC current become 3rd DC 5 Volt DC current get into the built-in USB-unit(s) which has only conductive piece without any transformer outside or inside the housing of desktop items, and outlet-unit(s) incorporated with proper circuit-inside or DC-to-AC circuit or IC, or controller for quickly charging capacity, or voltage pump-up circuit, so can offer the AC power to AC products or functions to meet market requirements. The current embodiment (1100), the Solar or chemical powered Desk lamp which get current from Solar or Chemical already is DC current so no need transformer to make the current change from AC to DC. Same as the FIG. 12.

Figure 13:
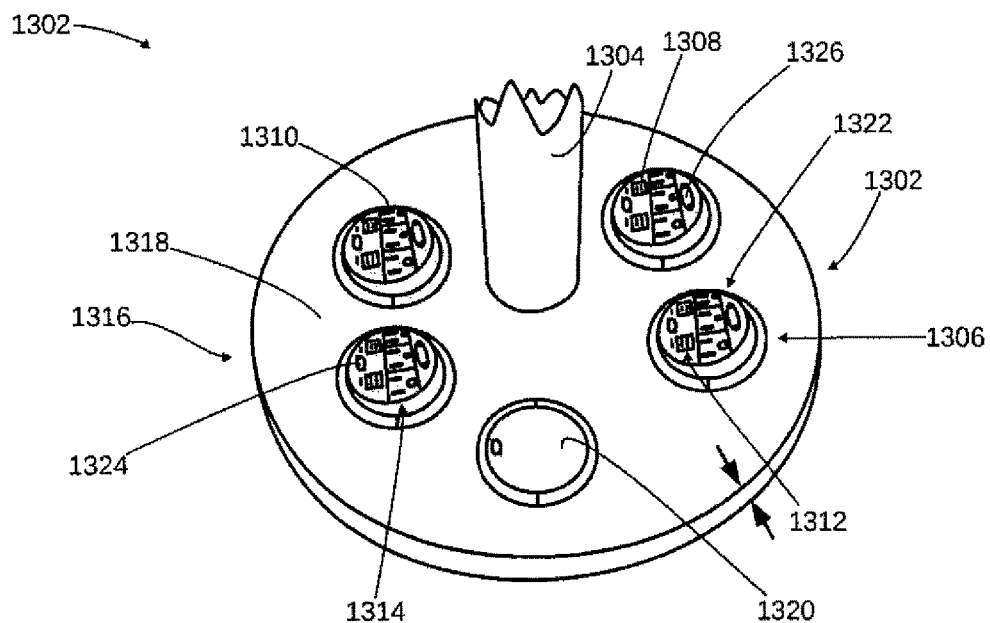
FIG. 13 is an isometric view of a base unit for an embodiment of the desktop system.

From the FIG. 13 also shown the preferred embodiment (1302) which the said Desk Top item (1316) for prefer light source (not shown) may select from AC powered light source including LED bulb, CFL, incandescent bulb as light source which has big base (1316) and the rear-side has plurality of the outlet-unit(s) from Number 1 to any number where prefer same number of market available power strip or extension cord or power station's number so can replace the existing power strip or extension cord or power-station to offer people to use power strip or extension cord or power station on desktop arm can reachable distance, so it can connect with other electric or digital data devices to supply or charge the other devices. The inside or outside location's regular or special custom made transformer, adaptor, inverter not only supply the DC current to the USB-units but also supply AC current to the said plurality of the AC Outlet-unit(s). Furthermore, the plurality of the outlet-unit(s) or Outlet-Module(s) also can add the safety protection function such as surge protection like extension cord, power strip or power station had. The same application can apply for all base of the lighting device so can have nice wires arrangement for plurality of outlet-unit(s) or Outlet-module (s) on the said base of all kind of lighting device. The current embodiment (1302) show mainly for only the light base has the built-in USB charging-port or/and outlet-ports which no need sells the top light source or the other parts. It is appreciated that the current invention is not only claim for full set of light device but also including the light device's base with pole, stand, bar, stem for people to assembly separate purchase of shade, light source.

FIG. 13 shows a desk top item (1302) which has a super big size base (1318) so that a plurality of rotating USB-modules (1322) or power station (1322) can be installed to enable a group of people to charge their electric or digital device(s) at the same time by the USB-unit(s) (1308)(1312) or USB-Module(s)(1308)(1312) or SUPPLY AC current by Outlet-Unit(s) (1310) (1314) or Outlet-Module(s) (1310X) (1314), such as for use in a public area has a lot of people walk by including train station, bus station, airport, meeting room, hotel lobby . . . etc.

Figure 14:
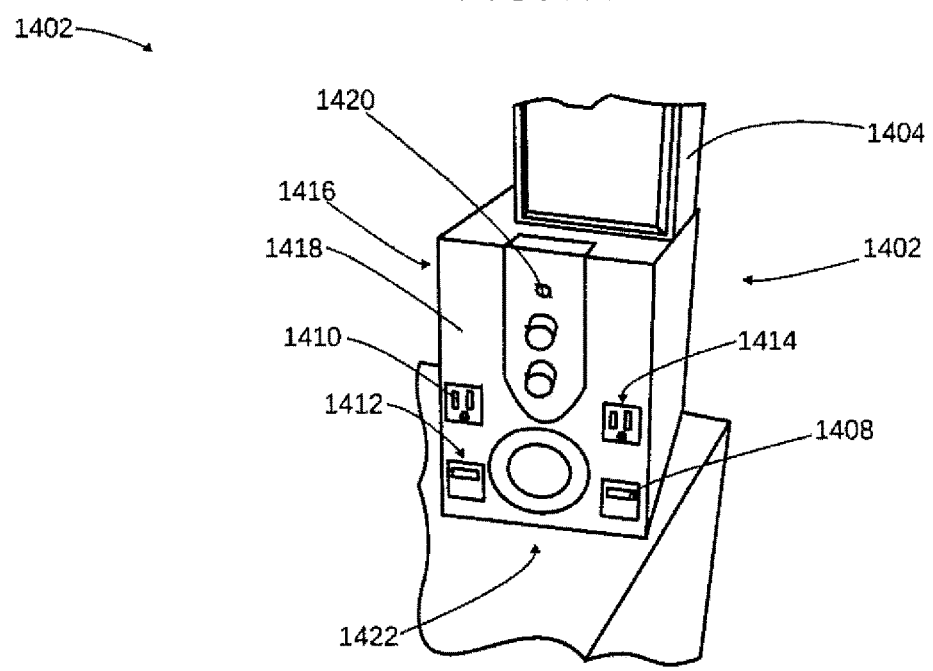
FIG. 14 is an isometric view of a base unit for an embodiment of the desktop system.

FIG. 14 shows desk top items (1402) with DC powered light source including LED (not shown) or other AC power source including CFL (not shown) those having USB-unit(s) (1408) (1412), USB-module (1408)(1412), or outlet-unit(s) (1410X)(1414) to allow people to charge energy-storage unit or assembly inside the other electric or digital device(s) by USB-unit(s)(1408)(1412) or USB-Module(s) (1408) (1412), or supply the AC current to prong(s) device by outlet-unit(s) (1410) (1414) or outlet-module(s) (1410) (1414), the items including for example a radio, time piece, weather station display, fruit blender, food machine, liquid machine, LED lighting, light fixture, image projector, image, lighted mirror, power station, rotating power station, electric fan, heater or any conventional items with LED means built-in to offer the area illumination, or shown digital time, or shown image, or shown the charging status. The said other functions or the said USB-unit(s) or Outlet-unit(s) can install on the anywhere of the base, pole, steps, flat areas of the said Desk top items and not limited only on the base one surface. The all application has at least one of the $1^{st}$ DC current created by the transformer inside or outside the housing and the $1^{st}$ DC current through the DC-to-DC circuit or IC or more than one circuit-inside to get $2^{nd}$ or $3^{rd}$ or more different current. The said $1^{st}$ or $2^{nd}$ or $3^{rd}$ DC current has the desire voltage to offer the current to at least one of the said (A-80) DC light source (A-81) USB charging-port(s) (A-82) DC operate other electric parts & accessories (A-83) DC powered added function(s).

Figure 24:
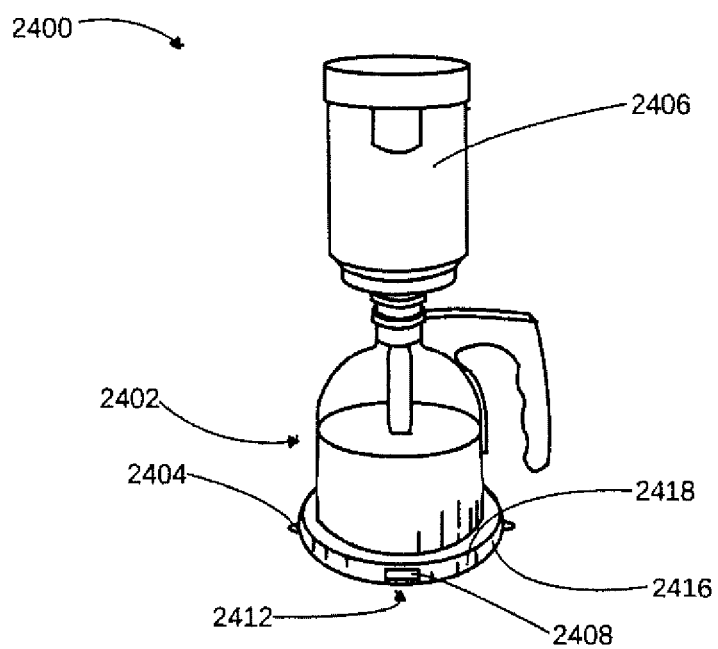
FIG. 24 is an isometric top view of the desktop system in an eighth embodiment.
Figure 25:
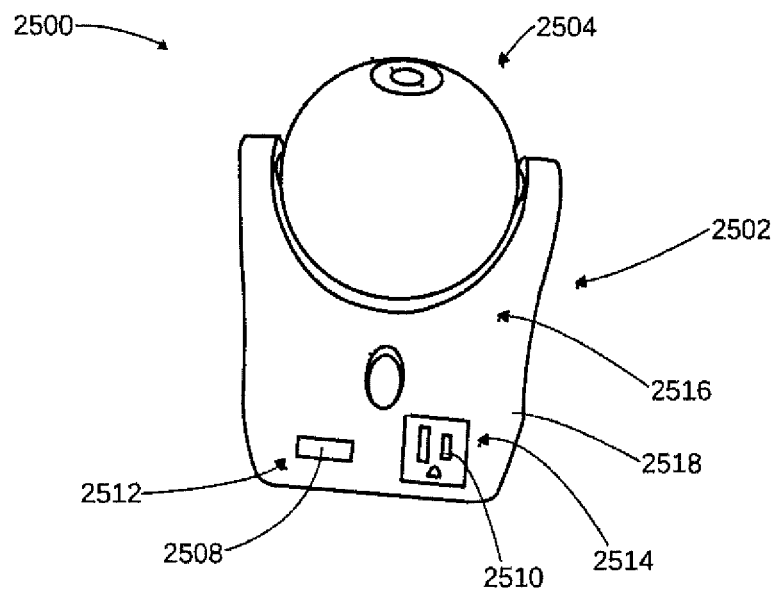
FIG. 25 is an isometric top view of the desktop system in a ninth embodiment.
Figure 26:
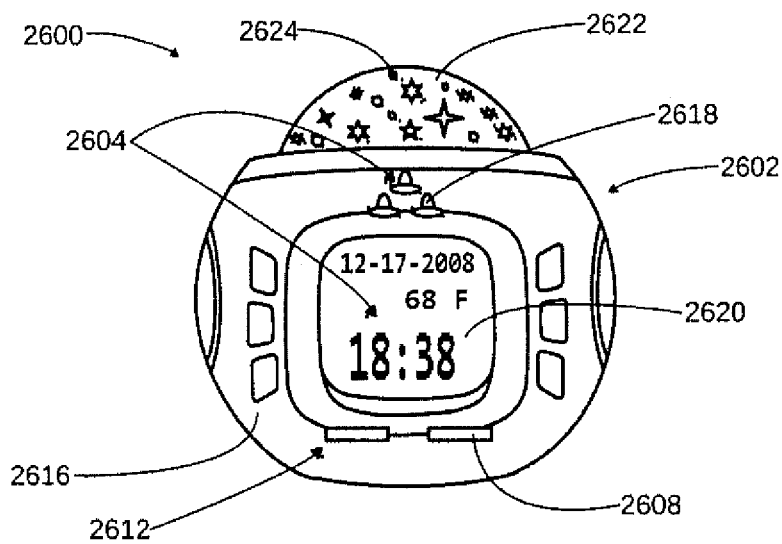
FIG. 26 is an isometric top view of the desktop system in a tenth embodiment.
Figure 27:
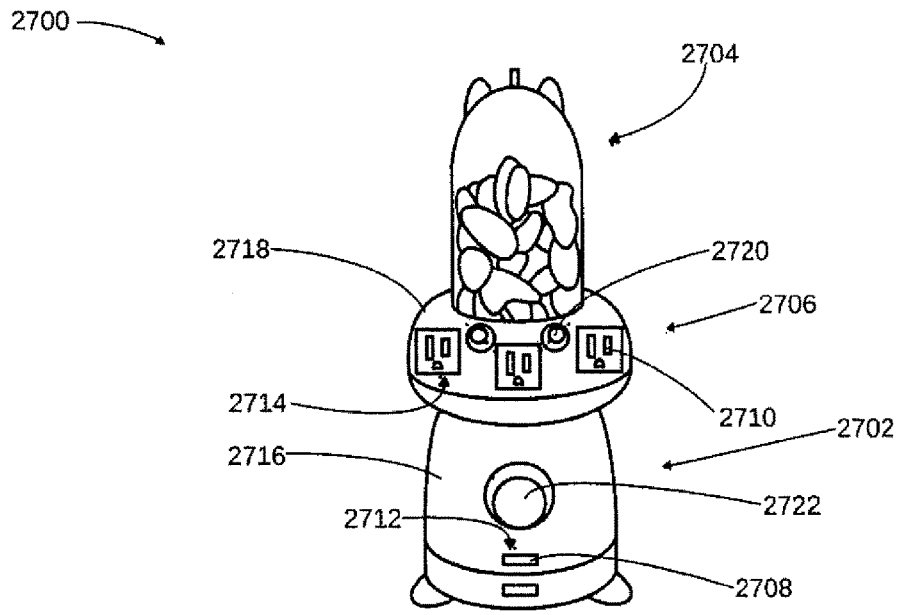
FIG. 27 is an isometric top view of the desktop system in an eleventh embodiment.
Figure 28:
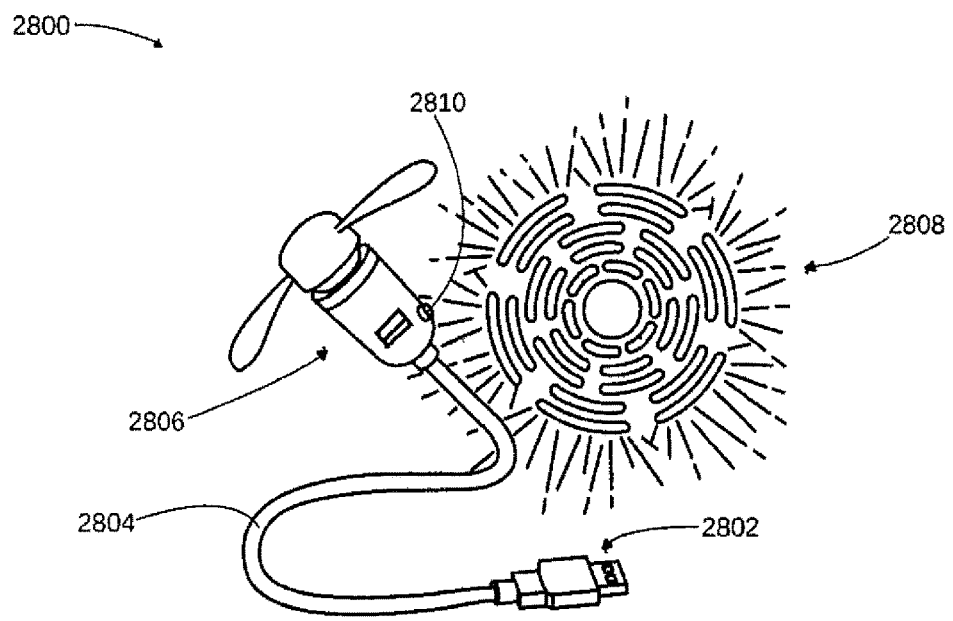
FIG. 28 is an isometric side view of an implement for use with the desktop system.
Figure 29:
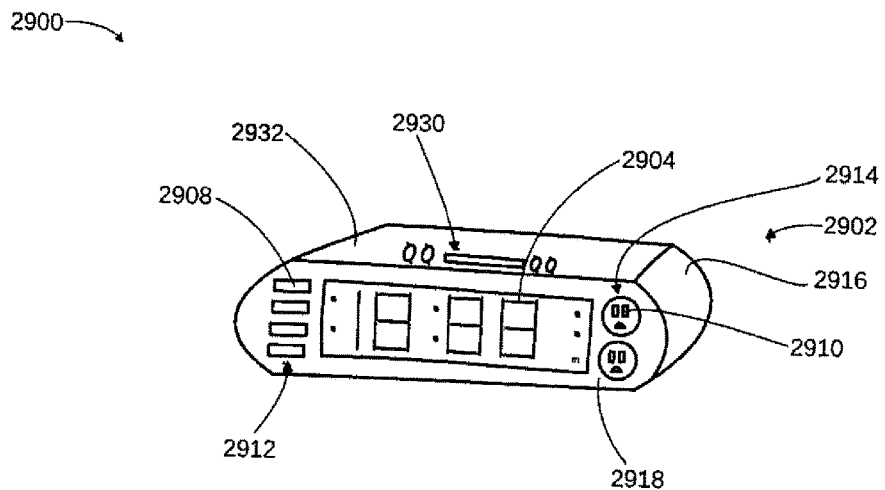
FIG. 29 is an isometric side view of the desktop system in a twelfth embodiment.
Figure 30:
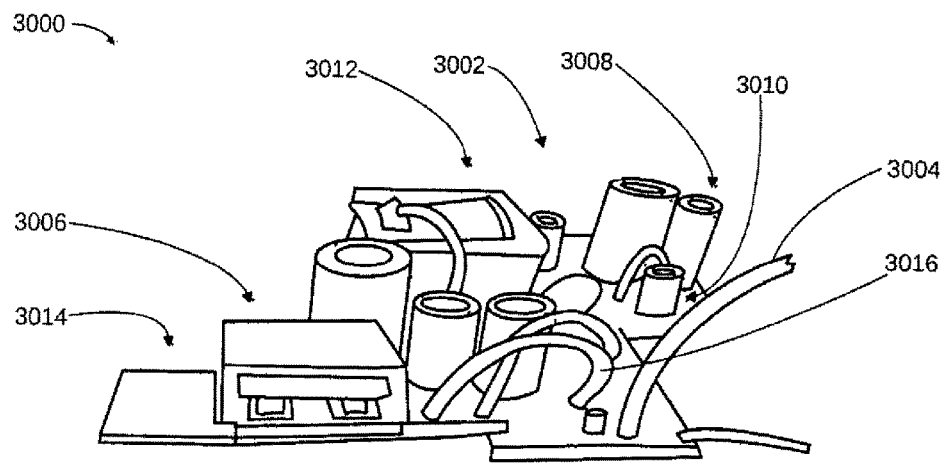
FIG. 30 is an isometric view of a USB-unit for an embodiment of the desktop system.
Figure 31:

FIG. 14 shows desk top items (1402) has LED (1420) is a function indicator light to shown the charging status or power-on-off status and USB-unit(s) (1408) (1412), USB-module(s), or outlet-unit(s) (1410)(1414) install on the pole (1404) or base (1418) or part of the said Desk Top items (1402) to allow people to charge other electric or digital device(s), the items has at least one of the existing functions including a radio (FIG. 14), timepiece or Digital Alarm clock (FIG. 29), time or temperature, weather station display & pinholes image project & music player with LED(s) (FIG. 26), fruit blender, food machine (FIG. 27), liquid machine (FIG. 24), LED lighting (FIG. 1,2,5), light fixture (FIG. 3,4,6 and FIG. 7 to 13), projector (FIG. 25), electric fan (FIG. 28), lighted cosmetic mirror (not shown), power station (FIG. 6,7,9,10,13). heater or any conventional items (FIG. 28) with LED means built-in as indicator light (FIG. 6,7,9,13 and FIG. 20,21 install on module surface) or the said LED means is light source to offer the area illumination (FIG. 1,2,5 as light source), or shown digital time (FIG. 26,29), or shown image (FIG. 25), or shown the charging status (FIG. 6,7,9,13 and FIG. 20,21 on module surface). The said other functions or the said USB-unit(s) or Outlet-unit(s) can install on the anywhere of the base, pole, steps, flat areas of the said Desk top items and not limited only on the base one surface.

Figure 15:
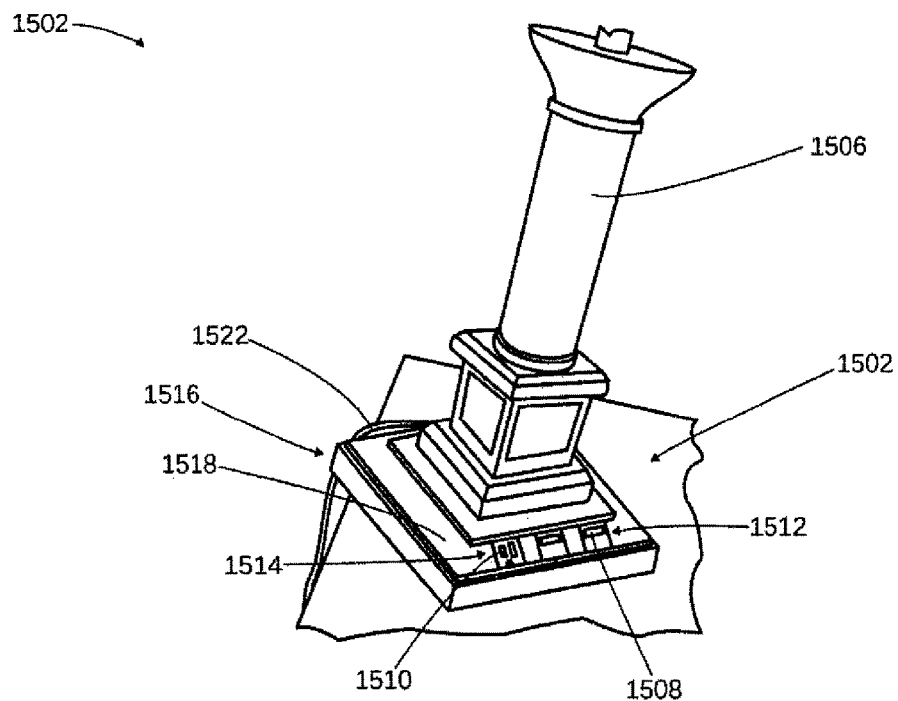
FIG. 15 is an isometric view of a base unit for an embodiment of the desktop system.

FIG. 15. shows a desk top item (1502) which has a step construction base (1516) with the power cord (1522) to get outlet's AC power source into the base (1516) so can be let people to charge their electric or digital device(s) at the same time by the USB-unit(s) (1508)(1512) or USB-Module(s) (1508)(1512) or SUPPLY AC current by Outlet-Unit(s) (1510) (1514) or Outlet-Module(s) (1510X)(1514), such as for use in a public area has a lot of people walk by including train station, bus station, airport, meeting room, hotel lobby . . . etc. The said other functions kits or the said USB-unit(s) or Outlet-unit(s) can install on the anywhere of the base (1516), pole (1506), steps (1518), flat areas (1518) or the attached organizer (1518) of the said Desk top items (1502) and not limited only on the base one surface.

Figure 16:
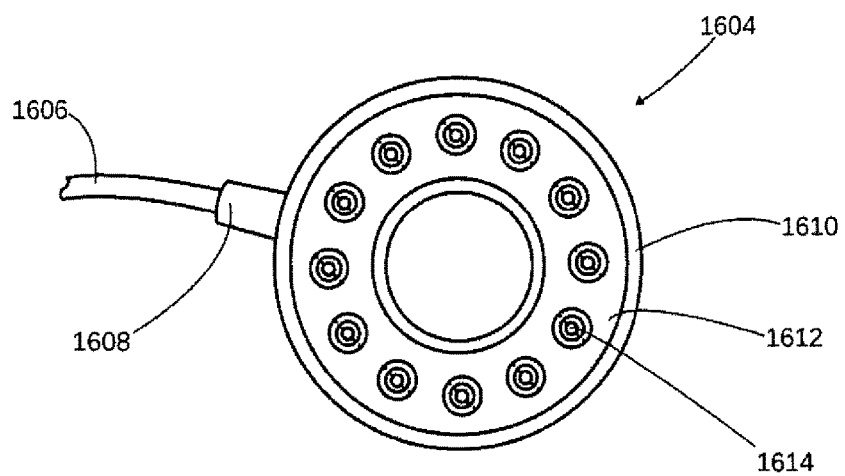
FIG. 16 is a bottom view of a lighting source for an embodiment of the desktop system.
Figure 17:
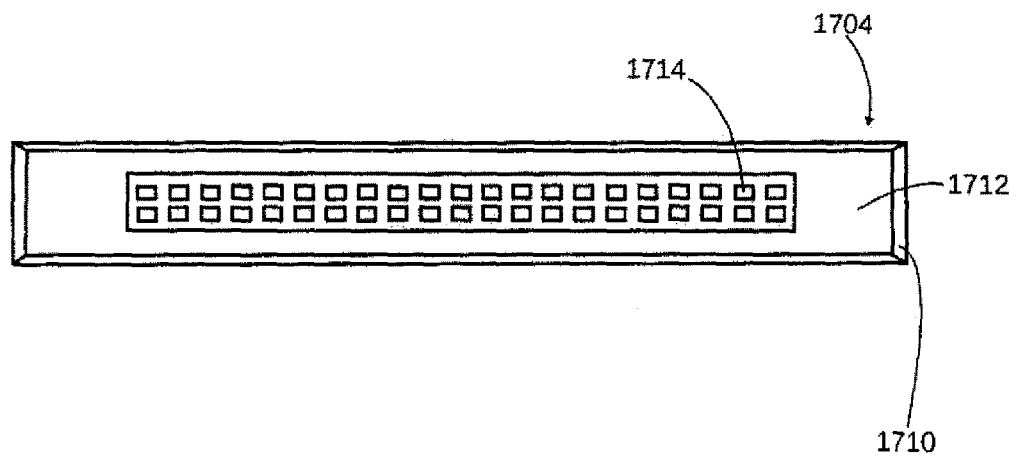
FIG. 17 is a bottom view of a lighting source for an embodiment of the desktop system.
Figure 18:
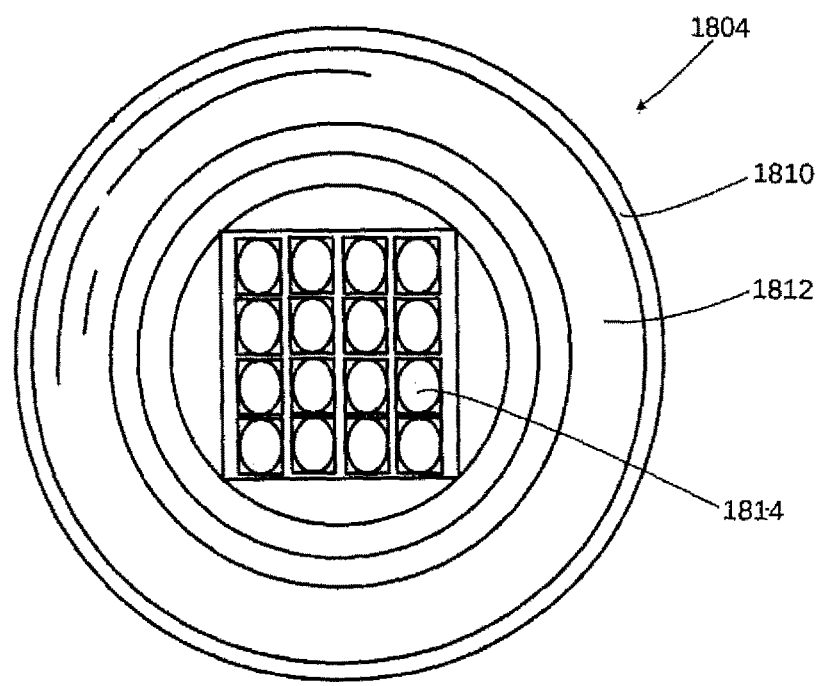
FIG. 18 is a bottom view of a lighting source for an embodiment of the desktop system.
Figure 19:
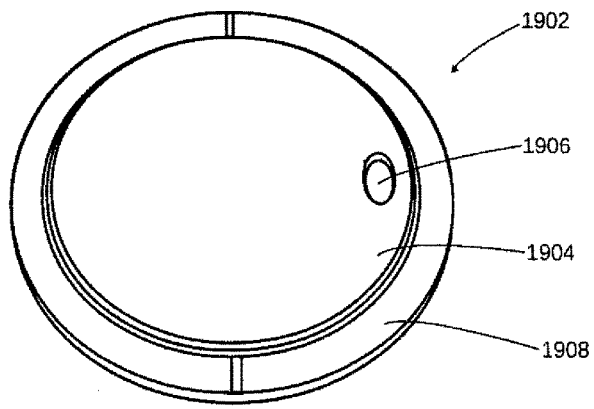
FIG. 19 is an isometric top view of PARENT FILING (#CCC) is a rotatable power station for an embodiment of the desktop system.
Figure 20:
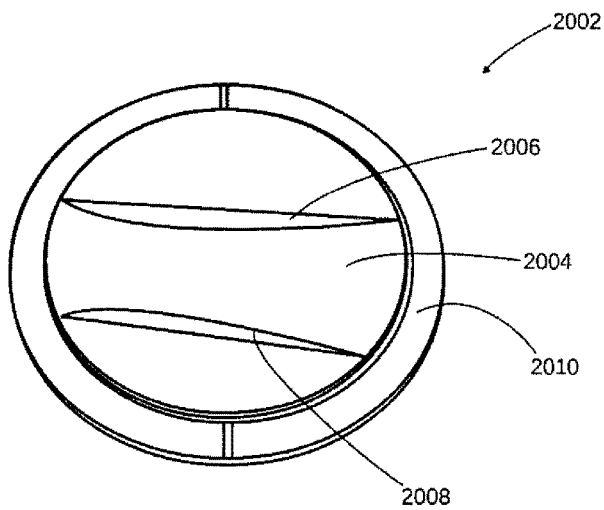
FIG. 20 is an isometric top view of PARENT FILING (#CCC) is a rotatable power station for an embodiment of the desktop system during rotation.

FIGS. 16, 17, and 18 show different LEDs type (1614) (1714) (1814) has different size, brightness, color temperature, power consumption, specification, with anti-glare to easily viewing, with anti-reflection optic-lens or film for clear reading arrangement while used for LED lighting that has at least one of function(s) is offering the area illumination in the above-discussed preferred embodiments and same as for other lighting items including the floor light device or wall mounted lighting or clip-on lighting device.

FIGS. 19, 20, 21, and 22 show details of parent filing (#CCC) the Rotating Multiple Surface power station (1904) has the LED light source and the USB charging-port(s) and Outlet-ports where USB-module with at least one USB-units and a plurality of additional receiving means (hereafter as Additional-ports) such as USB-unit(s), outlet-unit(s), Internet-unit(s), adaptor-unit(s), other light source means, or other light sources with appropriate parts and accessories.

Figure 21:
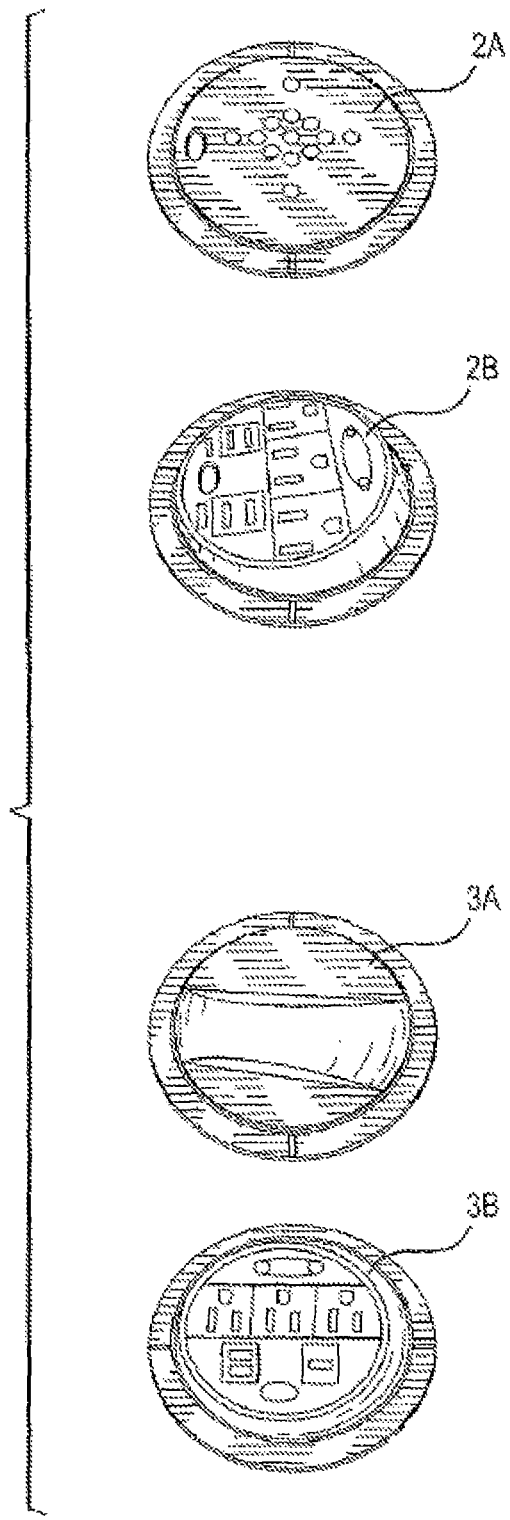
FIG. 21 is an isometric top view of PARENT FILING (#CCC) is a rotatable power station or USB-Module for an embodiment of the desktop system.

FIG. 21 (2A) (2B) (3A) (3B) show details for each port name, and how to make the rotating from the $1^{st}$ surface to other surface and each different surface has DC power LED light and USB Charging-ports and Outlet-ports. The more details can check the parent filing (#CCC) has more details discussion.

Figure 22:
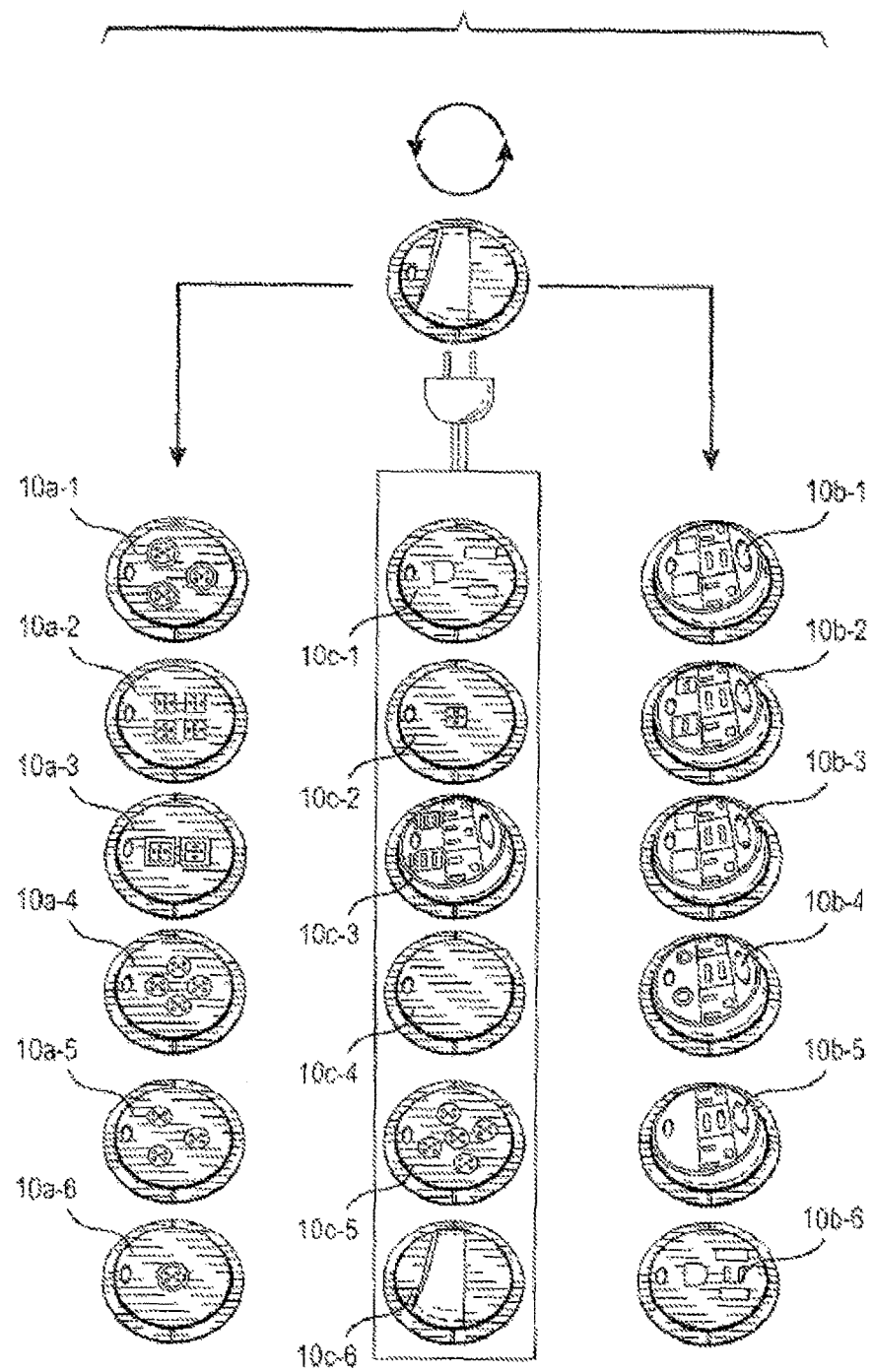
FIG. 22 is an isometric top view of PARENT FILING (#CCC) is a rotatable unit for an embodiment of the desktop system.
Figure 23:
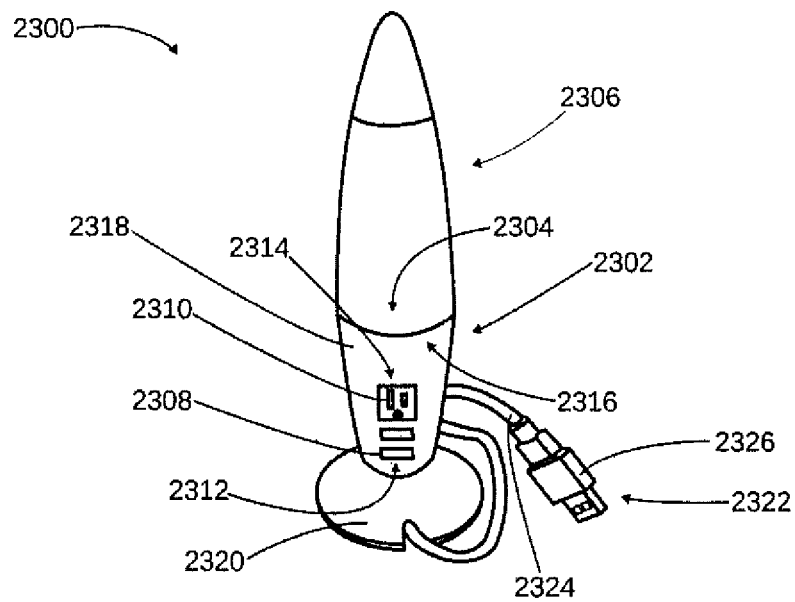
FIG. 23 is an isometric top view of the desktop system in a seventh embodiment.

FIG. 22 inside FIG. 10 and FIG. 10A and FIG. 10B also show parent filing case (#CCC) has all kind of different combination for LED(s), USB charging-ports, Outlet-ports with selected USB-unit, USB-Module, Sealed-unit, Universal-unit, Outlet-unit, Outlet-module and all kind of the combination to install the PARENT FILING (#CCC) multiple surface power station or USB-module with how to change from the 1$^{st}$ surface to other surface with locking means and it also can has the self AC plug & wire to get power for this multiple surface power station has multiple function(s) inside an elongate shape similar with the power strip or extension cord products which still fall within the current inventions for lighting device has geometric base shape scope.

FIGS. 23, 24, 25, 26, 27, 28, 29 and 30 show all kinds of desk top items which offer function(s), effects(s), and/or performance(s) to people's eye, nose, mouth, and/or ears for a period of time while people are working resting, sleeping, or standing which at least has following feature: (A700) Light source for illumination or indicator light (A701) Quickly USB charging-port has minimum 1.0-5 Amperage charging capacity (A702) At least has USB charging-ports function and one more desktop items its existing functions (A703) has the more than one current type selected from 1 DC current, 2$^{nd}$ DC current, 1$^{st}$ AC current, 2$^{nd}$ AC current to get charger and one more functions of desktop items its original existing function(s).

FIGS. 23, 24, 25, 26, 27, 28, and 29 show all kinds of desk top items which offer function(s), effects(s), performance(s) to people's eyes, nose, mouth, and ears so that people stay nearby for a period of time as they work, rest, sleep, or stand. The desk top items each have (A) LED (for area illumination or indicator light to shown charging status or create image for time or projection or visible image as above discussed) and (B) have a USB-unit(s) has its own quickly Charging-sport(s) has minimum 1.0 Amp to 5 Amp charging capacity as specification release on 2007 update on 2010 to charge energy-storage unit or assembly including rechargeable-batteries inside of the other electric or digital data device(s) and are arranged to 1. generate, exhibit, or provide light beams, or offer area illumination
2. show or present the image including of a projection, reflection image, a time display, a clock,
3. Offer or play music, sound,
4. Display photos, digital signals,
5. Create or produce the air flow at a desired temperature, moisture, steam, smells,
6. Offer the liquid, coffee/tea, and/or food, or
7. to serve as any other conventional market available electric or consumer device that people will stay around for period of time while their other devices are charging.

At least one of the desk top device may include at least one of its existing function(s) for people eye, ears, nose, mouth, skin to feel or sense or eat or smell or see or hear and the device let people to can easily to reach, touch, operate, or manage the said desk top device.

The device has desire number of the USB-Unit or USB-Module or Outlet-unit or Outlet-module or Sealed-unit or Universal-unit are installed or arranged on or within the device's substrate(s), base, pole, housing. And the desk top device is arranged on the location, or place where people will stay for period of time, such as a desk, table, bed, chair, land, grass, or wherever else people work, rest, sit, stand, sleep or a take nap.

The as noted above, the desk top items may offer electric signals, wireless signal, or visible or audio or smell or food or air functions related to people's eyes, ear, nose, mouth, or body, such as illumination, sound, images, brightness, visual effects, smell, water, liquid, food, wind, moisture, airflow or any conventional functions of electric devices, such as LED lighting, a clock, projector machine, image to see, cosmetic lighted mirror, digital photo frame, time display, air freshener, electric perfume freshener, moisturizer, electric fan, electric heater, electric steam spreader, electric cooler, electric air conditioner, or other conventionally available items has its own existing functions(s) that can be placed to let people easily reach, touch, operate, or manage the objects.

The desk top items may be powered by a direct current (DC) power source limited solar, generator, DC battery power bank, Or alternating current (AC) power source having appropriate electric parts and accessories or components, such as circuit, IC, DC-to-DC circuit, sensor, a motion sensor, timer, time delay, timer, resilient kits, conductive kits, transformer, inverter, adaptor, wire, prongs, UL listed adapter, PIR remote controller, infrared controller, wireless controller, blue-tooth controller, Internet controller, Wifi controller, master power controller, APP software, and/or AC power outlet-unit(s) to offer electric current at a voltage (Volt) and amperage (Amp or ma) sufficient to achieve a desired charging time and desktop its own existing function (s).

The USB-unit(s) has its USB Charging-port(s) only serve as a Charger for charging energy-storage unit or assembly including rechargeable batteries inside the other electric or digital device(s) and do not have an electric data transfer function. If a plurality of USB-units are provided, the USB-units can be arranged to have different output power to charge different electric or digital data device(s). If additional outlet-units are provided the outlet-units may be AC outlet-unit(s) that serve as an AC power source with optional surge protection features.

Electric or digital data device(s) that may be charged by the USB-unit(s) by its USB Charging-ports for quickly charger capacity minimum has 1.0 A-5.0 Amp or higher capacity include an MP3 or MP4 player, smart phone, computer, iPhone™, iPad™, video game, digital visual equipment, communication equipment, and other consumer electric products including the rechargeable batteries application such as Power bank for storage power tank.

The preferred desk top item's function(s) may be turned on or turned off for a predetermined time by switch, sensor, timer, photo sensor, motion sensor, time delay, and/or master control power controller, infra-red wireless, remote controller, wireless controller, APP software, Wifi or internet or network wireless controller, Z-wave remote controller.

All receiving port(s) in the desk top items, including USB-units or USB modules, may have a removable cover to allow kids or others to safely touch the items and prevent dust, or water from getting into the receiving means.

The USB-unit or USB-module in the form of the Sealed-unit or Universal unit to charge other electric or digital device(s) can be removable from the desk top items and carried with people to use when people leave the desk top items. For this purpose, the USB-unit(s) or USB-module(s) can be disassembled from the desk top items and re-assembled into the said desk top items by quick connector means, adaptor means, assembly means, or fixing means, with each of the USB-unit(s) or USB-module(s) having its own safety certification(s) so that the individual USB-unit(s) or USB-module(s) can be tested by safety authorities and sold separately.

The USB-unit(s) includes USB charging-ports which is an electric charging unit which has a USB-female receiving end to receive a USB-male plug from the USB-wire which has 2 male plugs on 2 ends to deliver electric power from the USB-female receiving means (USB Charging-ports) to the other device's/USB-wire's USB-male plug. The preferred USB charging-ports (USB-female receiving means) gets power from a power source and uses its circuit to convert or transform the electric current to a desired voltage, and current sufficient to charge Energy-Storage unit or assembly inside of the other electric or digital device(s) through the USB male plug insert into desktop items USB-female receiving port.

The items of these embodiments may be in the form of lighting, an desk lamp, table lighting, lava light, projection light, cosmetic lighted mirror, power station (Parent case #CCC), time piece, electric fan, air freshener, indicator coffee machine, indicator sound device, and visual device has LED(s).

FIGS. 32A1, 32A2, 32B1, 32B2, 32B3, 32B4, 32C1 32C2, 32C3 32C4, 32C5, 32C6, 32C7, 32D1, 32D2, 32D3, 32D4 show some preferred embodiments for the above discussed for parts as described below.

FIG. 32A1 USB-unit: The Unit means it is an individual charger has only charger purpose to have one input-current and passing though inner own circuit to make input current change to one output current to charger other device from its own USB port(s). This unit can be housed or without any hosing and install within the said desk-top housing and all live-wired or electric-carried parts & accessories not touchable by people except the USB-port(s).

The Charger only take 1 and only 1 of the input power or current and passing through inner circuit to come out the DC current on desired voltage and amperage. It cannot have more than one different input current such as AC or DC current as input current or it will be totally destroying the output current because inner circuit is fixed for one and only one current specification.

From FIG. 32A1 show the USB-Unit (3100) which is built-in LED desktop lighting device has USB ports to charge energy-storage units or assembly of other electric device. The USB-Unit (3100) has AC-to-DC or DC-to-DC or both to transfer the AC or DC or both input current from power source from AC plug-wire (shown) or conductive wire (3104) or adaptor on-base. For one embodiment, The said input AC power source get into the transformer (3112) to change AC current to $1^{st}$ DC current with desired voltage and current can give to the LED light source or IC or USB-port (3106) to operate the desired functions including color changing, color selection, brightness changing, select motion or RF or wireless control or simple photos sensor or switch to make the said LED light effects USB-port, or operate the other devices including LEDs, Accent light, Power fail light, night light, electric fan, audio device which can work for the $1^{st}$ DC current or the $1^{st}$ AC current from the input-end of circuit board (3114).

The USB-port (3106) which can be fixed on the USB-unit print circuit board (3114) or has conductive wire to make USB-port (3106) can put desired location as long as conductive-wire has sufficient length and flexible to bend to any location of the said LED desktop lighting base or arm-base or sides or walls of base. The PCB (3114) has other electric components including resistor, diode, capacitor, transformer, conductive wires, IC, switch, sensor, radar sensor, PIR sensor, RF transmitter or receiver, wireless transmitter or receiver so can make the LED light to turn on and turn off with or without function, color, brightness changing or selection.

The said USB-unit (3100) circuit board (3114) with or without the one or more DC-to-DC circuit to supply the different voltage and current to USB-port, LEDs, Accent light, Power fail light, night light, electric fan, audio device which is not workable with $1^{st}$ DC current as above discussed to make desired number of different current required to operate the said device and function of USB-port, LEDs, Accent light, Power fail light, night light, electric fan, audio device.

FIG. 32A2 USB-Module: This module is not a single USB-Unit Charger. It will be any combination for any number of the USB-Unit(s) or/and Outlet-unit(s) has its own number of the USB-port(s) or/and Outlet-port(s) to connect with other electric or digital data device's mail prong(s) or Plug(s) to charging or supplying the DC or/and AC current to other devices(s). This unit can be housed or without any hosing and install within the said desk-top housing and all live-wired or electric-carried parts & accessories not touchable by people except the USB-port(s).

From FIG. 32A2 USB-Module which has more than one USB-Units and USB-ports (3204) (3206) has AC-to-DC or DC-to-DC or both circuit to get 1st AC, 1st DC, 2nd DC or more DC current to supply to different electric parts or electric device as above discussed items lighting or reading light or lantern or accent light or night light or LED clock, electric fan, air condition, heater, air-flow device, area-illumination device, image project light, lighted mirror to get lighted image, LED time/date/week/calendar/weather data display, audio device, Blue tooth connection and play music device, air/steam/humility/accent/freshener displayer or other applications which discuss on above all should be fit within the current invention scope and coverage. The One of AC-to-DC circuit of USB-Module is transformer (3216) incorporated with one or more LED indicator light (3215) to show the charging status for low-power (Red LED), Charging process (Blue LED), fully charged (Green LED) can give consumer know the charging status by One or more LEDs. Also, the AC-to-DC transformer incorporate with other electric parts and accessories (3210) to make LED light, electric fan, LED time/date/week/calendar/weather display (May use separated DC batteries to prevent electric shot down or power fail period of time), Bluetooth related audio device, LED accent light, LED lantern, LED reading light, LED desktop lighting, LED lighted mirror, LED project light, Electric image display or electric picture frame, air/humility/liquid/steam/heater operation. The said more than one of the USB-unit or USB-ports (3204) (3208) connect by conductive-piece can with the circuit board (3202) so can install away from circuit board (3202) to desired location of LED desktop device base-wall, arm-base, base-top, body, base or housing desired location or movable or detachable compartment while has quickly connector for the movable or detachable compartment application has USB-port(s).

FIGS. 32B1, 32B2, 32B3, 32B4 (3) Outlet-unit and Outlet Module: The unit it is an individual POWER SUPPLIER device has outlet-receptacle which can receive the other device's prongs to deliver or supply the AC current from the outlet-unit's power source though the outlet-unit's port(s) to other device's prong to get into other device's circuit to power other device. This unit can be housed or without any hosing and install within the said desk-top housing and all live-wired or electric-carried parts & accessories not touchable by people except the USB-port(s).

From FIG. 32B1 shown the 1st embodiment (3500) for outlet-unit (3506) how to fit into the LED desktop item or lighting or lantern base or base-wall or arm-base by surrounding parts, post, frame, fence (3502) so can get 1st AC current from power source and through the outlet-unit (3506) internal conductive-piece to offer female receiving-socket for other products male plug to insert to connect to get 1st AC current from power source for LED desktop item or lighting or lantern.

From FIG. 32B2 shown the FIG. 32B1 details and enlarge for 3 receiving-ends to receive the other products 2 or 3 male plug to get AC current from the outlet-unit.

From FIG. 32B3 show the FIG. 32B1 details for LED desktop housing or base or base-wall or arm-base relation with the installed outlet-unit(s).

From FIG. 32B4 show the other embodiment for Outlet-Module (3600) which has more than one of Outlet-unit (3606) (3618) which has at least 2 or 3 conductive wire meet government safety requirement for wire-gauges such as 14 gauge for 1,850 watt so can let the hair-dryer or heater to connect with the said Outlet-unit (3606) (3608). For some small electric device which is not like the hair-dryer or heater may use the 16 or 18 gauge depend on the different lower wattage requirement. The said Outlet-module (3600) has optional number and type such as Type A, B, C, D, E or has most popular Type A USB-unit (3617) or USB-port (3617), or other female receiving adaptor-hole (3619) to work with outside device to get the AC-to-DC current from outside transformer to offer the said USB-unit or USB-port (3617) inside the said Outlet-module (3600).

FIGS. 32C1, 32C2 (4) Sealed-unit: This is a unit which has desired combination for any number of USB-unit(s) or/and outlet-unit(s) arrangement or combination and sealed into one piece of the housing and passed all USA required related safety standard(s) and get test labs' certification for this sealed unit only which not including the other housing parts or accessories non-related to the USB or Outlet charger. This sealed unit any live-wire or electric-carried parts & accessories have to sealed so called sealed unit so can pass the US Safety standard requirement(s).

FIGS. 32C3, 32C4, 32C5, 32C6, 32C7 (5) Universal Charger: This is charger which has finished housing and electric-contactor such as prong means, or wired, or quickly-connector(s) which not only can incorporate with the said desk-top items but it also can use for other applications. One of preferred embodiment is market available USB-2.1 Amp Charger has 3 USB-ports with prongs. This can install within the current invention desk-items housing by wired or outlets and it also can take apart from the desk-top item's housing and carry with people to plug-into Wall outlets to charger the computer, communication, consumer electric items or any electric or digital data devices while prong means plug-into outlet on wall or power strip's outlets. This is definition for universal charger for current desk-top items.

From FIG. 32C1 show the 1st embodiment for the USB sealed unit (3300) which has fixed or foldable prong (3308) depend on use only at home or use for traveling purpose with built-in light (3306) to make the said USB sealed-unit (3300) glow or lighted. The said USB sealed-unit (3300) has front opening (3302) to allow people to insert the male USB-Wire (not shown) into the inner female receiving-end of USB-port to get desired DC power to charge the other electric-device. The USB sealed-unit (3300) can install within the said LED desktop items or lighting or lantern while the LED desktop items has outlet female received end and proper space arrangement, so the said LED desktop items or lighting or lantern can have detachable and movable or assemble-able separated USB-seal-unit to let people can charge by desktop items or carry the said USB-sealed-unit to anywhere so no need buy other traveling USB-charger anymore to save consumer's money.

From FIG. 32C2 show the similar items (3700) with 1st embodiment for the USB-Sealed-unit (3300) that has housing (3704) with foldable prong (3708) so easily use at home or at other place. The USB-sealed-unit (3700) has the Front cover which can be light block-out or light-passing-through material so it can be No LED lighting or had LED lighting emit out from the front cover (3702). The said USB sealed-unit (3700) has 2 USB-units or 2 USB-ports from these can supply the DC current to charge other electric products. From Text-box shown the said USB sealed-unit because can use for other place and detachable from the LED desktop lighting or item or lantern, so it have to get government safety certification can use alone for any outlet power sources.

From FIG. 32C3 show the other USB Universal-Unit (3800) is Universal-unit which means the said universal-unit can fit into all different LED desktop item or lighting or lanterns as long as the said all different LED desktop items has proper space can install the said Universal-kit. The said one preferred embodiment for USB universal-kit (3800) is one had built-in electric-fan (3801) and LED light-source (3802) and both can be fixed or movable as long as had proper wire length to connect with the said universal-unit (3801). The said universal-unit (3800) also has built-in desired number of USB-unit (3803) or USB-ports (3805) which can also away for the universal kits as long as had enough conductive-wire length so can allow the USB-unit (3803), electric fan (3801), LED light source assembly (3802) can install desired and the best location of the said LED desktop item or lighting or lantern.

From the FIG. 32C4 show brief inner parts for the said FIG. 32C3 which has the AC-to-DC circuit in transformer type (3808) and other electric parts & accessories (3808a) to supply the desired same or different DC current to electric fan (3801) or LED light source assembly (3802) or USB-unit (3809) or USB-port (3810) to make pre-determined operation and function or light effects including fade-in/fade-out, color changing, color selection, functions change from motion or non-motion or radar-sensor or none-radar sensor, brightness changing.

From the FIG. 32C4 the said universal-unit has base (3800A) which assembled with the top cover (3800B) equivalent the universal-unit (3800) those has 2 conductive-wire (3808B) to connect with the circuit to get input power.

From FIG. 32C5 show the universal-unit (3800) (3800A) fit into the LED desktop item or lighting or lantern housing parts (3800C) and has electric fan (3811) and LED light-source assembly (3812) and 2 out USB-unit (3813) and USB-Port (3814) before the front cover (3815) of FIG. 32C6 fit on top of the said housing parts (3800C). The cosmetic cover (3800E) has the light block-out art design (3816) and light passing areas (3817) assembly with the said houging-parts (3800C) to form one of the LED desktop item or lighting or lantern for design size, geometric shape. The said FIG. 32C3, FIG. 32C4, FIG. 32C5, FIG. 32C6, FIG. 32C7 is one of the embodiment for said universal-unit application and should not limited for the current invention by any equal function, replaceable skill, equivalent function as long as has same concept, idea, skill with the current invention.

In addition, FIGS. 32D1, 32D2, 32D3, 32D4 show the rotating-module for all kinds of applications.

From FIG. 32D1 show the USB-Module or USB-Unit is rotatable along the two arms to change from No. 1 surface to Number N (N is any number) surface for get desired functions.

From FIG. 32D2 (10a-1) text-box show "LED light select from any market available type for desired functions, effects, performance, features, brightness with IC chips as requirement".

From FIG. 32D2 (10a-2) text-box show "LED light has control means select from motion sensor, remote control, photo sensor, switch, wireless controller . . . etc.".

From FIG. 32D2 (10a-3) text-box show "LED light use chip-type for surface mounting to reduce tall and make high-end appearance".

From FIG. 32D2 (10a-4) text-box show "LED light has 4 LED matrix-units or 4 pcs high power LEDS"

From FIG. 32D2 (10a-5) text-box show "LED light can has 3 LEDs matrix-units or high power LED for desire brightness and color temperatures".

From FIG. 32D2 (10-6) text box show "LED light can be 5 LEDs with its rotate pole to change position and tile angle"

From FIG. 32D2 has big text-box show "LED lighting fixture may select from any kind of LED(s) and function(s) from market available model/design/effects for current invention LED light has USB port to charge energy storage units or assembly of other electric-device.

Figure 32:

From FIG. 32-D4 show the all kind of power stripe or extension cord which can have desired (i) number (This embodiment has 6), (ii) type (10c-1) (10-c-2) (10c-3) (10c-4) (10c-5) (10c-6) or other type, (iii) combination for AC-outlet (10c-1), LED Chip on-board COB (10-c-2), multiple USB-port and other receiving-ports or-and AC outlet-ports (10c-3), Nothing on the front cover just desired surface treatment or decoration (10c-4), multiple LED-unit those are COB LEDs (10c-5), rotatable multiple surface(s) USB charger piece (10c-6) or other construction.

of the said rotating USB unit(s) or USB-Module with or without the LED light source.

The said Power strips or extension cords has AC-plug wire to connect with AC power source.

From FIG. 33D3 (10b-1) text-box show "USB Module every combination has USB-Unit on it incorporate other receiving means to form the USB-module".

From FIG. 33D3 (10b-2) text-box show "6 receiving ports. Those are 4 USB-units+2 outlet-units".

From FIG. 33D3 (10b-3) text-box show "6 receiving ports, those are 2 USB-unit+2 outlet-unit+1 internet+1 phone".

From FIG. 33D3 (10b-4) text-box show "6 receiving ports, those are 2 USB-unit+2 Outlet-units+2 adaptors".

From FIG. 33D3 (10b-5) text-box show "4 receiving ports, those are 2 USB-units+2 outlet-unit".

From FIG. 33D3 (10b-6) text-box show "3 receiving ports, those are 2 USB-units+1 outlet-unit".

So from FIG. 32D3 show the each surface of rotating USB charger has desired receiving-ports to meet market requirement.

From above discussion for the USB Charging-port which has minimum 1.0 Amp to 5.0 Amp or higher amperage to allow people to get short time charger without any digital or electric data delivery is different with out of date 500 ma slow charger and has digital data delivery which will cause the overheat and fire risk. The current invention also has one and only one power source which is not like has AC input at $1^{st}$ and change to DC Battery power pack to become power source and has more than one power source into desktop product and go to the USB port which is not practical and increase a lot of trouble for construction and expensive. The current invention as co-inventor parent filed including:

The current invention are continuously filing of co-pending filing U.S. Ser. No. 12/950,017 (#CCC) Multiple surface LED light filed on Nov. 29, 2010 with rotating device has LED light device(s) and USB device and Outlets device built-in on the rotating substrate with more than one surface to offer multiple function.

The said (# CCC) U.S. Ser. No. 12/950,017 Filed Nov. 19, 2010 (Now is U.S. Pat. No. 8,998,462) is continuously filing for (#R) U.S. Ser. No. 11/806,285, and (Inventor's #R) filed on May 31, 2007 which also a multiple functions LED light device which are the continuously filing of the U.S. Pat. No. 7,318,652 (Inventor's #B) for multiple function Wall Cover which filed on Mar. 31, 2005. The current invention also continuously filing of U.S. Pat. No. 7,651,365 (Inventor's #F) filed on Jan. 15, 2005 which is CIP of Oct. 1, 2004. It also the CIP of U.S. Pat. No. 7,810,985 (Inventor's # A) file on Mar. 31, 2005 but it is CIP of Oct. 1, 2004 filing date too. All these patented or pending case all related to the Light source with Outlets device(s) which are part of the current invention features and got U.S. patents issues or co-pending. It is appreciated the all listed above patented or co-pending cases still treat as fall within the scope of current invention application and apply the priority terms for the current invention filing.

The current invention also continuously filing for (Inventor's #FFF) U.S. Ser. No. 13/117,227 filed on May 27, 2011 for Universal Module has USB-Unit(s) or/and Outlet-unit(s) for variety of electric or digital-data device.

This application is a continuation of (#GGG-4C) U.S. patent application Ser. No. 14/827,810, which is Continuation of (#GGG-3C) U.S. patent application Ser. No. 14/643,026 which is Continuation of (#GGG-2C) U.S. patent application Ser. No. 14/548,620 which is Continuation of (#GGG-1C) U.S. patent application Ser. No. 14/540,561 which is Continuation of (#GGG-4) U.S. patent application Ser. No. 14/189,162 now is U.S. Pat. No. 8,931,947 which is continuation of (#GGG-3) U.S. patent application Ser. No. 14/144,703, filed Dec. 31, 2013, which is continuation of (#GGG-2) U.S. patent application Ser. No. 14/105,737 now is U.S. Pat. No. 8,911,137 which is continuation of (#GGG-1) U.S. patent application Ser. No. 14/105,607 now is U.S. Pat. No. 8,915,608 which is continuation of (#GGG-2011) U.S. patent application Ser. No. 13/161,643 now is U.S. Pat. No. 8,783,936, these parent filing case cover all desktop items and lighting device and desk top items. The current invention and related filing case has features at least cover as below feature and function including:

1. A Quickly USB charging-ports assembly for lighting device, consist of;

At least one of USB charging ports has minimum 1.0 A up to 5.0 Amp charging capacity and specification released on 2007 and update on 2010.

The USB charging ports only has charging function without any electric or digital data transmit or delivery.

At least one of circuit incorporate with the said USB charging port(s) and only has one input power-source and the said circuit supply DC current to charge the energy storage unit or assembly including battery, batteries, rechargeable battery inside the said other electric or digital data product(s) though outside housing's USB-wire has at least 2 male plugs to connect with USB charging-ports and be-charged product's USB receiving-ports to deliver the DC current.

The said USB charging-port(s) is universal type can fit for all different USB-Wire at least one of plug(s) so can charge all different be-charged device (s).

A lighting device and its parts has base for desk, surface, floor, wall installation and has housing space with opening to install the USB charging port(s).

2. The Quickly USB charging ports assembly for lighting device, the said power source is from outside the light device housing's AC to DC transformer, adaptor, converter, invertor which has circuit-kits inside to change the AC current to DC current.

3. The Quickly USB charging ports assembly for lighting device, the said power source is from AC wall or extension cord or other's outlet and get power by the AC plug and wire to the light device inner-circuit which has transformer, invertor, adaptor, converter assembly inside and change the input AC current to DC current.

4. The Quickly USB charging ports assembly for lighting device, the said light device has LED or LEDs to offer at least one function select from illumination, area illumination, indicator light, lighted image, project image, time display, charging status, date or/and calendar display, temperature display, message display.

5. The Quickly USB charging ports assembly for lighting device, the said light device has non-LED light source to offer illumination.

6. The Quickly USB charging ports assembly for lighting device, the said light device housing space including light device's base, pole, bar, stationary organizer, compartment, construction, stand, clip base, or other housing space.

7. The Quickly USB charging ports assembly for lighting device, the said circuit has more than one circuit-kits or circuit-inner which for transformer, invertor, adaptor, converter inside the outside or light device's housing, and the said more than one circuit is circuit-inside that make device not only supply the DC current to the USB charging-ports but also arrange the power or electric functions to the other functions including light source, LED(s), time display, message display, wireless communication, image display, timer, date/calendar/weather display, other added functions, temperature/humility display, remote controller, wifi controller, image controller, IP cam, infra-red controller, wireless communication controller.

8. The Quickly USB charging ports assembly for lighting device, the said lighting device is one of desk lamp, floor lamp, wall lamp, outdoor lighting, night light.

9. The Quickly USB charging ports assembly for lighting device, the said other electric or digital products is a communication equipment, computer equipment, consumer electric products which has the DC energy storage unit or assembly inside the products and can be rechargeable.

10. The Quickly USB charging ports assembly for lighting device, the said USB charging-port is a type A construction which same as majority of laptop computer USB port but has minimum 1.0 A up to 5 Amp or higher charging capacity.

11. The Quickly USB charging ports assembly for lighting device, the said USB receiving-port of the said be-charged products which can be any kind of construction and size has its custom-pin which need as compact as possible including compact USB, Mini USB, Micro USB for compact size so can make be-charged device thinner, smaller, slim as much as possible.

12. The Quickly USB charging ports assembly for lighting device, the said USB charging-port(s) number from 1 to N (any number) and has relative number of the AC to DC circuit-kits of outside device's housing or AC to DC circuit-inner to match the desire charging capacity to have 1.0 A, 2.1 A, 3.1 A, 4.2 A, 1.5 A, 2.4 A, 3.4 A, 4.8 A, 6.2 A, 6.8 A or higher combination and charging capacity.

13. The Quickly USB charging ports assembly for lighting device, the said USB charging-port(s) has different circuit including (1) outside device's housing transformer, adaptor, invertor, converter's is circuit-kit (2) inside the device's housing to change AC to DC current is circuit-inner (3) inside the device's housing for other added functions is circuit-inside and all these different circuits has number 1 to N (any number) depend on functions, performance, effects needed.

14. The Quickly USB charging ports assembly for lighting device, the said only one input power source, the said USB charging-port(s) only take output-end's DC current from
  (1) the circuit-inner while without the outside device's housing transformer; or
  (2) circuit-kits while has the outside device's housing transformer.

15. The Quickly USB charging ports assembly for lighting device, the said light device further incorporates with Outlet-unit or Outlet-Module to SUPPLY the AC current directly though only conductive-kits or assembly from the outlet receiving port(s) to the other electric or digital devices has conductive prongs and the said Outlet-unit or outlet-module install within or on anywhere the light device.

16. The Quickly USB charging ports assembly for lighting device, the said USB charging-port(s) and outlet-unit has desire combinations to assembly together to form the said USB-Module or Outlet-Module or Universal Unit or Sealed-Unit which has desire number or USB Charging-ports and Outlet-unit has ground pin or without ground pin.

17. The Quickly USB charging ports assembly for lighting device, the said light device has added outlet-unit which has number 1 to N (any number) and has surge-protection for number over the 3 or more to offer the more safety.

18. The Quickly USB charging ports assembly for lighting device, the said USB charging-ports or/and Outlet-units can arrange on any parts of the said lighting device including base, pole, bar, stand, stationer-organizer, added housing construction, clips.

19. The Quickly USB charging ports assembly for lighting device, the said lighting device light source is a built-in LED(s), CFL, Power saving bulb, separated LED bulb, Florescent tube, LED tube, EL, OEL or other market available light source.

20. The Quickly USB charging ports assembly for lighting device, the said lighting device optional add more other electric parts & accessories to make more useful items including timer, remote controller, dimmer, color changing, remote controller, wireless controller, APP controller, Wife communication, Wife controller, motion sensor, switch, remote controller, master power controller, Anti-Glare filter prevent from reflective effects.

21. The Quickly USB charging ports assembly for lighting device, the said lighting device is a floor lamp has the USB charging-port on the anywhere of housing, base, added desk, bar, stand, pole and has number of outlets on the base or stand number from 1 to N (any number) so work as power strip has outlets up to N with optional surge protection and has only one wire with AC-Plug to plug-into Wall 22. A Quickly USB charging-ports assembly for digital alarm clock or time related device, consist of;
  At least one of USB charging-ports has minimum 1.0 A up to 5.0 OAmp charging capacity and specification released on 2007 and update on 2010.
  The said USB charging-ports only has charging function without any electric or digital data transmit or delivery.

A circuit incorporate with the said USB charging-port(s) and only has one input power source and the said circuit supply DC current to charge the energy storage unit or assembly including battery, batteries, rechargeable battery inside the said other electric or digital data product(s) though an outside housing's USB-wire has at least 2 male plugs to connect with USB charging-ports and be-charged product's USB receiving-ports to deliver the DC current.

The said USB charging-port(s) is universal type can fit for all different USB-Wire at least one of plug(s) so can charge all different be-charged device(s).

A digital alarm clock or time related device has housing with opening to install the USB charging port(s).

23. The Quickly USB charging ports assembly for digital alarm clock or time related device, the said power source is from outside the digital alarm clock or time related device housing's AC to DC transformer, adaptor, converter, invertor which has circuit-kits inside to change the AC current to DC current.

24. The Quickly USB charging ports assembly for digital alarm clock or time related device, the said power source is from outside digital alarm clock or time related device housing's AC wall outlet and get power by the AC plug and wire to the light device inner-circuit which has transformer, invertor, adaptor, converter assembly inside and change the input AC current to DC current.

25. The Quickly USB charging ports assembly for digital alarm clock or time related device, the said device has LED or LEDs to offer at least one function select from illumination, indicator light, lighted image, project image, time display, charging status, date or/and calendar display, temperature display, message display.

26. The Quickly USB charging ports assembly for digital alarm clock or time related device, the said device has non-LED light source to offer illumination indicator light, lighted image, project image, time display, charging status, date or/and calendar display, temperature display, message display.

27. The Quickly USB charging ports assembly for digital alarm clock or time related device, the said light device housing including light device's base, stationary construction, compartment, organizer, holder for phone or iPad or power-bank, be-charged products, or other housing arrangement has space.

28. The Quickly USB charging ports assembly for digital alarm clock or time related device, the said circuit has more than one circuit-inside for transformer, invertor, adaptor, converter inside the light device's housing that not only supply the DC current to the USB charging-ports but also arrange the power to the other functions including light source, LED, time display, message display, wireless communication, image display, timer, date/calendar/weather display, temperature/humility display, radio, music, audio device, alarm device, speaker device, remote controller, wifi controller, image controller, IP cam, infrared controller, wireless communication controller.

29. The Quickly USB charging ports assembly for digital alarm clock or time related device, the said digital alarm clock or time piece device is one of clock, LED time piece, LED segments has 8 constructions, time piece has audio parts & accessories, wall clock, night light time piece, desktop item has time display products, desktop time piece, digital alarm time piece, alarm clock, digital or analog time piece.

30. The Quickly USB charging ports assembly for digital alarm clock or related piece, the said other electric or digital products is a communication equipment, computer equipment, consumer electric products which has the DC energy storage unit or assembly inside the products and can be rechargeable.

31. The Quickly USB charging ports assembly for digital alarm clock or time related device, the said USB charging-port is a type A construction which same as majority of laptop computer USB port but has minimum 1.0 A up to 5 Amp or higher charging capacity.

32. The Quickly USB charging ports assembly for digital alarm clock or time related device, the said USB receiving-port of the said be-charged products which can be any kind of construction and size has its custom-pin which need as compact as possible including compact USB, Mini USB, Micro USB for compact size so can make be-charged device thinner, smaller, slim as much as possible.

33. The Quickly USB charging ports assembly for digital alarm clock or time related device, the said USB charging-port(s) number from 1 to N (any number) and has relative number of the AC to DC circuit-kits of outside device's housing or AC to DC circuit-inner to match the desire charging capacity to have 1.0 A, 2.1 A, 3.1 A, 4.2 A, 1.5 A, 2.4 A, 3.4 A, 4.8 A, 6.2 A, 6.8 A or higher combination and charging capacity.

34. The Quickly USB charging ports assembly for digital alarm clock or time related device, the said USB charging-port(s) has different circuit including (1) outside device's housing transformer, adaptor, invertor, converter's is circuit-kit (2) inside the device's housing to change AC to DC current is circuit-inner (3) inside the device's housing for other added functions is circuit-inside and all these different circuits has number 1 to N (any number) depend on functions, performance, effects needed.

35. The Quickly USB charging ports assembly for digital alarm clock or time related device, the said only one input power source, the said USB charging-port(s) only take output-end's DC current from
 (3) the circuit-inner while without the outside device's housing transformer; or
 (4) circuit-kits while has the outside device's housing transformer.

36. The Quickly USB charging ports assembly for digital alarm clock or time related device, the said device further incorporates with Outlet-unit or Outlet-Module to SUPPLY the AC current directly though only conductive-kits or assembly from the outlet to the other electric or digital device has conductive prongs equipment and the said Outlet-unit or outlet-module install within or on anywhere the device.

37. The Quickly USB charging ports assembly for digital alarm clock or time related device, the said USB charging-port(s) and outlet-unit has desire combinations to assembly together to form the said USB-Module or Outlet-Module or Universal Unit or Sealed-Unit which has desire number or USB Charging-ports and Outlet-unit has ground pin or without ground pin.

38. The Quickly USB charging ports assembly for digital alarm clock or time related device, the said device has added outlet-unit which has number 1 to N (any number) and has surge-protection for number over the 3 or more to offer the more safety.

39. The Quickly USB charging ports assembly for digital alarm clock or time related device, the said USB charging-ports or/and Outlet-units can arrange on any parts of the said device including housing, body, stationer-organizer, added housing construction, holder for communication or computer or consumer products, holder for power-bank which offer the DC power from its output end to be charged products and power-bank can be-charged by said USB charging-ports at input end.
40. The Quickly USB charging ports assembly for digital alarm clock or time related device, the said device light source is a built-in LED(s), liquid crystal display, CFL, Power saving bulb, separated LED bulb, Florescent tube, LED tube, EL, OEL or other market available light source.
41. The Quickly USB charging ports assembly for digital alarm clock or time related device, the said device optional add more other electric parts & accessories to make more useful items including timer, remote controller, dimmer, color changing, remote controller, wireless controller, APP controller, Wife communication, Wife controller, motion sensor, switch, remote controller, master power controller, Anti-Glare filter prevent from reflective effects, audit device, speaker, equalizer, temperature display, weather display, music, alarm, or other functions which available from market place for all kind of time piece.
42. The Quickly USB charging ports assembly for digital alarm clock or time related device, the said device is a time related product has the USB charging-port on the anywhere of housing, base and has number of outlets on the base or housing with number from 1 to N (any number) so work as power strip has outlets up to N with optional surge protection and has only one wire with AC-Plug to plug-into Wall.
43. Quickly USB charging ports assembly for lighting device, consist of;
A USB charging ports has minimum 1.0 A up to 5.0 Amp charging capacity and specification released on 2007 and update on 2010.
The USB charging ports only has charging function without any electric or digital data transmit or delivery.
A circuit incorporate with USB charging port(s) and only has one input power source and supply DC current to charge the energy storage unit or assembly including battery, batteries, rechargeable battery inside the said other electric or digital data product(s).
The circuit incorporate with an outside housing's USB wire has at least 2 male plugs to connect with USB charging-ports and be-charged product's USB receiving-ports to deliver the DC current and one of two male plug is compact, thin, narrow, cute, small size to connect with be-charged products USB receiving-ports prefer select from mini-USB, micro-USB, Type C USB or market place for smaller, thinner, compact size so to match thinner be-charged products.
A lighting device has housing and bar, stand, base, pole, clipper, holder with opening to install the USB charging port(s) for quickly charging.
44. Quickly USB charging ports assembly for lighting device, the said device housing, bar, stand, base, pole, base, clipper, holder has opening to install the Outlet-unit (s) or Outlet-Module(s) or USB-unit(s) or USB-Module (s) or USB universal kits or USB sealed-unit.
45. Quickly USB charging ports assembly for lighting device, the said USB-unit, USB-module, Outlet-unit, Outlet-module, USB Universal kits, USB sealed-unit can have number from 1 to N (any number).
46. Quickly USB charging ports assembly for lighting device, the said clipper has spring device so can clip the variety desk, table, bed, tube, bar, post, edge so can install the desktop lighting device on many place where has the thickness equal or less than clipper's two arms opening width.
47. Quickly USB charging ports assembly for lighting device, the said lighting device which has at least one of light source select from built-in LED(s), Screw in or snap-in or fit tight LED bulb, CFL, Energy Saving Bulb, Florescent tube, LED tube, EL, OEL, Organic EL elements or light panel or light piece.
48. Quickly USB charging ports assembly for lighting device, the said lighting device for desk, floor, wall, ceiling, landscape, ground, table, bed, moving table, bed cushion table, or any flat surface can put lighting device without vibration to make the lighting device to fall down.
49. Quickly USB charging ports assembly for lighting device, the said USB charging-port(s) of USB-unit or USB-Module or Outlet-Module or Universal unit or Sealed-unit is type A or the type to incorporate with USB-wire which has at least one male plug out of at least two male plug is Type A.
50. Quickly USB charging ports assembly for lighting device, the said USB wire has at least two male plugs one prefer TYPE A and the other prefer is mini-USB or micro-USB or Type C USB has smaller, compact, thin, narrow USB construction but quickly charging and bigger charging capacity.
51. Quickly USB charging ports assembly for lighting device, the said light device has optic film added to prevent reflection from the LED, LEDs, LED Bulb or other light source.
52. Quickly USB charging ports assembly for lighting device, the said outlet-unit or outlet-module has added surge protection, or master controller or wireless communication by Wife, APP, remote controller, infra-red, RF remote, timer, time delay, dimmer, color changing, brightness controller functions or features.
53. Quickly USB charging ports assembly for lighting device, the said lighting device incorporate with switch, sensor, motion sensor, timer, to turn on and turn off the lighting device.
54. A Quickly USB charging-ports assembly for lighted cosmetic mirror device, consist of;
At least one of USB charging-ports has minimum 1.0 A up to 5.0 Amp charging capacity and specification released on 2007 and update on 2010.
The said USB charging-ports only has charging function without any electric or digital data transmit or delivery.
A circuit incorporate with the said USB charging-port(s) and only has one input power source and the said circuit supply DC current to charge the energy storage unit or assembly including battery, batteries, rechargeable battery inside the said other electric or digital data product(s) though outside housing and individual USB-wire has at least 2 male plugs to connect with USB charging-ports and be-charged product's USB receiving-ports to deliver the DC current.
The said USB charging-port(s) is universal type can fit for all different USB-Wire at least one of plug(s) so can charge all different be-charged device(s).
A lighted cosmetic mirror device has image related function including magnify, reflective face, reflective body, reflect objects with light source to see under dark environment has housing with opening to install the USB charging port(s).
55. The Quickly USB charging ports assembly for lighted cosmetic mirror device has image related function, the said power source is from outside the device housing's AC to DC transformer, adaptor, converter, invertor which has circuit-kits inside to change the AC current to DC current.

56. The Quickly USB charging ports assembly for lighted cosmetic mirror device has Image related function, the said power source is from outside Image related device housing's AC wall outlet and get power by the AC plug and wire to the device inner-circuit which has transformer, invertor, adaptor, converter assembly inside and change the input AC current to DC current.

57. The Quickly USB charging ports assembly for lighted cosmetic mirror device has Image related function, the said device has LED or LEDs to offer at least one function select from illumination, indicator light, lighted image, project image, time display, charging status, date or/and calendar display, temperature display, message display, color changing, brightness changing, dimmer the light brightness.

58. The Quickly USB charging ports assembly for lighted cosmetic mirror device has Image related function, the said device has non-LED light source to offer illumination, indicator light, lighted image, project image, time display, charging status, date or/and calendar display, temperature display, message display, different color of light, different brightness, dimmer the light brightness.

59. The Quickly USB charging ports assembly for lighted cosmetic mirror device has Image related function, the said light device housing has at least one parts or desire combination select from light device's mirror, reflective surface, reflective and magnify kits or assembly, magnify lens, optics lens, optics assembly, base, bar, stand, pole, hook, stationary construction, compartment, compartment for the install all electric parts & accessories, organizer, holder for phone or iPad or power-bank, be-charged products, or other housing arrangement has space.

60. The Quickly USB charging ports assembly for lighted cosmetic mirror device has Image related function, the said circuit has more than one of circuit-kits, or circuit-inner, there has other circuit-inside which beside the said transformer, invertor, adaptor, converter fit inside of the light device's housing or outside-housing so that the device is not only supply the DC current to the USB charging-ports but also arrange the power to the other functions including light source, LED, time display, message display, wireless communication, image display, timer, date/calendar/weather display, temperature/humility display, radio, music, audio device, alarm device, speaker device, remote controller, wifi controller, image controller, IP cam, infra-red controller, wireless communication controller.

61. The Quickly USB charging ports assembly for lighted cosmetic mirror device has Image related function, the said lighted cosmetic mirror device has image related function is one device has desire combination select from desktop mirror, wall mounted mirror, time piece, LED segments has 8 construction, time piece has audio parts & accessories, clock, night light, desktop item has reflective mirror-like surface and functions, desktop time piece, digital alarm time piece, alarm clock, digital or analog time piece, weather station, radio.

62. The Quickly USB charging ports assembly for lighted cosmetic mirror device has Image related function, the said other electric or digital products is a communication equipment, computer equipment, consumer electric products which has the DC energy storage unit or assembly inside the products and can be rechargeable.

63. The Quickly USB charging ports assembly for lighted cosmetic mirror device has Image related function, the said USB charging-port is a type A construction which same as majority of laptop computer USB port(s) but has minimum 1.0 A up to 5 Amp or higher charging capacity and do not allow has data delivery.

64. The Quickly USB charging ports assembly for lighted cosmetic mirror device has image related function, the said USB receiving-port of the said be-charged products which can be any kind of construction and size has its custom-pin which need as compact as possible including compact USB, Mini USB, Micro USB for compact size so can make be-charged device thinner, smaller, slim as much as possible.

65. The Quickly USB charging ports assembly for lighted cosmetic mirror device has Image related function, the said USB charging-port(s) number from 1 to N (any number) and has relative number of the AC to DC circuit-kits of outside device's housing or AC to DC circuit-inner to match the desire charging capacity to have 1.0 A, 2.1 A, 3.1 A, 4.2 A, 1.5 A, 2.4 A, 3.4 A, 4.8 A, 6.2 A, 6.8 A or higher combination and charging capacity.

66. The Quickly USB charging ports assembly for lighted cosmetic mirror device has Image related function, the said device has different circuit including (1) outside device's housing transformer, adaptor, invertor, converter's is circuit-kit (2) inside the device's housing to change AC to DC current is circuit-inner (3) inside the device's housing for other added functions is circuit-inside and all these different circuits has number 1 to N (any number) depend on functions, performance, effects needed.

67. The Quickly USB charging ports assembly for lighted cosmetic mirror device has Image related function, the said only one input power source, the said USB charging-port(s) only take output-end's DC current from
   (5) the circuit-inner while without the outside device's housing transformer; or
   (6) circuit-kits while has the outside device's housing transformer.

68. The Quickly USB charging ports assembly for lighted cosmetic mirror device has Image related function, the said device further incorporates with Outlet-unit or Outlet-Module to SUPPLY the AC current directly though only conductive-kits or assembly from the outlet to the other electric or digital product(s) has conductive prongs equipment(s) and the said Outlet-unit or outlet-module install within or on anywhere the device.

69. The Quickly USB charging ports assembly for lighted cosmetic mirror device has Image related function, the other electric or digital product(s) for AC outlet-unit or AC Outlet-module is one of the cosmetic related kits including but not limited from listed items including a hair-dryer, hair-related tools with electricity to drive, curing hair heater, electric fan, skin repair of polisher equipment, moisture machine, humility machine, or any machine, tools, kits, equipment for people to make cosmetic purpose for face, hair, body, skin, hand, foot, leg, arms which need to use AC power source all belong to cosmetic related kits.

70. The Quickly USB charging ports assembly for lighted cosmetic mirror device has Image related function, the said outlet-unit or outlet-module or universal unit or sealed units has Outlet receiving ports which may drive different cosmetic related kits and supply the AC current up to 1,850 Watt for hair dryer, 1,650 Wall for normal electric device or any other bigger or lower Watt needed for people while people use the Lighted cosmetic mirror device.
71. The Quickly USB charging ports assembly for lighted cosmetic mirror device has Image related function, the said USB charging-port(s) and outlet-unit has desire combinations to assembly together to form the said USB-Module or Outlet-Module or Universal Unit or Sealed-Unit which has desire number or USB Charging-ports and Outlet-unit has ground pin or without ground pin.
72. The Quickly USB charging ports assembly for lighted cosmetic mirror device has Image related function, the said device has added outlet-unit which has number 1 to N (any number) and has surge-protection for number over the 3 or more to offer added surge protection circuit or the over-heat breaker circuit or the said over-load circuit, current leakage circuit for the more safety.
73. The Quickly USB charging ports assembly for lighted cosmetic mirror device has Image related function, the said USB charging-ports or/and Outlet-units can arrange on any parts of the said device including housing, body, stationer-organizer, added housing construction, holder for communication or computer or consumer products, holder for power-bank which offer the DC power from its output end to be charged products and power-bank can be-charged by said USB charging-ports at input end.
74. The Quickly USB charging ports assembly for lighted cosmetic mirror device has Image related function, the said device light source is a built-in LED(s), CFL, Power saving bulb, separated LED bulb, Florescent tube, cold cathode tube, LED tube, EL, OEL or other market available light source.
75. The Quickly USB charging ports assembly for lighted cosmetic mirror device has Image related function, the said device optional add more other electric parts & accessories to make more useful items including timer, remote controller, dimmer, color changing, remote controller, wireless controller, APP controller, Wife communication, Wife controller, motion sensor, switch, remote controller, master power controller, Anti-Glare filter prevent from reflective effects, audit device, speaker, equalizer, temperature display, weather display, music, alarm, or other functions which available from market place for all kind of time piece.
76. The Quickly USB charging ports assembly for lighted cosmetic mirror device has Image related function, the said device is a lighted cosmetic mirror product has the USB charging-port on the anywhere of housing, base and has number of outlets on the base or housing with number from 1 to N (any number) so work as power strip has outlets up to N with optional surge protection and has only one wire with AC-Plug to plug-into Wall.
77. Quickly USB charging ports assembly for lighting device, consist of;
A USB charging ports has minimum 1.0 A up to 5.0 Amp charging capacity and specification released on 2007 and update on 2010.
The USB charging ports only has charging function without any electric or digital data transmit or delivery.
A circuit incorporate with USB charging port(s) and only has one input power source and supply DC current to charge the energy storage unit or assembly including battery, batteries, rechargeable battery inside the said other electric or digital data product(s).
The said circuit incorporate with an outside housing's and separated USB wire has at least 2 male plugs to connect with USB charging-ports and be-charged product's USB receiving-ports to deliver the DC current and one of two male plug is compact, thin, narrow, cute, small size to connect with be-charged products USB receiving-ports prefer select from mini-USB, micro-USB, Type C USB or market place for smaller, thinner, compact size so to match thinner be-charged products.
A lighting device has housing and bar, stand, base, pole, clipper, holder with opening to install the USB charging port(s) for quickly charging.
78. Quickly USB charging ports assembly for lighting device, the said device housing, bar, stand, base, pole, base, clipper, holder has opening to install the Outlet-unit(s) or Outlet-Module(s) or USB-unit(s) or USB-Module(s) or USB universal kits or USB sealed-unit.
79. Quickly USB charging ports assembly for lighting device, the said USB-unit, USB-module, Outlet-unit, Outlet-module, USB Universal kits, USB sealed-unit can have number from 1 to N (any number).
80. Quickly USB charging ports assembly for lighting device, the said clipper has spring device so can clip the variety desk, table, bed, tube, bar, post, edge so can install the desktop lighting device on many place where has the thickness equal or less than clipper's two arms opening width.
81. Quickly USB charging ports assembly for lighting device, the said lighting device which has at least one of light source select from built-in LED(s), Screw in or snap-in or fit tight LED bulb, CFL, Energy Saving Bulb, Florescent tube, LED tube, EL, OEL, Organic EL elements or light panel or light piece.
82. Quickly USB charging ports assembly for lighting device, the said lighting device for desk, floor, wall, ceiling, landscape, ground, table, bed, moving table, bed cushion table, or any flat surface can put lighting device without vibration to make the lighting device to fall down.
83. Quickly USB charging ports assembly for lighting device, the said USB charging-port(s) of USB-unit or USB-Module or Outlet-Module or Universal unit or Sealed-unit is type A or the type to incorporate with USB-wire which has at least one male plug out of at least two male plug is Type A.
84. Quickly USB charging ports assembly for lighting device, the said USB wire has at least two male plugs one prefer TYPE A and the other prefer is mini-USB or micro-USB or Type C USB has smaller, compact, thin, narrow USB construction but quickly charging and bigger charging capacity.
85. Quickly USB charging ports assembly for lighting device, the said light device has optic film added to prevent reflection from the LED, LEDs, LED Bulb or other light source.
86. Quickly USB charging ports assembly for lighting device, the said outlet-unit or outlet-module has added surge protection, or master controller or wireless communication by Wife, APP, remote controller, infra-red, RF remote, timer, time delay, dimmer, color changing, brightness controller functions or features.
87. Quickly USB charging ports assembly for lighting device, the said lighting device incorporate with switch, sensor, motion sensor, timer, to turn on and turn off the lighting device.
88. A Quickly USB charging-ports assembly for desktop power station device, consist of; At least one of USB charging-ports has minimum 1.0 A up to 5.0 Amp charging capacity and specification released on 2007 and update on 2010.

The said USB charging-ports only has charging function without any electric or digital data transmit or delivery.

A circuit incorporate with the said USB charging-port(s) and only has one input power source and the said circuit supply DC current to charge the energy storage unit or assembly including battery, batteries, rechargeable battery inside the said other electric or digital data product(s) though outside housing and separated USB-wire which has at least 2 male plugs to connect with USB charging-ports and be-charged product's USB receiving-ports to deliver the DC current.

The said USB charging-port(s) is universal type can fit for all different USB-Wire at least one of plug(s) so can charge all different be-charged device(s).

A desktop power station device has more than one power charging or-and supplying function including more than one receiving-port(s) to connect different other products' plug or insert-end or prongs or add extra function(s) select from lighting, LED(s), illumination, controller, wireless communication, motion detection, surge protection, leakage current function, overheat function and device, charging status indicator and device has housing with opening to install the USB charging port(s) and other receiving-ports for other functions.

89. The Quickly USB charging ports assembly for desktop power station device, the said power source is from outside the device housing's AC to DC transformer, adaptor, converter, invertor which has circuit-kits inside to change the AC current to DC current.

90. The Quickly USB charging ports assembly for desktop power station device, the said power source is from outside device housing's AC wall outlet and get power by the AC plug and wire to the device inner-circuit which has transformer, invertor, adaptor, converter assembly inside and change the input AC current to DC current.

91. The Quickly USB charging ports assembly for desktop power station device, the said device has LED or LEDs to offer at least one function select from illumination, indicator light, lighted image, project image, time display, charging status, date or/and calendar display, temperature display, message display, color changing, brightness changing, dimmer the light brightness.

92. The Quickly USB charging ports assembly for desktop power station device, the said device has extra lighting which is a non-LED light source to offer illumination, indicator light, lighted image, project image, time display, charging status, date or/and calendar display, temperature display, message display, different color of light, different brightness, dimmer the light brightness.

93. The Quickly USB charging ports assembly for desktop power station device, the said device housing has at least one parts or desire combination select from device's plurality of AC outlets, female receiving-ports for mail plug, insert-end, prong, connector, adaptor to build the electric signal delivery, audio connector, video connector, wireless communication receiver or transmitter, Bluetooth sets, wife set, base, bar, stand, stationary construction or organizer, compartment, compartment for the install all electric parts & accessories, organizer, holder for phone or iPad or power-bank, be-charged products, or other housing arrangement has space.

94. The Quickly USB charging ports assembly for desktop power station device, the said circuit has more than one of circuit-kits, or circuit-inner, there has other circuit-inside which beside the said transformer, invertor, adaptor, converter fit inside of the device's housing or outside-housing so that the device is not only supply the DC current to the USB charging-ports but also arrange the power to the other functions including light source, LED, time display, message display, wireless communication, image display, timer, date/calendar/weather display, temperature/humility display, radio, music, audio device, alarm device, speaker device, remote controller, wifi controller, image controller, IP cam, infra-red controller, wireless communication controller.

95. The Quickly USB charging ports assembly for desktop power station device, the said desktop power station device has power charging or-and supplying function is one device has desire combination select from USB charger, AC Power supplier, time piece, LED segments has 8 construction, time piece has audio parts & accessories, clock, night light, working light, digital alarm time piece, alarm clock, digital or analog time piece, weather station, radio, temperature, fan, video device, wireless communication equipment such as wife, APP, screen, TV.

96. The Quickly USB charging ports assembly for desktop power station device, the said other electric or digital products is a communication equipment, computer equipment, consumer electric products which has the DC energy storage unit or assembly inside the products and can be rechargeable.

97. The Quickly USB charging ports assembly for desktop power station device, the said USB charging-port is a type A construction which same as majority of laptop computer USB port(s) but has minimum 1.0 A up to 5 Amp or higher charging capacity and do not allow has data delivery.

98. The Quickly USB charging ports assembly for desktop power station device, the said USB receiving-port of the said be-charged products which can be any kind of construction and size has its custom-pin which need as compact as possible including compact USB, Mini USB, Micro USB for compact size so can make be-charged device thinner, smaller, slim as much as possible.

99. The Quickly USB charging ports assembly for desktop power station device, the said USB charging-port(s) number from 1 to N (any number) and has relative number of the AC to DC circuit-kits of outside device's housing or AC to DC circuit-inner to match the desire charging capacity to have 1.0 A, 2.1 A, 3.1 A, 4.2 A, 1.5 A, 2.4 A, 3.4 A, 4.8 A, 6.2 A, 6.8 A or higher combination and charging capacity.

100. The Quickly USB charging ports assembly for desktop power station device, the said device has different circuit including (1) outside device's housing transformer, adaptor, invertor, converter's is circuit-kit (2) inside the device's housing to change AC to DC current is circuit-inner (3) inside the device's housing for other added functions is circuit-inside and all these different circuits has number 1 to N (any number) depend on functions, performance, effects needed.

101. The Quickly USB charging ports assembly for desktop power station device, the said only one input power source, the said USB charging-port(s) only take output-end's DC current from
  (7) the circuit-inner while without the outside device's housing transformer; or
  (8) circuit-kits while has the outside device's housing transformer.

102. The Quickly USB charging ports assembly for desktop power station device, the said device further incorporates with Outlet-unit or Outlet-Module to SUPPLY the AC current directly though only conductive-kits or assembly from the outlet to the other electric or digital product(s) has conductive prongs equipment(s) and the said Outlet-unit or outlet-module install within or on anywhere the device.

103. The Quickly USB charging ports assembly for desktop power station device, the other electric or digital product(s) for AC outlet-unit or AC Outlet-module is one of the cosmetic related kits including but not limited from listed items including a hair-dryer, hair-related tools with electricity to drive, curing hair heater, electric fan, skin repair of polisher equipment, machine, electric tools, or any machine, tools, kits, equipment for people to work which need to use AC power source.

104. The Quickly USB charging-ports assembly for desktop power station device, the said outlet-unit or outlet-module or universal unit or sealed units has Outlet receiving ports which may drive different machine, tools, kits and supply the AC current up to 1,850 Watt, 1,650 Wall for normal electric device or any other bigger or lower Watt needed for people while people use the equipment, machine, electric products.

105. The Quickly USB charging ports assembly for desktop power station device, the said USB charging-port(s) and outlet-unit has desire combinations to assembly together to form the said USB-Module or Outlet-Module or Universal Unit or Sealed-Unit which has desire number or USB Charging-ports and Outlet-unit has ground pin or without ground pin.

106. The Quickly USB charging ports assembly for desktop power station device, the said device has added outlet-unit which has number 1 to N (any number) and has surge-protection for number over the 3 or more to offer added surge protection circuit or the over-heat breaker circuit or the said over-load circuit, current leakage circuit for the more safety.

107. The Quickly USB charging ports assembly for desktop power station device, the said USB charging-ports or/and Outlet-units can arrange on any parts of the said device including housing, body, stationer-organizer, added housing construction, holder for communication or computer or consumer products, holder for power-bank which offer the DC power from its output end to be charged products and power-bank can be-charged by said USB charging-ports at input end.

108. The Quickly USB charging ports assembly for desktop power station device, the said device light source is a built-in LED(s), CFL, Power saving bulb, separated LED bulb, Florescent tube, cold-cathode tube, LED tube, EL, OEL or other market available light source.

109. The Quickly USB charging ports assembly for desktop power station device, the said device optional add more other electric parts & accessories to make more useful items including timer, remote controller, dimmer, color changing, remote controller, wireless controller, APP controller, Wife communication, Wife controller, motion sensor, switch, remote controller, master power controller, Anti-Glare filter prevent from reflective effects, audit device, speaker, equalizer, temperature display, weather display, music, alarm, or other functions which available from market place for all kind of time piece.

110. The Quickly USB charging ports assembly for desktop power station device, the said device has the USB charging-port on the anywhere of housing, base and has number of outlets on the base or housing with number from 1 to N (any number) so work as power strip has outlets up to N with optional surge protection and has only one wire with AC-Plug to plug-into Wall.

111. Quickly USB charging ports assembly for lighting device, consist of;
    A USB charging ports has minimum 1.0 A up to 5.0 Amp charging capacity and specification released on 2007 and update on 2010.
    The USB charging ports only has charging function without any electric or digital data transmit or delivery.
    A circuit incorporate with USB charging port(s) and only has one input power source and supply DC current to charge the energy storage unit or assembly including battery, batteries, rechargeable battery inside the said other electric or digital data product(s).
    The said USB charging-ports incorporate with an outside housing's USB wire has at least 2 male plugs to connect with USB charging-ports and be-charged product's USB receiving-ports to deliver the DC current and one of two male plug is compact, thin, narrow, cute, small size to connect with be-charged products USB receiving-ports prefer select from mini-USB, micro-USB, Type C USB or market place for smaller, thinner, compact size so to match thinner be-charged products.
    A lighting device has housing and bar, stand, base, pole, clipper, holder with opening to install the USB charging port(s) for quickly charging.

112. Quickly USB charging ports assembly for lighting device, the said device housing, bar, stand, base, pole, base, clipper, holder has opening to install the Outlet-unit(s) or Outlet-Module(s) or USB-unit(s) or USB-Module(s) or USB universal kits or USB sealed-unit.

113. Quickly USB charging ports assembly for lighting device, the said USB-unit, USB-module, Outlet-unit, Outlet-module, USB Universal kits, USB sealed-unit can have number from 1 to N (any number).

114. Quickly USB charging ports assembly for lighting device, the said clipper has spring device so can clip the variety desk, table, bed, tube, bar, post, edge so can install the desktop lighting device on many place where has the thickness equal or less than clipper's two arms opening width.

115. Quickly USB charging ports assembly for lighting device, the said lighting device which has at least one of light source select from built-in LED(s), Screw in or snap-in or fit tight LED bulb, CFL, Energy Saving Bulb, Florescent tube, LED tube, EL, OEL, Organic EL elements or light panel or light piece.

116. Quickly USB charging ports assembly for lighting device, the said lighting device for desk, floor, wall, ceiling, landscape, ground, table, bed, moving table, bed cushion table, or any flat surface can put lighting device without vibration to make the lighting device to fall down.

117. Quickly USB charging ports assembly for lighting device, the said USB charging-port(s) of USB-unit or USB-Module or Outlet-Module or Universal unit or Sealed-unit is type A or the type to incorporate with USB-wire which has at least one male plug out of at least two male plug is Type A.

118. Quickly USB charging ports assembly for lighting device, the said USB wire has at least two male plugs one prefer TYPE A and the other prefer is mini-USB or micro-USB or Type C USB has smaller, compact, thin, narrow USB construction but quickly charging and bigger charging capacity.

119. Quickly USB charging ports assembly for lighting device, the said light device has optic film added to prevent reflection from the LED, LEDs, LED Bulb or other light source.

120. Quickly USB charging ports assembly for lighting device, the said outlet-unit or outlet-module has added surge protection, or master controller or wireless communication by Wife, APP, remote controller, infra-red, RF remote, timer, time delay, dimmer, color changing, brightness controller functions or features.

121. Quickly USB charging ports assembly for lighting device, the said lighting device incorporate with switch, sensor, motion sensor, timer, to turn on and turn off the lighting device.

122. Quickly USB charging ports assembly for lighting device, consist of;

At least one of USB charging-ports has minimum 1.0 A up to 5.0 Amp around DC 5 Volt or has desire combination for 1.0 A, 2.1 A, 1.2 A, 2.4 A, 3.1 A, 3.6 A, 4.2 A, 4.8 A or other combination for Big Amperage output-current to get quickly charger function and not overheat caused high voltage from transformer output-end to charge the battery.

The USB charging ports only has charging function without any electric or digital data transmit or delivery.

At least one of circuit-kits inside the outside housing or circuit-inner inside the lighting device housing and both incorporate with the said USB charging port(s) and only has one input power-source and the said circuit supply DC current to charge the energy storage unit or assembly including battery, batteries, rechargeable battery inside the said other electric or digital data product(s) though outside housing's USB-wire has at least 2 male plugs to connect with USB charging-ports and be-charged product's USB receiving-ports to deliver the DC current.

The $2^{nd}$ or more circuit-inside which inside the Light device's housing to supply the power to the said added functions beside the USB Charging-ports and the said $2^{nd}$ or more circuit-inside has electric parts & accessories or $2^{nd}$ transformer to get enough electric current which current needed is bigger than USB Charger needed to said plurality LEDs or plurality different color LEDs or other light source, dinner, switch, motion sensor, remote controller, PIR sensor, or Time display, alarm, controller, wireless communication device, wireless controller, IR photo diode, IP cam, or other market available electric functions to prevent from overheat by one of the transformer to supply the Big Amperage of current to Quickly USB Charging-port and the Plurality of different colors LEDs.

The said USB charging-port(s) is universal type can fit for all different USB-Wire at least one of plug(s) so can charge all different be-charged device(s).

The circuit incorporate with an outside housing's USB wire has at least 2 male plugs to connect with USB charging-ports and be-charged product's USB receiving-ports to deliver the DC current and one of two male plug is compact, thin, narrow, cute, small size to connect with be-charged products USB receiving-ports prefer select from mini-USB, micro-USB, Type C USB or market place for smaller, thinner, compact size so to match thinner be-charged products.

A lighting device has housing and bar, stand, base, pole, clipper, holder with opening to install the USB charging port(s) for quickly charging.

123. A light device has USB charger including;

At least one outlet power source through AC-to-DC device inside or outside the light device housing to change from outlet's $1^{st}$ Alternative current (AC) to $1^{st}$ voltage Direct Current (DC).

At least one of DC-to-DC device or IC or other circuit-inside(s) within or inside of the said light device to change the said $1^{st}$ voltage DC current to $2^{nd}$ voltage or more different Voltage DC current(s) and at least one DC Voltage current for USB charger output-end and at least one DC voltage current for DC light source.

The said light device has light source to offer illumination, and USB Charger's USB Charging-port(s) only to charge the other electric or digital products without electric data delivery.

The said light source is one of DC or AC light source that DC light source is powered by one of more than one of different voltage DC current (s) or AC light source is powered by the said $1^{st}$ AC current.

The said DC light source's working voltage DC current and USB charging-port output-end's 5 Volt DC Current powered by the said $1^{st}$ or more different voltage DC current(s) to operate the illumination and charging functions.

The AC light source powered by the said $1^{st}$ AC current through the inside housing's conductive parts or the said more than one circuit-inside for arrangement.

124. A light device has USB charger including;

At least one AC outlet power source through inside light device housing at least one of AC-to-DC device to change from outlet's Alternative current (AC) to $1^{st}$ voltage or more different voltage of Direct Current (DC).

(A) The said 1 voltage or $1^{st}$ voltage DC current though DC-to-DC circuit(s) to get more than one different voltage of Direct current either one is 5 Volt DC current directly or through conductive or electric parts inside light housing to USB charging-port(s) output-end to charge the other electric or digital products, and more than one different voltage of Direct current at least one meet working voltage of the DC light source including LED(s) to get illumination. The said light device has both USB charger and illumination both functions.

Or (B) The said $1^{st}$ voltage Direct current is higher voltage DC current than USB-port output-end's 5 Volt DC current need through DC-to-DC circuit(s) or IC or other circuit-inside(s) within or inside of the said light device to change the said $1^{st}$ voltage DC current to $2^{nd}$ voltage DC current or through more DC-to-DC circuit(s) to make more different voltage DC current(s) to arrange USB charging-ports output-end has 5 Volt Direct current to charge other electric or digital device(s) and has $1^{st}$ AC through the conductive parts or circuit-inside to the said AC light source for illumination.

Or (C) The said $1^{st}$ voltage Direct current is 5 Volt and directly or through conductive or DC-to-DC circuit, or electric parts inside light housing to all USB charging-port(s) output-end to charge the other electric or digital products, and has the $1^{st}$ AC current though the circuit-inside or IC or other electric parts to supply or arrange AC power to the said AC light source for illumination.

125. The light device has USB Charger, The said light device has outlet-unit or outlet-module get 1' AC current though the inner housing conductive parts directly to at least one of the out-unit or outlet-module's outlet-port(s) to supply AC power to other electric or digital products.

126. The light device has USB Charger, The said DC light source including built-in LED or LED(s). EL light element, Organic Electro-luminescent element(s).

127. The light device has USB charger, the said AC light source including CFL light, LED bulb, Fluorescent Tube, Energy Saving bulb, Cold Cathode tube, Halogen bulb, Incandescent bulb.
128. The light device has USB Charger, the said Light device has USB module or USB power station has plurality of USB-ports and Outlet-ports to supply variety of DC current for different amperage and voltage and the said 120 Volt AC current
129. The light device has USB Charger, the said light device has at least one of added function(s) selected from (a) time display has separated batteries power source (b) alarm and time has batteries power source (c) Lighted mirror for reflect image (d) magnify lens to magnify the objects (e) wireless transmitter & receiver (f) APP controller (g) power station (h) surge protection (i) overheat protection (j) shortage cut-off protection (k) blue-tooth operation (l) remote controller (m) motion sensor (n) time delay (o) infra-red controller.
130. The light device has USB Charger; the said light device has LED indicator light to show charging status or added functions status.
131. The light device has USB charger, the said 5 Volt DC current has its tolerance (+/−15%).

The above 131 features for different MAIN DEVICE is fall within the PARENT Filing for desktop items definition which has functions as description as below:

desk top item function means in said desk top item housing for providing at least one of the following functions: a display of light beams from the LED, projection, an image, projection of a time image, clock functions, illumination of an area, playing of music, serving as a source of power or electric signals, display of photos, transmission of digital signals, providing air flow at a desired temperature, generating moisture, steam, or smells, dispensing liquid, brewing coffee/tea, preparing food, and displaying charging status;

To enable people to easily reach, touch, operate, or manage the desk top items, the USB-unit(s) or USB-module(s) are installed on or within the item or a substrate(s). The items may be positioned at a location where people will stay for a period of time, such as a desk, table, bed, chair, land, grass, or wherever else people work, rest, or take a nap. For example, people use a computer, laptop computer, iPhone™, iPad™, or iCloud™ on a substrate(s), location, or place such as a table, desk, bed, laptop stand, laptop supporter, laptop cushion or any similar surface(s) which allows people to work, sleep, or lay down for a period of time while charging other electric or digital data device(s).

In all such places where people will stay for period of time, the nearby desk top items with LED means and built-in USB-units easily offer electric power to all other electric or digital data device(s), so people do not need to bend the body to find a power source under the table, which normally is farther away than the desk top items having LED means. Hence, this arrangement offers good convenience for people while they work, rest, or even take a nap, so that they can easily use the USB-unit(s) or USB-module of the desk top items with LED means to charge their small phone, computer, iPad™, or any other electric or digital data device(s) while they work, rest, sleep or take a nap.

It is appreciated all the above discussion, background, brief, details description or alternative, replaceable, equal function, similar concept for quickly USB charging port which has initial public specification to overcome the overheating, overcome problem cause while had electric or digital data delivery, overcome only can charge one certain be-charged device because the USB port has male plug with custom-pin arrangement which not fit for variety of the be-charged device(s) so cause big return for not universal, or the more than 2 power source input to the same USB port which will make cost increased and consumer confused with expensive circuit board, so the current inventions same as the parent filing cases as above listed and has the minimum 1.0 Amp to 5 Amp or higher with safety USB charging-ports which can allow Big current passing though without heat problems to prevent overheating and cause the unit risk to fire and quickly charging capacity to save people waiting time is the most important than the charger from out-of-date 500 ma slow charger. The desktop items, lighting items, image items, lighted cosmetic mirror items, digital alarm clock, power station on desk top or any other more application as the parent filing case covered should be still fall within the current invention.

I claim:

1. A light device having a USB charger, including:
an LED light device supplied with power from an AC outlet through AC-to-DC circuitry that is:
(a) built-in the LED light device, or
(b) includes an outside transformer having a plug-wire to connect with an outlet and that is plugged into the LED light device,
wherein the AC-to-DC circuitry converts AC current from the AC outlet into DC current;
at least one USB charging port including at least one USB charger output-end; and
at least one DC-to-DC circuit and/or an integrated circuit included within the LED light device to change a first DC voltage into at least a second DC voltage, wherein the first DC voltage or at least a second DC voltage is supplied to (a) the USB charger output-end and/or (b) a DC light source and/or (c) a DC device selected from (c1) a fan; (c2) a timepiece; (c3) a food machine; and (c4) audio equipment,
wherein the LED light device includes a plurality of LEDs or at least one chip-on-board (COB) LED that provides illumination over an area, in addition to the light device further providing the at least one USB charging port to charge other electric or digital products without data delivery,
wherein a DC working voltage for the LEDs or COB LED is the same or different from a USB charger output-end's working voltage of 5-8 volts and is supplied by the at least one DC-to-DC circuit and/or integrated circuit.

2. A light device having a USB charger, including;
an LED light device supplied with power from an AC outlet through AC-to-DC circuitry that is:
(a) built-in the LED light device, or
(b) includes an outside transformer having a plug-wire to connect with an outlet and that is plugged into the LED light device,
wherein the AC-to-DC circuitry converts an AC voltage from the AC outlet into a first DC voltage;
at least one USB charging port including at least one USB charger output-end supplied with a DC voltage of 5-8 volts to charge other electrical or digital products; and
at least one DC-to-DC circuit for providing a at least one DC voltage that is different from the first DC voltage,
wherein: (i) the first DC voltage is higher than the 5-8 volt DC voltage and is supplied to the DC-to-DC circuit and/or an integrated circuit inside the LED light device to change the first DC voltage into at least one second DC voltage different from the 5-8 volt DC voltage, or (ii) the first DC voltage is 5-8 volts and is supplied directly or through the DC-to-DC circuit to the at least one USB charger output-end, and wherein the LED light device includes a plurality of LEDs or at least one chip-on-board (COB) LED that provides illumination over an area, in addition to the light device further providing the at least one USB charging port to charge other electric or digital products without data delivery.

3. The light device having a USB charger as claimed in claim 2, wherein the light device includes an outlet-unit or outlet-module that receives a first AC current directly through inner housing conductive parts to supply AC power to other electric or digital products.

4. The light device having a USB charger as claimed in claim 2, wherein the light source further includes a DC light source including at least one built-in LED, an electroluminescent (EL) light element, or an organic EL light element.

5. The light device having a USB charger as claimed in claim 2, wherein the light device further includes a DC light source including a compact fluorescent (CFL) light, LED bulb, a fluorescent tube, an energy saving bulb, cold cathode tube, a Halogen bulb, or an incandescent bulb.

6. The light device having a USB charger as claimed in claim 2, wherein the light device includes a USB module or USB power station having a plurality of USB-ports and outlet-ports to supply a variety of AC or DC currents of different amperages and voltages, and a 120 Volt AC current.

7. The light device having a USB charger as claimed in claim 2, wherein the light device has at least one additional function device selected from (a) a time display with a separate battery power source; (b) an alarm and/or time device having a battery power source; (c) a lighted mirror for reflecting an image; (d) a magnifying lens to magnify objects; (e) a wireless transmitter and receiver; (f) a controller with APP software or program; (g) a power station; (h) a surge protection device; (i) an overheat protection device; (j) a short circuit cut-off protector; (k) a BlueTooth device; (l) a remote controller; (m) a motion sensor; (n) a time delay; and (o) an infrared controller.

8. The light device having a USB charger as claimed in claim 2, wherein the light device has an LED indicator light to show charging status or added functions status.

9. The light device having a USB charger as claimed in claim 2, wherein the DC voltage of 5-8 volts is a 5V DC voltage having a tolerance of +/−15%.

10. A quick USB charging assembly for a lighting device, comprising:
at least one USB charging port having:
(a) a charging output current of 1.0 A to 5.0 A; and/or
(b) a 5V or 5.2V DC charging output voltage with integrated circuit control of charging current; and/or
(c) a desired charging output current selected from one or more of the following: 1.0 A, 1.2 A, 2.1 A, 2.4 A, 3.1 A, 3.6 A, 4.2 A, 4.8 A, 6.6 A, or higher,
wherein the charging output voltage or current is supplied to at least one output end of the at least one charging port to provide a quick charging function and reducing a time to charge another product's rechargeable battery without electric signal delivery;
wherein power to the quick USB charging assembly is supplied by AC-to-DC circuitry that is in a housing of the lighting device or included in an outside transformer to convert AC current from the AC outlet into DC power for supply to the at least one USB charging port and/or the lighting device and/or other function devices,
wherein: (i) a USB output-end's output voltage is higher than the 5V or 5.2V DC charging output voltage,
(ii) a DC voltage is supplied by pre-designed circuitry to a DC power light source selected from a built-in LED, screw-in LED bulb, EL light source, and organic EL light source; and/or
(iii) an AC working current is supplied to at least one AC powered light source selected from a compact fluorescent (CFL) light, LED bulb, a Halogen bulb, or an incandescent bulb,
wherein the at least one USB charging port receive a male plug of a USB wire having male plugs at each end to connect the at least one USB charging port with a USB port of a product-to-be-charged to deliver DC charging current,
wherein the light device has electrical parts and accessories for receiving electrical current sufficient to power at least one component selected from (a) a plurality of LEDs or a plurality of different color LEDs; (b) another light source; (c) a time display; (d) an alarm; (e) a controller; (f) a wireless communication device; (g) a wireless controller; (h) an infrared photo diode; (i) an IP cam; or (j) another electrical device added to the light device,
wherein the at least one USB charging port is a universal type USB charging port adapted to fit different USB plugs to charge different products-to-be-charged, and
the light device has a base for desk, surface, floor, or wall installation, the base having a space or opening to install the at least one USB charging port.

11. The quick USB charging assembly for a lighting device as claimed in claim 10, wherein the power to the quick USB charging assembly is supplied by the outside transformer, which has circuit-kits inside to change the AC current to a DC current having a first DC voltage of 6V, 12V, 15V, 18V, or 24V, the quick USB charging assembly further comprising an integrated circuit or circuitry for changing the first DC voltage to a second DC voltage of 5V (+/−10%) to charge another electrical or digital device having an inner energy storage unit or assembly including rechargeable batteries.

12. The quick USB charging assembly for a lighting device as claimed in claim 10, wherein a power source of the quick USB charging assembly is an AC wall outlet or extension cord or another AC outlet that receives an AC plug and wire and outputs a first AC current, the first AC current being supplied directly to the AC powered light source of the light device, the light device further including an internal transformer, invertor, adaptor, or converter for changing the first AC current to a second DC current, wherein: (a) the second DC current is a 5V DC current and is supplied directly to the output end of the at least one USB charging port; (b) the second DC current has a voltage of 6V, 12V, 15V, 18V, or 24V and is supplied directly to a DC power light source; (c) the second DC voltage is converted by an internal integrated circuit or additional internal circuitry to a third DC current and the third DC current is a 5V DC current supplied to the output end of the at least one USB charging port.

13. The quick USB charging assembly for a lighting device as claimed in claim 10, wherein the light device includes at least one LED that offers at least one function selected from illumination, area illumination, a lighted image, a projected image, time display, charging status, date or/and calendar display, temperature display, or message display.

14. The quick USB charging assembly for a lighting device as claimed in claim 10, wherein the light device has a non-LED light source to offer illumination and that is selected from at least one of a CFL, incandescent bulb, fluorescent tube, cold cathode tube, neon tube, power saving bulb, or other light bulb.

15. The quick USB charging assembly for a lighting device as claimed in claim 10, wherein the light device housing includes a light device's base, pole, bar, stationary organizer, compartment, construction, stand, clip base, or other housing space.

16. The quick USB charging assembly for a lighting device as claimed in claim 10, wherein the light device includes multiple circuit kits or internal circuitry including a transformer that controls supply of power to the USB charging port and additional function devices including a light source, at least one LED, a time display, a message display, a wireless communication device, an image display a timer, a date/calendar/weather display, a temperature/humidity display, a remote controller, a WiFi controller, an image controller, an IP cam, an infrared controller, or wireless communication controller.

17. The quick USB charging assembly for a lighting device as claimed in claim 10, wherein the lighting device is one of desk lamp, floor lamp, wall lamp, outdoor lighting, and nightlight.

18. The quick USB charging assembly for a lighting device as claimed in claim 10, wherein the other product-to-be-charged includes at least one of communication equipment, computer equipment, and a consumer electric product having a rechargeable DC energy storage unit or assembly inside the product-to-be-charged.

19. The quick USB charging assembly for a lighting device as claimed in claim 10, the USB charging port is a type-A USB charging port having a minimum of 1.0 A up to 5 Amp or higher charging capacity.

20. The quick USB charging assembly for a lighting device as claimed in claim 10, a USB receiving port of the product-to-be-charged is one of a compact USB, Mini USB, Micro USB receiving port.

21. The quick USB charging assembly for a lighting device as claimed in claim 10, further comprising a desired number of AC to DC circuit-kits outside the light device's housing or internal AC-to-DC circuitry with more than one circuit, IC, and/or electric parts to cause the DC current to have said charging output current of 1.0 A, 1.2 A, 2.1 A, 2.4 A 3.1 A, 3.6 A, 4.2 A, 4.8 A, 6.6 A, or higher.

22. The quick USB charging assembly for a lighting device as claimed in claim 10, including a plurality of external circuit kits or internal circuits for adjusting currents for different functions, performance, and effects.

23. The quick USB charging assembly for a lighting device as claimed in claim 10, wherein the AC-to-DC circuit is:
 (a) built-in the LED light device, or
 (c) includes an outside transformer having a plug-wire to connect with an outlet and that is plugged into the LED light device.

24. The quick USB charging assembly for a lighting device as claimed in claim 10, wherein the light device includes an outlet-unit or outlet-module that receives at least one conductive prong for supplying AC power to another AC electrical product and that is installed within or on the light device.

25. The quick USB charging assembly for a lighting device as claimed in claim 10, wherein the at least one USB charging port and an outlet unit are assembled together to form a USB-module or outlet-module or universal unit or sealed-unit having a desired number of USB charging ports and outlet units with or without ground pins.

26. The quick USB charging assembly for a lighting device as claimed in claim 25, wherein the light device has at least one added outlet-unit with surge-protection.

27. The quick USB charging assembly for a lighting device as claimed in claim 25, the at least one USB charging port and/or outlet units is provided on a base, pole, bar, stand, stationery-organizer, added housing construction, or clip of the lighting device.

28. The quick USB charging assembly for a lighting device as claimed in claim 10, wherein a light source of the lighting device includes at least one built-in LED, a CFL, a power saving bulb, a separate LED bulb, a fluorescent tube, an LED tube, an EL element, or an organic EL element.

29. The quick USB charging assembly for a lighting device as claimed in claim 10, wherein the lighting device further includes additional electric parts and accessories or an integrated circuit to provide functions of a timer, remote controller, dimmer, color changer, remote controller, wireless controller, APP controller, WiFi communication, WiFi controller, motion sensor, switch, master power controller, and/or anti-glare filter.

30. The quick USB charging assembly for a lighting device as claimed in claim 10, wherein the lighting device is a floor lamp and the at least one USB charging port is provided on a housing, base, added desk, bar, stand, or pole and a number of outlets are provided on the base or stand to work as a power strip having at least one outlet with surge protection and a wire with an AC-plug that plugs into a wall outlet.

* * * * *